United States Patent [19]
Geiger

[11] Patent Number: 5,811,055
[45] Date of Patent: Sep. 22, 1998

[54] TORCH MOUNTED GAS SCAVAGING SYSTEM FOR MANUAL AND ROBOTIC WELDING AND CUTTING TORCHES

[76] Inventor: Michael B. Geiger, 1403 76th St., Houston, Tex. 77012

[21] Appl. No.: 601,214

[22] Filed: Feb. 6, 1996

[51] Int. Cl.⁶ .................................................. B23K 7/08
[52] U.S. Cl. .............................................. 266/49; 266/48
[58] Field of Search ................. 266/48, 49; 219/121.45, 219/130.01

[56] References Cited

U.S. PATENT DOCUMENTS

| | | | |
|---|---|---|---|
| 4,057,705 | 11/1977 | Cockrum et al. | 266/48 |
| 4,087,670 | 5/1978 | Miller | 266/48 |
| 4,581,518 | 4/1986 | Takahashi et al. | 219/130.01 |
| 5,329,089 | 7/1994 | McGee et al. | 219/121.45 |

FOREIGN PATENT DOCUMENTS

| | | | |
|---|---|---|---|
| 241999 | 9/1960 | Australia | 266/48 |
| 2326296 | 12/1974 | Germany | 266/48 |

*Primary Examiner*—Scott Kastler
*Attorney, Agent, or Firm*—Kenneth A. Roddy

[57] ABSTRACT

Disclosed is an improved welding system incorporating a novel torch mounted gas scavenging system which removes and filters contaminant gases from the workplace and incorporates an enclosure which creates high turnover rates of shielding gases at the weld pool thereby preventing contaminant gas induced defects, and which insulates the heat affected area thereby prolonging the cooling process of the weld pool, effectively reducing porosity and other related defects, and which provides the capability of accurately monitoring and displaying specific measurements of an ongoing welding operation such as humidity, ambient frequencies, internal temperature and pressure in the enclosure, and on line acoustic emissions sensors which indicate the presence or absence of defects as the weld is being made. The system also has an auxiliary gas source which is independently controlled from the primary shielding gas flow, which allows the introduction of auxiliary gas flows into the enclosure without disturbing the primary gas flow pattern.

32 Claims, 25 Drawing Sheets

FIG. 1

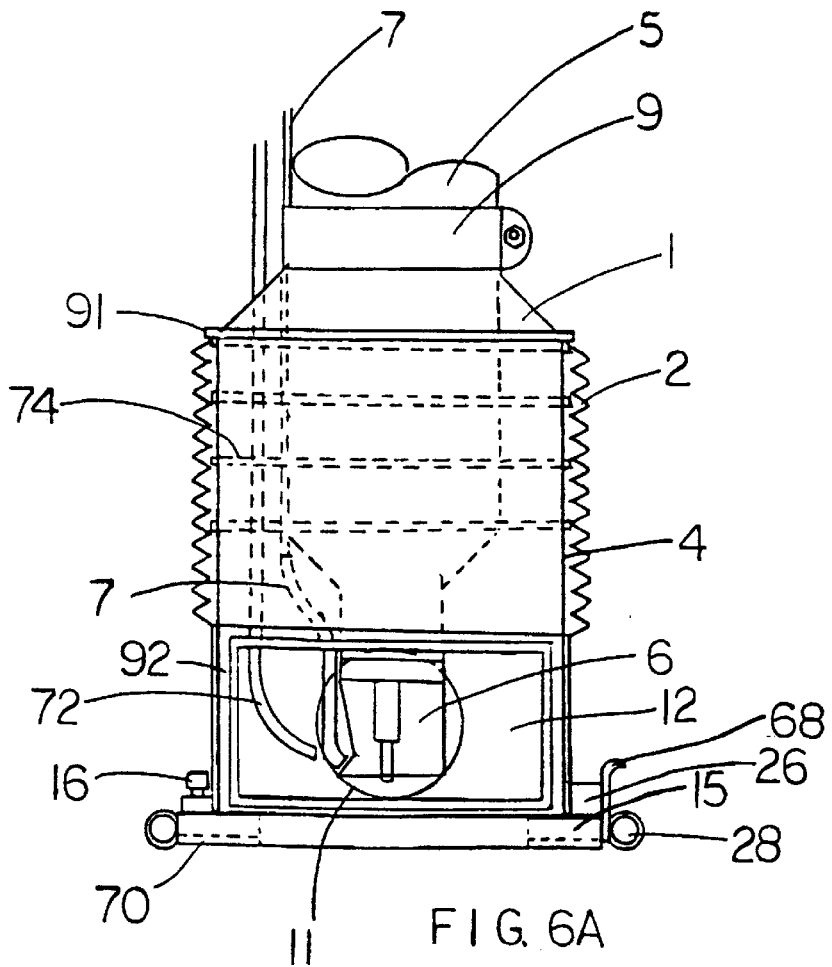
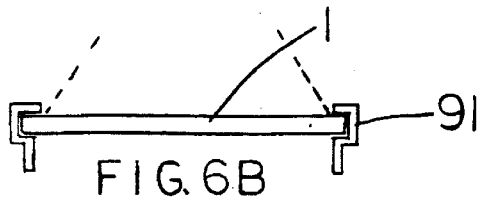
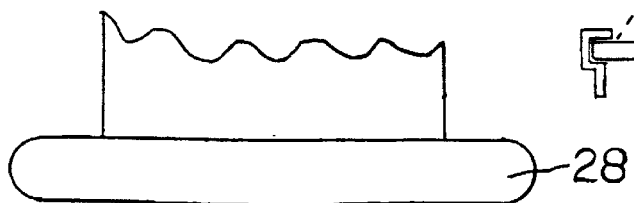
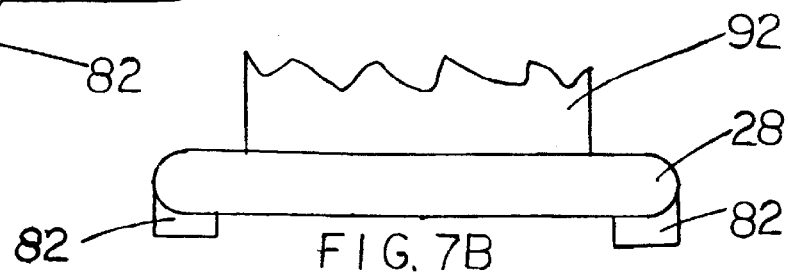

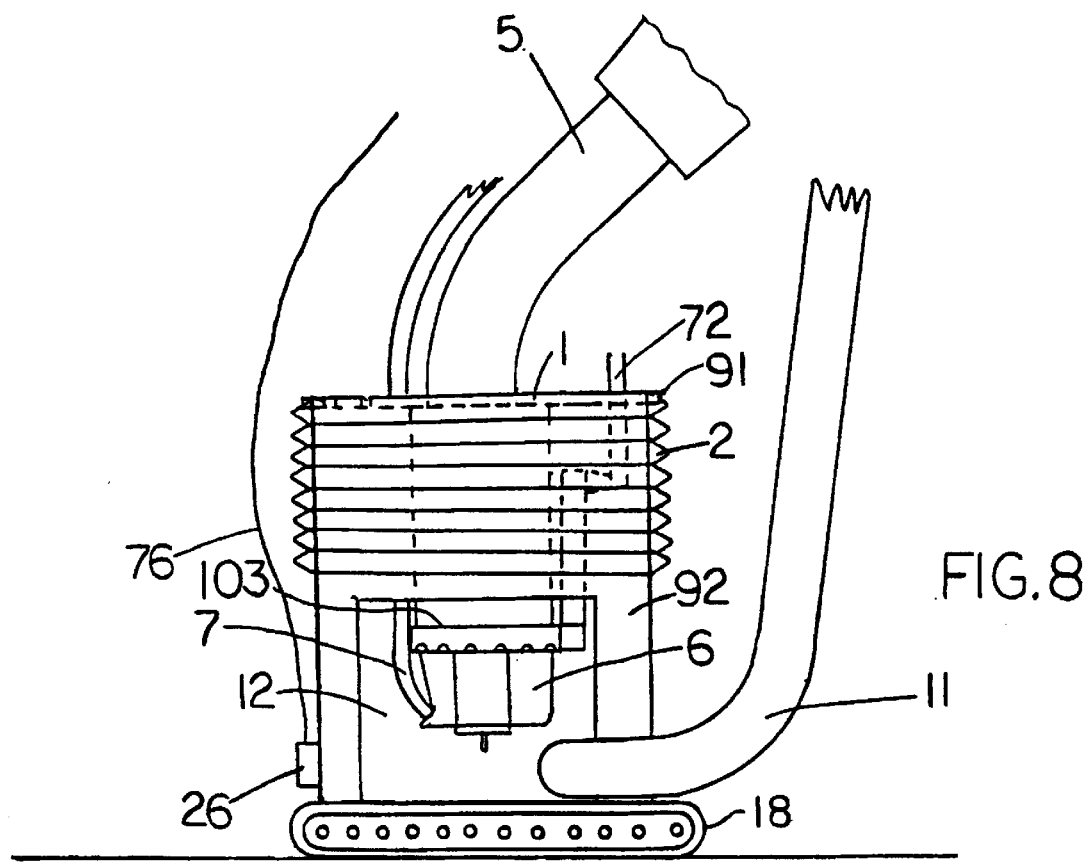
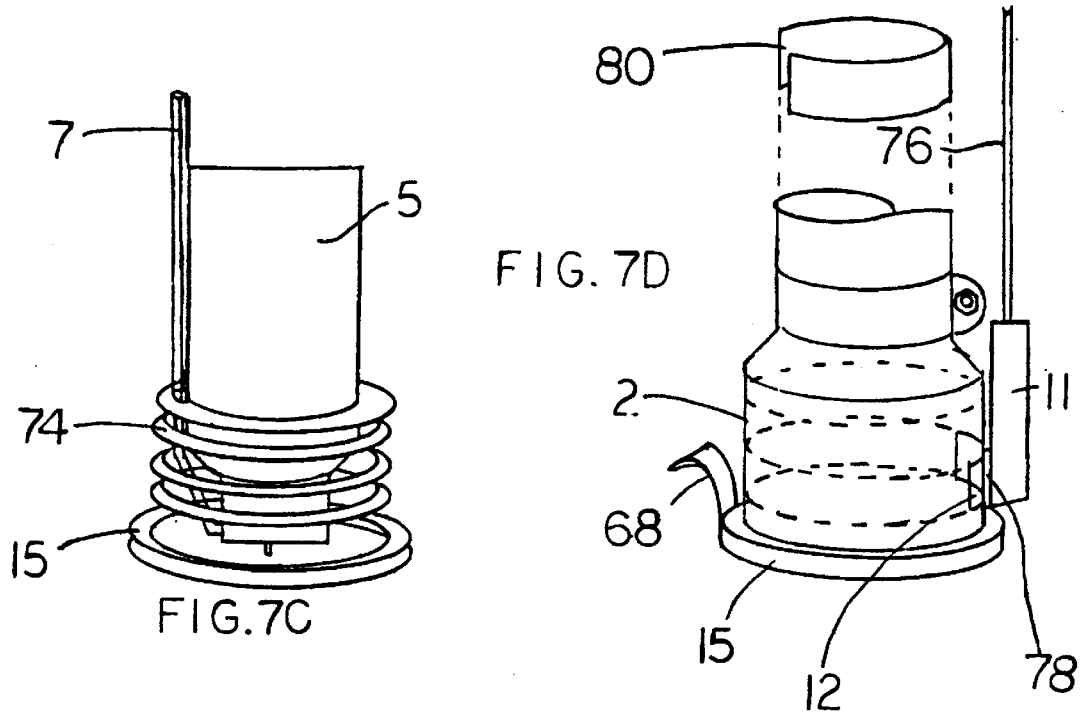

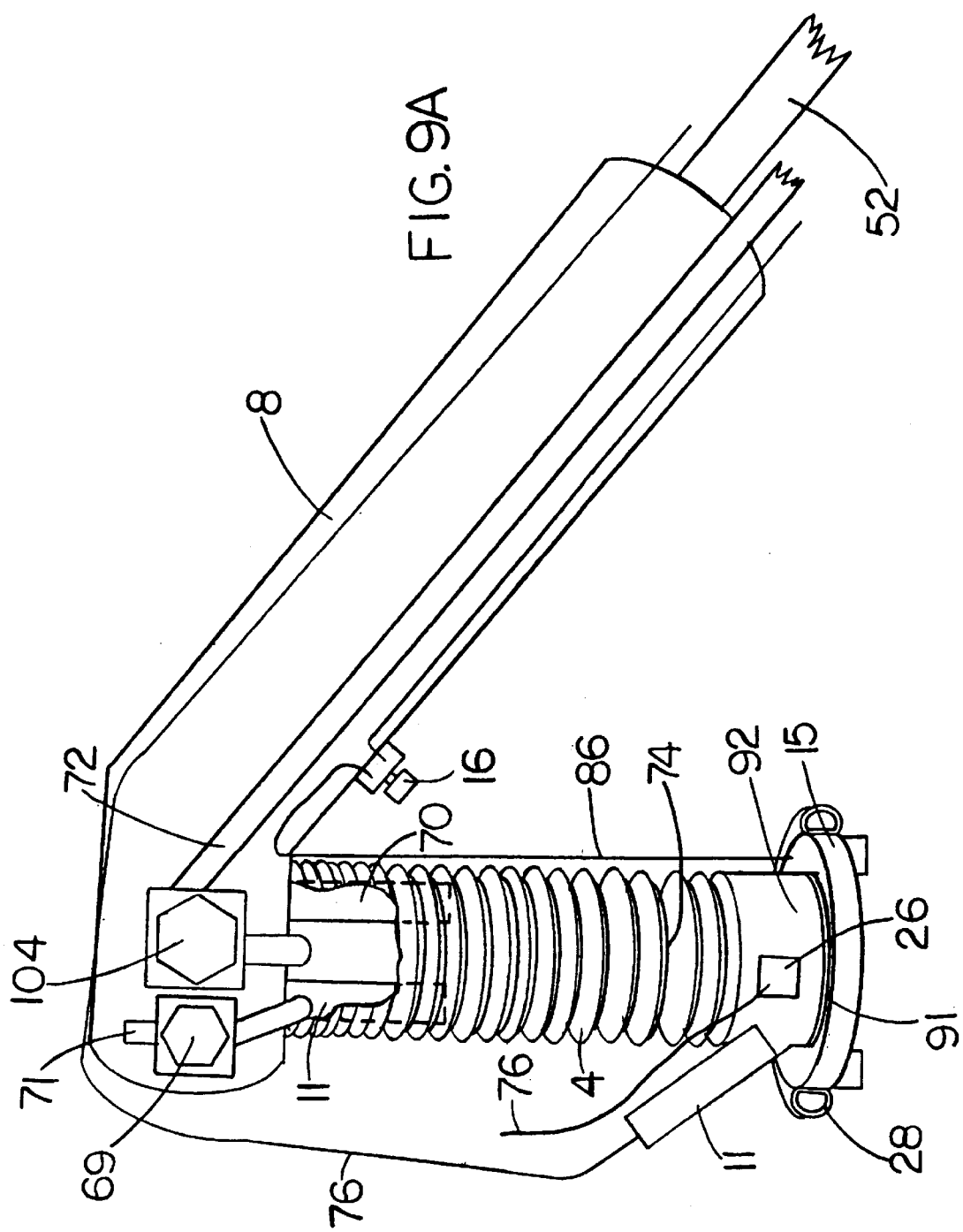

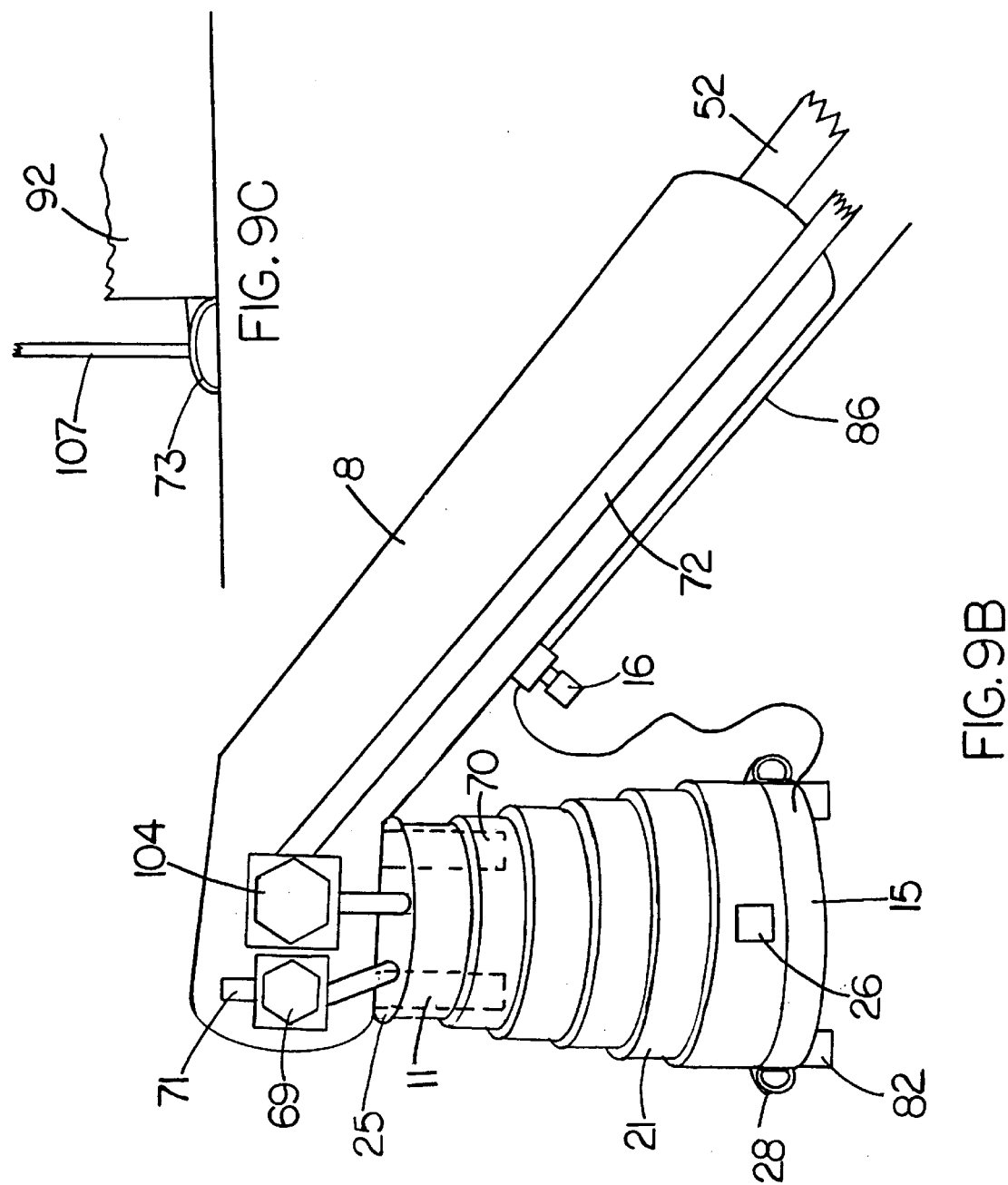

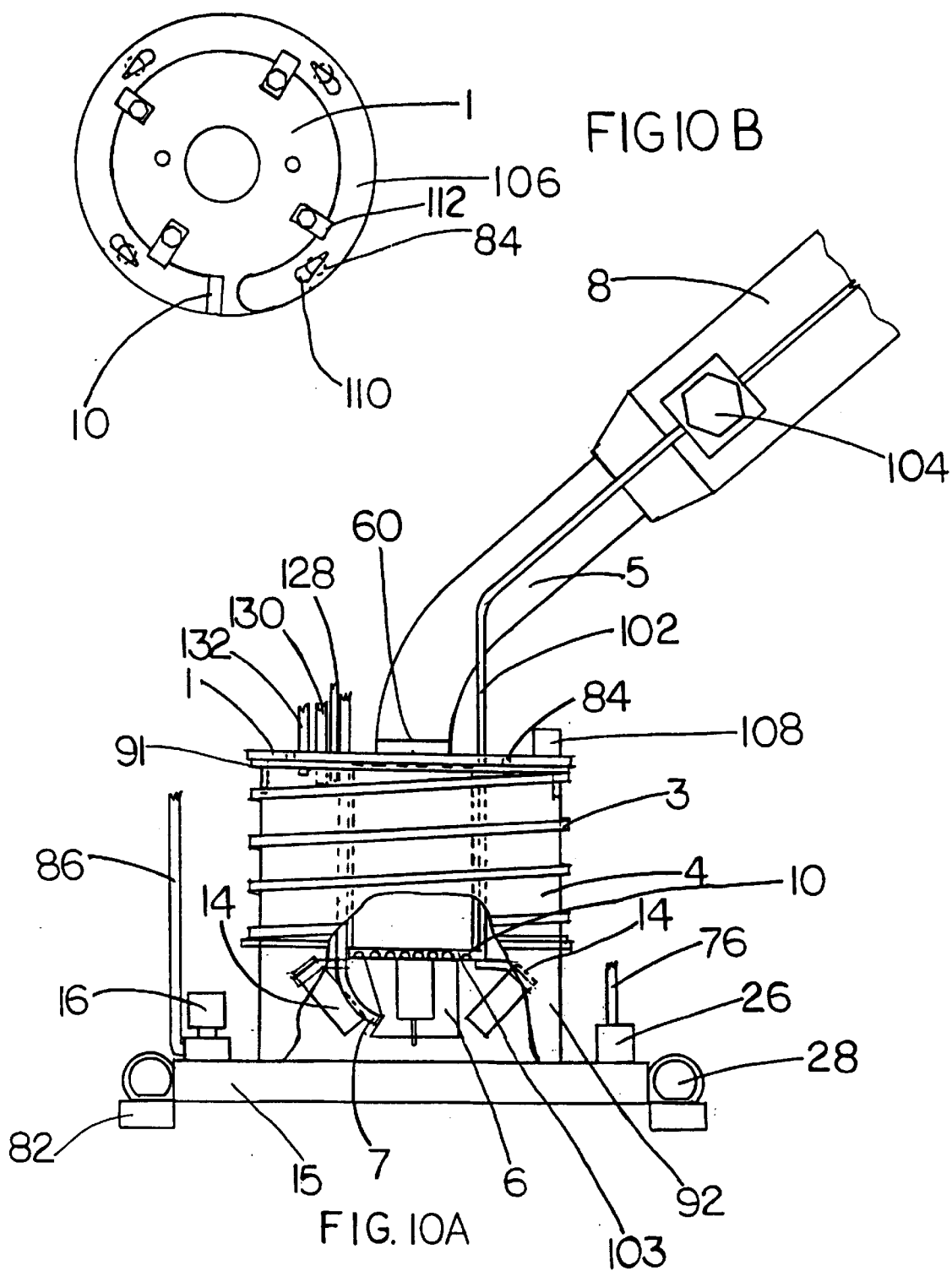

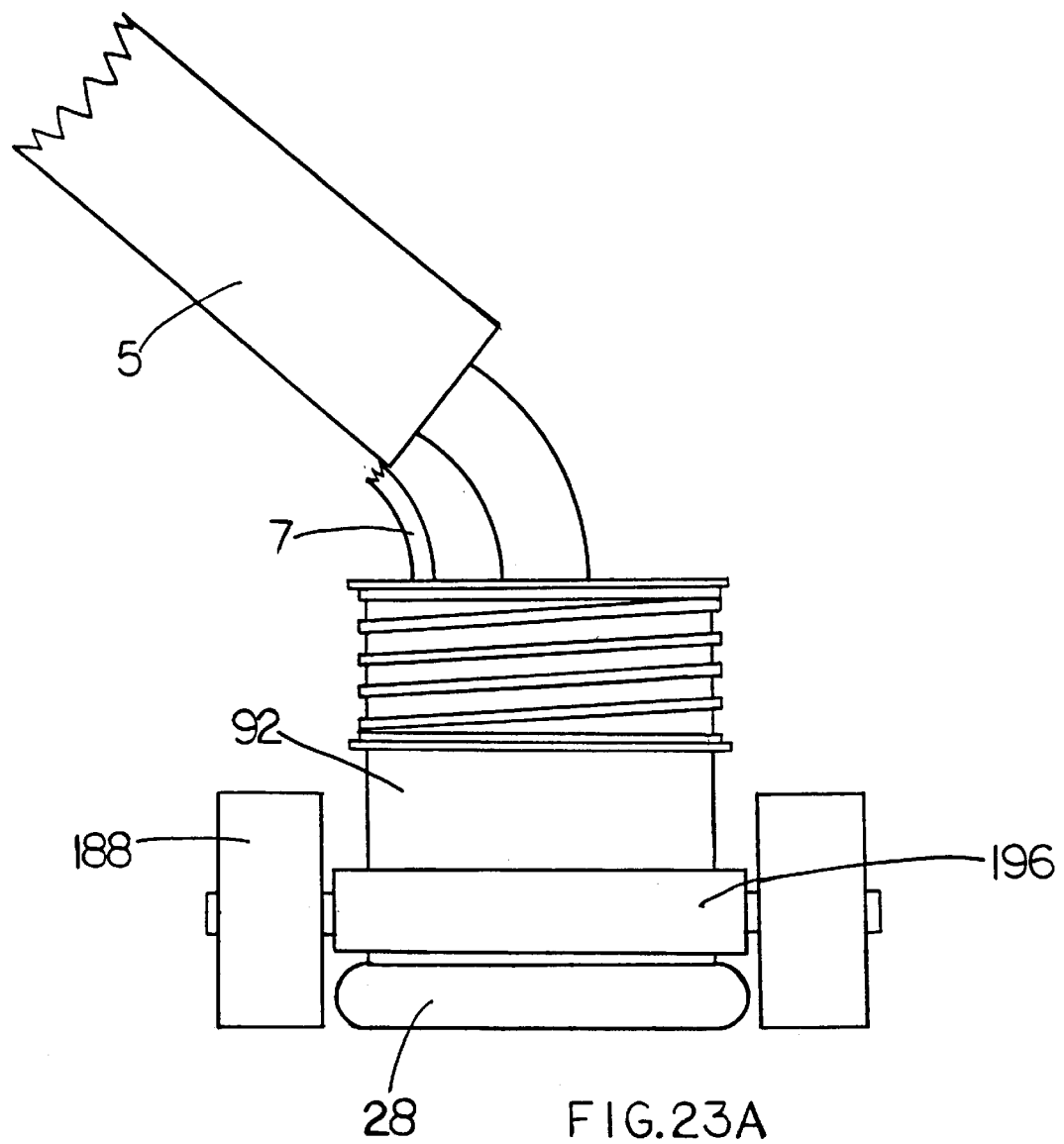

TORCH MOUNTED GAS SCAVAGING SYSTEM FOR MANUAL AND ROBOTIC WELDING AND CUTTING TORCHES

BACKGROUND OF THE INVENTION

1. Field of the Invention

This invention relates generally to manual and robotic cutting and welding methods and equipment, and more particularly to an improved robotic and manual method of completing such tasks using shielded metal arc, MIG, flux core, and plasma arc welding and cutting methodologies and equipment.

2. Brief Description of the Prior Art

In MIG, flux core, and plasma arc welding in manufacturing and industrial environments it has long been known that if the flow rates of shielding gases exiting the torch cup are increased to high levels, mixing of atmospheric and exhaust gases with the shielding gas will occur, interfering with weld quality and yielding generally weaker welds with inconsistent quality. There has been some development of torch cups with improved flow characteristics and resistence to wind generated flow interference, but the problem remains largely unresolved, because the shielding gas flow exiting the torch cup is not physically isolated from the atmosphere. There is an unmet need to provide a method of isolating the shielding gas flow from the atmosphere and at the same time to provide an isolated environment which will enable high turnover rates of the gases in the enclosure to prevent or reduce contamination of the weld from exhaust gases. There is a related need in underwater applications to prevent liberated hydrogen gas from vaporized seawater or other contamination products from being exposed to the weld, thus preventing unquantifiable weld results and quality. In addition, an unmet need exists to slow down the cooling process of the heat affected zone in underwater applications to prevent problems which result in loss of tensile strength and ductility in welds made in this medium. There is also a need common to both applications to sense and monitor influences in the immediate surrounding environment which will influence the quality and durability of the completed weld.

In addition, the requirement for a torch which has the capability of scavenging its own exhaust gases in out-of-water industrial applications has been largely unrecognized, with development of back pack type air delivery systems which adapt to welding hoods and in place fume scavenging and filtration systems being the direction which development has taken. This has been met with less than enthusiastic acceptance by welders because the welding hood mounted systems are cumbersome and heavy, and the in place scavenging systems are not mobile. The requirement exists for welders to wear or otherwise use the filtration method for long uninterrupted periods on production welding tasks. This requirement creates a need for a lightweight, easily adapted-to method of scavenging the fumes without wearing any heavy appliances or being tied to a specific location. It can be seen from the foregoing discussion that a torch mounted fume "vacuum cleaner" type of apparatus would have wide industry acceptance if designed correctly.

Relative to underwater applications, there are two distinctly different methods of completing a weld underwater. One method is wet welding, where the weld is in close or intimate proximity to the underwater medium, and the other is hyperbaric, which creates a dry environment for the weld completion.

The underwater medium is composed of approximately 66% hydrogen, and cools steel approximately 150 times more efficiently than a gaseous environment will. When these physical constraints are imposed on the welding process they have proven to be all but insurmountable in the technological advancement of wet welding. Because wet welds are exposed to these extreme constraints, they display extremely reduced ductility and tensile strength and are more prone to corrosion than welds made above water. There are two mechanisms which contribute in large part to this. The first is porosity. As a result of the close proximity of either water vapor or liberated hydrogen gas to the weld puddle, wet welds suffer from greatly increased absorbtion and retention of hydrogen gas, which is compounded by the problem of short solidification times for the molten weld metal and does not allow the weld adequate time to release the Absorbed gases before hardening, resultantly trapping hydrogen bubbles in the matrix of the weld. These problems lead to early weld failures and generally weak welds.

The second mechanism responsible for wet weld failures and weaknesses is a type of hidden grain growth, or intergranular cracking in the weld. This type of defect is caused by rapid localized cooling along thermal boundary lines, which causes much greater expansion in some areas at or near the weld than in other adjacent areas, causing hidden cracks to form along boundary lines inside the weld-substrate interface as the weld is being made. These show up using non destructive testing methods as hidden flaws and have been demonstrated to create early weld failures. Additionally, an associated negative property of the completed weld and surrounding heat affected zone is greatly reduced ductility and tensile strength resulting from the rapid quenching of the weld by the surrounding seawater, both of which contribute to early weld failures and generally weak welds.

Most of the technical advancements in wet welding to date have centered on special additives and alloys which are included in special welding rods designed exclusively for submerged metal arc wet welding applications, which does not directly address the root causes of porosity, intergranular cracking, and rapid quenching. Only limited success in achieving strong, ductile welds has been achieved as a result.

Conversely hyperbaric welding, using large portable underwater habitats which are lowered into place by cranes from the surface and secured to the work site by divers have been used with a great deal of success in recent years. These habitats, after being secured to the structure and sealed by divers, are then purged of water using an air or gas mixture. A diver welder will then complete a dry environment weld while inside the habitat, generally with a high degree of success. The hyperbaric welding method has proven to be a reliable and successful method of completing welding tasks in the underwater environment, in large part due to the fact that the weld is completed in a gas filled enclosure, and consequently is not exposed to the above stated severe environmental constraints.

But, relative to wet welding procedures without a hyperbaric chamber, the formidable physical constraints in the underwater environment mentioned above can drastically decrease the quality of the finished product even if the welding procedures are followed carefully. As a result, diver operated manual wet welding techniques have proven to be largely unreliable to date, and no breakthroughs are on the horizon using existing technologies or methods.

Other environmental and physical factors can adversely affect the quality of wet welds. Training and qualification requirements must be constantly kept at the highest proficiency levels for diver welder technicians to repeatedly achieve the targeted success levels while being subjected to wind generated wave conditions, underwater visibility problems, surge, and current conditions. All of these can adversely affect the quality of the finished weld by physically preventing the diver from either seeing or accurately completing the task because of the lack of a stable work platform for the diver to operate from or because water movement prevents the required control over the divers hand movements.

Hyperbaric underwater welding suffers from the liabilities of being expensive and time consuming to set up and break down, requiring large logistics support and personnel commitments for success. It interferes with schedules and production on offshore oil producing structures which creates additional associated costs for the customer using these services. In addition, in shipping industry applications space constraints at berths and harbor depth limitations very often make it impractical to use this type of repair solution, with drydocking being a more practical and cost effective long term solution for permanent repairs to ships. As a result, it can be seen that it is desirable for a manual method of providing a small, movable, stable air or gas envelope at the weld pool, effectively creating a miniature hyperbaric welding chamber to facilitate cooling stability, and to create a more controllable welding environment for the operator, thereby creating a repeatable method which is environment tolerant, capable of achieving high success levels regardless of sea state and underwater visibility conditions.

The concept of a miniature hyperbaric chamber is feasable in part because as a weld is being made, the heat affected zone in the substrate around the weld is ordinarily hot enough to easily vaporize and evacuate moisture, humidity and its source gases, and able to maintain this condition as long as the welding process continues. If there is an adequate flow of shielding gas in the interior of the enclosure, porosity can be reduced or eliminated by physically removing hydrogen and other contaminant gases from the proximity of the weld, thus preventing the introduction of these gases into the weld. Also, both porosity and intergranular cracking can be greatly reduced or eliminated if the immediate area around the weld is insulated from the thermal effects of seawater by an air or gas filled enclosure. It is apparent that a movable air filled box or enclosure incorporated with a torch configuration which permits the required dexterity and torch control by the welder will provide increased quality control over the welding process and demonstrate a higher quality of weld on a consistent basis. Recent research into underwater wet welding using traditional, unprotected flux core and MIG torches have met with disappointing results, due to the effect that sea water has on shielding gas flows as they leave the torch. Typically, the gas flow starts by creating a bubble at the bottom of the torch cup, and enlarges the bubble as gas continues to flow into it. Since air has a much lower coefficient of friction than water the gas bubble will grow more quickly than the bubble can rise through the water to break away from the flow. As the bubble gets larger and breaks away from the torch a flow of water rushes in to fill the void left by the exiting bubble at the bottom of the torch cup. This sequence happens regularly about 10–15 times per second, and creates a great deal of localized pressure fluctuations and water movement at the torch cup, which result in arc instability as well as thermal, electrolytic and magnetic instabilities in the weld pool. The resultant welds have been inconsistent in quality and also suffer from the classic physical problems mentioned above. But because plasma arc, flux core and MIG processes offer the promise of not having to change rods underwater, as is the case with shielded metal arc welding methods, research and development of these processes for underwater applications continues, as does research into advancements of shielded metal arc techniques.

At the Offshore Technology Conference, sponsored by the Marine Technology Society in Houston, Tex. on May 1 thru 4, 1995, an underwater flux cored arc welding system was unveiled by the GKSS research organization headquartered in Geesthact, Germany. The system features a submersible wire feeding unit which is enclosed in a pressurized waterproof enclosure which also contains a roll of flux cored wire which is fed thru a relatively short length of torch lead into a torch and thru a contact tip in a conventional torch cup and nozzle arrangement on the torch.

Also, at the Underwater Intervention '96 trade show in New Orleans, La., on Jan. 15 thru 17, 1996, a similar but floodable version of an underwater drive roller, and flux core torch, for which a patent application is believed to have been filed, was unveiled by Broco, Inc., Rancho Cucamonga, Calif. This domestically manufactured system is similar in design to the GKSS system, except that it does not incorporate the drive rollers, feed wire and electronics in an underwater enclosure but instead has each of the electronics components suitably waterproofed with the mechanical components accessable to the diver for wire changes or adjustments underwater if required.

Both of these systems are small enough to easily be carried underwater by a diver to a work site, making them portable. These systems offer the capability of having a relatively large quantity of feed wire at an underwater location very near the torch. This prevents or minimizes problems associated with forcing flexible feed wire thru long lengths of sheathed torch conductor which would otherwise make it impractical to use the MIG or flux core welding method at great depths or at distant locations underwater. Both systems allow divers to use MIG and flux core torches underwater at depths up the limit of human physiological capability, although they still do not address the underlying problems mentioned above associated with the underwater environment for welding applications. They do however, provide a technology platform for combining with the present invention for underwater applications.

A recent relevant and important invention has been disclosed in U.S. Pat. No. 5,329,089, entitled plasma arc welding weld imaging, by McGee et al. This disclosure shows a plasma arc torch which has an optically clear torch cup made of fused quartz glass with an outwardly projecting lip thru which a fiberoptic scope is coupled for viewing the weld. The fiberoptic scope used has an outer ring of light emitting fibers which carry light from a remote source to illuminate the weld for inspections in between welds. The inner fibers of the scope are coupled to a lens and transmit visual images of nearby illuminated objects to a remotely located TV camera. This method of viewing the welding process is inherently sound in that the imaging optics are blocked from direct contact with the arc and arc products by the transparent torch cup, which has a constant flow of shielding gas flowing along its inner periphery to assist in keeping it cool and preventing arc spatter products from attaching to the torch cup or damaging the optics of the fiber scope. The high relative cost of fiber scopes to date has made it impractical and not cost effective to replace optics at regular intervals in these scopes because of weld induced defects such as spatter. As a result, this is a reasonable on line imaging alternative for the plasma arc method cited. But it also suffers from the limitations of not being adaptable to the changing and unpredictable conditions of underwater welding which often require larger than usual flows of shielding gases for blow drying wet surfaces without creating mixing of the shielding gases with atmospheric and exhaust gases. McGee clearly states that orfice gas flow rates for plasma arc (paw) welding are critical and must be closely controlled in the keyhole mode, even though it mentions that most plasma arc torches have incorporated auxiliary shielding gas sources to avoid contamination of the weld pool. As shown in the drawings for this invention, both the electrode and interior of the torch cup are furnished with flows of shielding gas, with the interior surfaces of the torch cup serving to direct the auxiliary gas supply flow. Flow characteristics thru both of these structures are influenced greatly by changes in the gas pressures and flow rates of the shielding gas, and neither source can have the gas flow rate increased without interfering with the flow characteristics of the other because they are enclosed together in the torch cup without any partition to isolate the flows from each other. The invention does not meet the requirement or have the capability of adding significantly higher gas flows for evacuation of water, water vapor, or contaminant gases from around the weld pool using either the existing or auxiliary ducting sources without adversely influencing weld quality making its structure deficient and not well adapted to underwater welding using miniature gas filled enclosures.

What is required for underwater welding applications, and is missing from the invention shown in the disclosure is an auxiliary gas flow device that is physically isolated from the shielding gas flow around the electrode, which will allow larger gas flow rates without adversely affecting the shielding gas flow characteristics and hence weld quality during less than ideal working conditions, which is the norm, rather than the exception in underwater welding applications.

In addition, heretofore no method has been proposed for a method of viewing welding processes taking place inside an enclosure without moving the torch and enclosure out of the way, such as with an enclosure which can permit direct viewing by incorporating a viewing port or window, or of adding additional shielding gas to the process without interfering with the stability of the arc or shielding gas flow patterns. A novel method of viewing the weld as it is being made is hereby disclosed by the employment of a miniaturized TV camera, borescope, infared sensor, or fiberoptic borescope which either penetrates or is mounted inside an enclosure to capture a real time image or continuously image the weld in progress inside of a robotically or manually movable enclosure. This can be connected to an image processing system which delivers a real time video image to a cathode ray tube monitor or other viewing device such as a flat panel display attached to or in close proximity to the diver to view the welding process.

In addition, in many, if not most cases, fit-up of structural components for underwater welds is less than optimal, requiring many passes of the electrode over the groove to close the weld for later passes, which some welders approach by using a weaving technique to bridge the large gap. This problem is further complicated by the rapidly cooling heat affected zone which interferes with adequate penetration of the weld into the substrate and promotes uneven heating of the structural components, creating warping and deformations which are difficult or impossible to correct underwater. A heretofore unmet need in the advancement of underwater welding is for a torch assembly which can evenly and concurrently heat both surfaces to be joined.

Similar problems in nuclear welding applications have been dealt with when welding large pressure vessels by the employment of parallel and adjacent tig torches which are both adjusted so that each torchs' electrode contacts the mating surface of one of the two surfaces to be joined. In this application, each torch deposits an adjacent bead which both flow and are joined together. This choice of solutions prevents uneven heating of the substrate by dedicating one torch to each surface and offers the capability of deposition of large amounts of weld material in a single pass. It can be seen that a need exists for a torch configuration which will be capable of simultaneously contacting and depositing weld material onto both mating surfaces to be joined in underwater welding applications. A novel method of achieving this requirement is hereby disclosed by the utilization of two parallel underwater torches which are enclosed together in a miniature gas filled enclosure.

SUMMARY OF THE INVENTION

It is therefore an object of the present invention to provide higher quality welds and repeatability of quality in both manufacturing, industrial, and underwater welding applications.

It is another object of this invention to provide a method of evenly heating both materials to be joined concurrently, to optimize penetration, to offer the capability of high metal deposition rates if so desired, and to help prevent warping and deformation of the joined materials.

Another object of this invention is to enable welding in zero visibility conditions underwater, where suspended particulate matter completely prevents or interferes with viewing the welding process.

Another object of this invention is that of diagnostic assesments of weld quality as the weld is being made, using acoustic emissions sensors as on line sensors.

Another object of this invention is to provide a dry, stable environment for the welding arc and to successfully exclude porosity causing vapors and gases, and to limit thermal conductivity in the substrate during the welding process.

Another object of the present invention is to provide a welding enclosure which can be robotically controlled and manipulated for robotic welding applications, both for underwater and above water industrial and manufacturing applications.

Another object of this invention is to provide a highly mobil and easily manipulated miniature, hyperbaric, stabilized environment for the welding process which enhances weld quality, weld inspections, and viewability of the weld in process.

Another object of this invention and an advantage over the prior art is the provision of a miniaturized dry environment for a shielded metal arc welding process, with a clearly visible arc in poor underwater visibility conditions, and enabling easily changed rods in such conditions.

Another advantage of the present invention over the prior art is in its ability to exclude exhaust gases and porosity causing vapors from the immediate area of the weld by the inherent design of a small enclosure employing high shielding gas flows, resulting in less weld contamination from unwanted gases.

Other objects and advantages of the present invention will become apparent from time to time throughout the specification and claims as hereinafter related.

BRIEF DESCRIPTION OF THE DRAWINGS

FIG. 6A is a side view of still another underwater embodiment of the present invention, showing a single torch in an enclosure, and FIG. 6B shows details of the construction of the swivel used.

FIGS. 7A and 7B show details of the seal configuration used in the present invention, and FIGS. 7C and 7D show details of the embodiment shown in FIG. 6.

FIG. 8 is a side view of another underwater embodiment of the present invention which shows a single torch in an enclosure.

FIG. 9A is a side cutaway view of still another underwater embodiment of the present invention, showing a single shielded metal arc torch with an enclosure appended to it, with a section of the inner enclosure and hollow rubber seal removed to show details of construction.

FIG. 9B shows another embodiment of a shielded metal arc torch with a telescopic enclosure appended to it.

FIG. 9C shows an end cross sectional view of another seal configuration attached to a lower enclosure body.

FIG. 10A is a cutaway side view of the preferred underwater embodiment of the present invention, and FIG. 10B is a top view of the enclosure cap of this embodiment.

FIGS. 23A and 23B are side and plan views, respectively, of an underwater or terrestrial wheeled embodiment of the present invention, showing the nozzle of either a cutting or a welding torch enclosed.

DESCRIPTION OF THE PREFERRED EMBODIMENTS

A description of the construction and operation of the present invention follows. The present invention provides a method of achieving high shielding gas flow rates at the weld without the associated problem of atmospheric air mixing with the shielding gas, resulting in higher quality welds than using present technology in either an atmospheric environment or in a wet welding environment underwater.

In terrestrial industrial applications, an embodiment specifically adapted for this will also capture the exhaust gases and transport them to a suitable disposal or treatment system for removal of contaminants and release into the atmosphere, thereby preventing debilitation in the welder caused by exposure and breathing of welding fumes. The disclosed invention may be used in robotic or manual industrial welding applications where exhaust gases are collected at the enclosure cap and disposed of in an environmentally acceptable way, and provides a controlled environment where welds can be remotely monitored via real time television imaging and on line acoustic emissions testing. The present invention provides a controlled welding environment where heretofore unknown variables, such as ambient magnetic fields, temperature, and humidity may be considered, evaluated, and dealt with as the welding operation progresses. All of the underwater embodiments may be used in terrestrial applications if so desired. In addition, a telescopic enclosure such as that shown in FIG. 9B may be substituted for any of the other enclosure designs shown in this disclosure without departing from the spirit of the invention.

Figure 1:
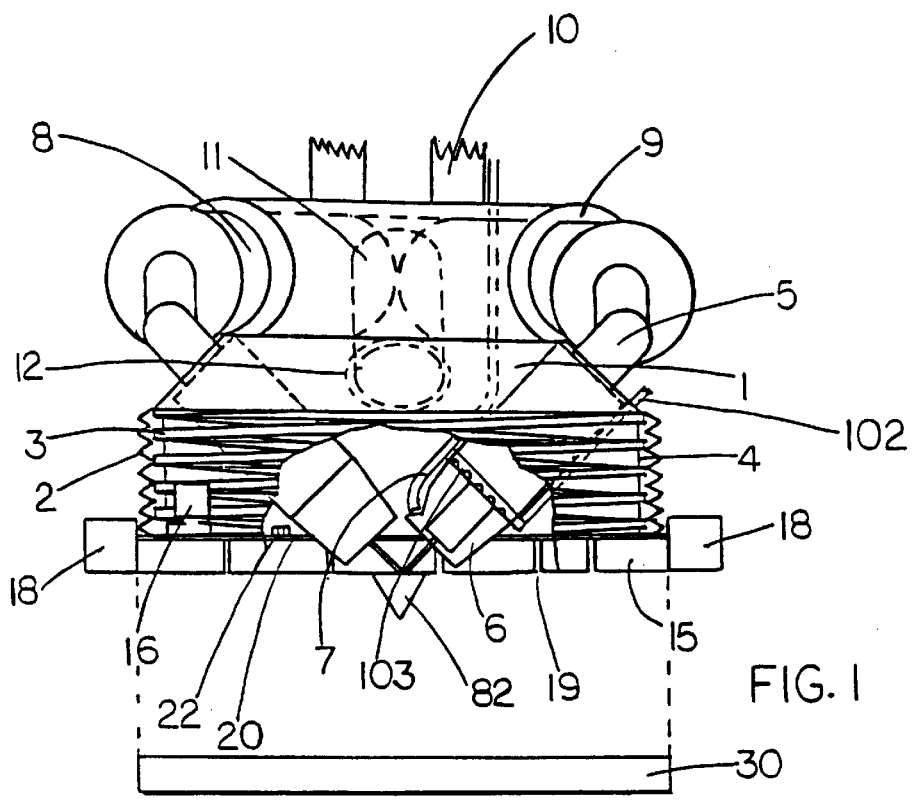
FIG. 1 is a cutaway side view of one underwater embodiment of the present invention, showing two torches in an enclosure.

Turning now to the drawings, FIG. 1 shows a cutaway view of one embodiment of the present invention showing two flux core or MIG torches inside an enclosure, where an enclosure cap 1 is attached to an outer enclosure body 2, which encloses a spring 3. The enclosure cap can be made of brass, which is the preferred material, or titanium, or suitably insulated composite material such as kevlar or carbon fiber. In the preferred embodiment the spring is made of stainless steel, and has a very light compression pressure, on the order of 2 to 3 pounds. Inside this spring is found an inner enclosure 4, which is made from woven kevlar fabric in the preferred embodiment, or alternatively woven fiberglass cloth and is flexible, allowing the enclosure to bend, tilt, compress or expand as the diver requires. In an alternate embodiment which is not shown, the inner enclosure is located outside of the spring and bonded to it. The above assembly is appended to a torch 5, of which there are two in the same enclosure, as shown. Attached to the nozzle of the torch is a gas ring 103 which has attached an auxiliary gas duct 102 and appended to the gas ring is a clear torch cup 6, which has a fiberoptic borescope 7 attached for viewing the weld. The gas ring has holes around its periphery to permit the flow of auxiliary gas from a remote source, for purposes of keeping the enclosure evacuated of water when an imperfect seal exists and to assist in drying the surface to be welded. The clear torch cup is secured to the gas ring using conventional methods for affixing glass to metal. The fiberoptic borescope has an integral lighting source in which a remotely located light transmits a light signal thru peripheral fibers in the fiber bundle which exit the bundle at the optics and illuminate the weld for inspections or for damage assesments in low visibility underwater conditions in between welds. In an alternate embodiment, which is not shown, the clear torch cup is made from a material transmissive of infared wavelength light, and the fiberoptic borescope is made from fibers which also transmit infared light, with an infared sensor remotely located at the base of the fiberoptic scope. The two torches are held together by a clamp 9 which encloses the torch handle 8 of each torch. The clamp is an ordinary clamp, which may be affixed by bolts, or other conventional fasteners, and may be made of plastic which is the preferred material of construction for this element, or any metal such as brass or aluminum. A torch lead 10 supplies power for the welding process. A TV camera 11 may be attached to the enclosure cap at a window 12, for viewing the welding process if it is so desired. In this embodiment, the camera is angled down at a 45 degree angle from the periphery of the cap to permit viewing of the weld from above and slightly to the side, enabling the diver to clearly see the weld progress and metal deposition rate. An auxiliary 12 volt DC lighting source which is not shown can be also incorporated into the cap to allow viewing during inspections or when not welding. Suitable waterproof miniaturized TV cameras for this purpose are available from Elmo Mfg. Corp., New Hyde Park, N.Y., or Chinon America, Inc., Mountainside, N.J., and 12 volt DC waterproof miniaturized lights are available from Deepsea Power and Light, San Diego, Calif. Alternatively, a suitably waterproofed miniature TV camera may be mounted inside the enclosure if a clear lens or or other suitable method of blocking weld spatter is placed between the camera lens and the torch electrodes. Depending upon the location and proximity to the electrode an auxiliary gas flow directed at the camera for cooling may be required for this arrangement to prevent camera overheating.

In an alternate embodiment, a suitable lens transmissive of infared light is substituted for tempered glass in the window, and an infared sensing TV camera or sensor is substituted for the visible light sensing camera suggested here.

It should be noted that if nuclear welding applications are anticipated where the camera is to be subjected to high radiation, the camera used should be radiation tolerant, and cameras containing new vidicon imaging tubes might be chosen instead of charge coupled devices. If this is the case, the window should be tinted to prevent white outs, or blooming effects which interfere with the imaging process. A #6 green tinted welding lens will work for most of these applications, however some experimentation may need to be done to optimize the specific design configuration of the enclosure and window, distance from the window to camera lens, etc.

The enclosure is held to the metal surfaces being welded by an electromagnetic base 15, of which there are several along the front and rear of the enclosure, as shown. The power to the electromagnetic base is controlled by a switch 16, which is ordinarily in the closed, or operating position. To break the current flow to the electromagnetic base, the switch is depressed by the diver, who then moves the enclosure to a new location. The electromagnetic base is powered by a separate direct current source from the torch, and has a separate power supply wire from the torch leads connecting it to a remotely located power supply. To prevent the outflow of large amounts of gas or air, a rolling seal 18 is provided on each side of the enclosure. The electromagnetic base magnets are each held to a flexible plate 20, by a bolt 22, and each having a space 19 between them to enable flexing and bending of the base to conform to curved surfaces. The flexible plate is made of thin gage stainless steel. This configuration makes the enclosure adaptable to curved surfaces, either concave or convex in shape by the flexing action of the flexible ring to conform to the curvature. A flexible skirt 30, made from NOMEX (tm), woven, coated fiberglass fabric, or other suitable fabric is glued to the exposed side surfaces of the electromagnetic base to further prevent the escape of gas or air from the enclosure, using silicone seal, neoprene cement, or other suitable adhesive. The shape of the enclosure can be square, rectangular, oval or any other suitable shape to suit the welders preference. Appending from the bottom of an electromagnetic base magnet which is along the axis of the weld is a V-groove seal 82, which seals the groove to prevent the outflow of water or inflow of water during the welding operation.

The design of this embodiment for underwater applications is unique because there are two separate torches in the enclosure which can each separately but concurrently heat both sides of the V-groove. As a result, the problem of uneven heating of the two sides of the V-groove by one torch moving repeatedly from side to side is reduced or eliminated, producing better stress distribution in the finished weld and more even heating of the heat affected zones around the weld. This is demonstrated by significantly less bending and warping of the metal sections as the weld progresses. Current and power distribution to the torch electrodes is accomplished in the conventional manner used in the welding of pressure vessels for nuclear reactors and will be known by those of average skill in this art.

Figure 2:
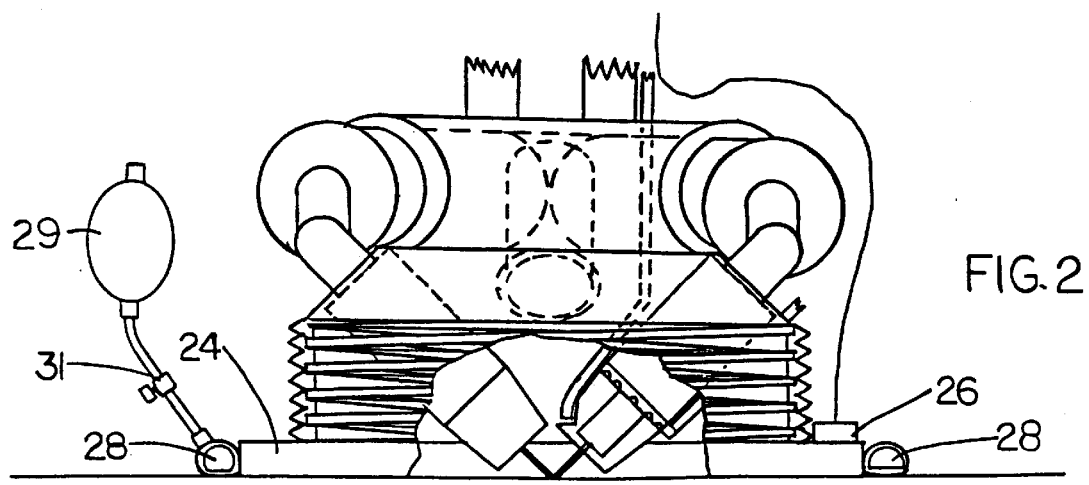
FIG. 2 is a cutaway side view of another underwater embodiment of the present invention, showing two torches in an enclosure.

Referring now to FIG. 2, another similar embodiment is shown in which an added acoustic emissions sensor 26 is attached to a magnetic base 24, which is cylindrical in shape, and is a monolithic permanent magnet which has a hollow rubber seal 28 attached along its periphery to form a seal to prevent air or gas from flowing out of the enclosure past the magnet. In this embodiment, the magnetic base is inflexible and will conform to surfaces which the seals will seal around, and is oriented with its north and south poles aligned along the axis of the weld to prevent or reduce arc blow. The hollow rubber seal is sealed and water filled in the preferred embodiment, and has a hose and a rubber bulb 29 attached for adjusting the pressure in the seal with water under pressure by manually pumping up the bulb. The hose also has along its length, a relief valve 31 which if actuated releases pressurized water from the hose and seal, allowing the seal to collapse if so desired. This arrangement allows any of the embodiments in this disclosure to be adapted to less than ideal sealing situations by adjusting the internal seal pressure to suit local conditions and sealing requirements. Bulbs used with combustible gas and oxygen indicators used for air sample testing by certified marine chemists are suitable for this purpose. U.S. Pat. No. 2,786,350, assigned to Bacharach Instruments, Inc., discloses a combustible gas indicator with a suitable bulb for this use. In an alternate embodiment, an ordinary air bulb used with home blood pressure monitoring cuffs can be used for pumping water instead of air into the seal. Most already have a pressure relief valve in line, which will work satisfactorily for this purpose. The seal has a fitting for connecting to the water hose, and suitable fittings for this purpose may be purchased from the seal manufacturer, Presray, Inc., Pawling, NY. In an alternate embodiment which is not shown in the drawings, the seal is connected to a hose which has pressurized water fed from a remotely located water pump. The hose has both a water shut off valve and a relief valve in line to allow adjustments either by the diver or a topside assistant without going to the trouble of pumping a manual pump.

The acoustic emissions sensor is connected to a remotely located processor. Suitable signal processing equipment for this purpose can be purchased from Physical Acoustics Corp., Princeton, N.J. The system has a digital signal processor which can be programmed to ignore emissions and signals in the frequency range emitted by the electromagnetic base magnets if so desired. The sensitivity of the acoustic emissions sensor is partially dependent upon ambient noise levels through which it must discriminate. In this regard, the electromagnetic base is designed to be operated by DC current to reduce environmental noise in the system, and for diver safety. If so desired, an audio signal of the welding process can be converted by a digital to analog converter, then easily transmitted to the divers earphones from the acoustic emissions processor to the divers radio, which will assist the welder in completing a high quality weld by listening to the sound of the weld as he completes it. This type of electrical connection is easily accomplished by those with average skill in the art. Alternatively, a simple 12 volt powered waterproof speaker connected to a conventional signal transmission wire can be mounted inside the enclosure which will provide an adequate electromagnetic interference audio signal of the weld for the diver audio. This signal wire can be connected in parallel circuitry with the divers earphones at the diver communicator terminals as is well known in the art. An additional acoustic emissions visual signal can be provided via a data acquisition system and software which displays a window in the divers visual display screen which will give warning displays or signals when sounds indicating porosity, poor penetration, intergranular cracking, etc., are detected as the weld is being completed.

Figure 3:
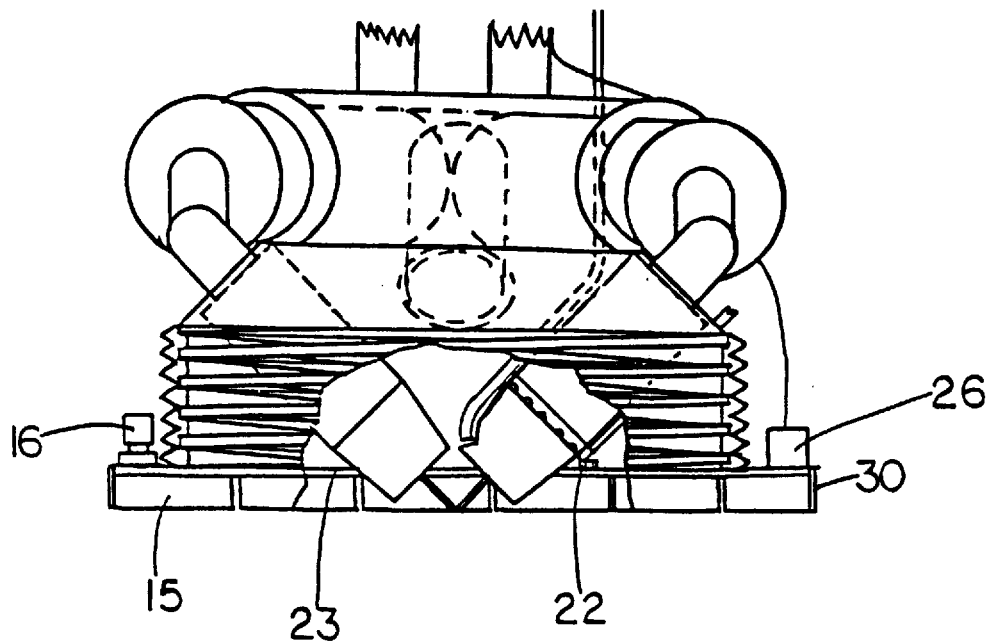
FIG. 3 is a cutaway side view of still another underwater embodiment of the present invention, also showing two torches in an enclosure.

FIG. 3 shows a cutaway view of a slightly different embodiment in which an electromagnetic base 15, of which there are a multiplicity, is attached around the entire periphery of the enclosure to a flexible ring 23, which in this embodiment is circular, by a bolt 22, and have a switch 16 and an acoustic emissions sensor 26 attached to the individual Electromagnetic base magnets, as is preferred. A flexible skirt 30 wraps around the entire periphery of the electromagnetic base and covers the spaces between the electromagnetic base magnets, preventing air or gas from escaping from the enclosure while welding.

The preferred method of imaging the weld is through a fiberoptic borescope, as shown in the drawings. Alternatively, as will be shown elsewhere in this disclosure, miniaturized TV cameras and direct viewing through a window may also be adapted for use with the present invention, and may be freely substituted for any of the embodiments specifying a borescope without departing from the spirit of the invention. The borescope or TV camera is connected to a remotely located signal processor by conventional signal processing means or fiberoptic cable. The signal processor sends a television signal to the divers helmet mounted viewing screen assembly, U.S. Pat. No. 5,420,828, the inventor of which is the incorporator hereof and is incorporated herein for reference. Although this is the preferred viewing method, any method which allows the diver to view a real time image of the welding process while working at the task is acceptable.

Suitable fiberscopes which can be readily adapted to this use are available from Mitsubishi Cable America, New York, N.Y. Radiation hardened fiberscopes with auxiliary lighting in lengths of up to 300 ft are available for this purpose from mitsubishi.

In all of the embodiments shown, the preferred routing for the fiberoptic scope or TV camera signal transmission cable, torch leads, acoustic emissions signal transmission wires, electromagnetic base power transmission wire and all sensor leads are clustered together in a common umbilical and lead to a remotely located surface support console for distribution to the various signal processing and power transmission functions. Alternatively, a submerged fiberoptic modem is connected to each of the sensors and transmits multiplexed signals along a fiberoptic cable to a remotely located signal processor for decoding and distribution to the specific functions.

Alternatively, a waterproof miniaturized ICCD camera may be mounted outside of the enclosure at any convenient location in front of a glass window provided for such purpose, using high temperature silicone seal, brackets, or any other suitable mounting arrangement. It is also possible to mount an iccd camera inside the enclosure for viewing the weld in process. If this is done, the position of the TV camera is important because high localized temperatures may make it advisable to provide a flow of cooling air or gas over the camera enclosure to prevent heat induced malfunctions in the camera. There are several manufacturers of miniaturized cameras which are suitable for this purpose who will be readily known to those skilled in the art. The acoustic emissions sensor and digital signal processing system is manufactured by Pysical Acoustics Inc, Princeton, N.J., And suitable underwater transducers are readily available from them for weld quality assessments and on line testing. Alternatively, a fiberoptic acoustic emissions sensor may be employed which is connected to a suitable remotely located digital signal processor designed for this purpose.

Figure 4:
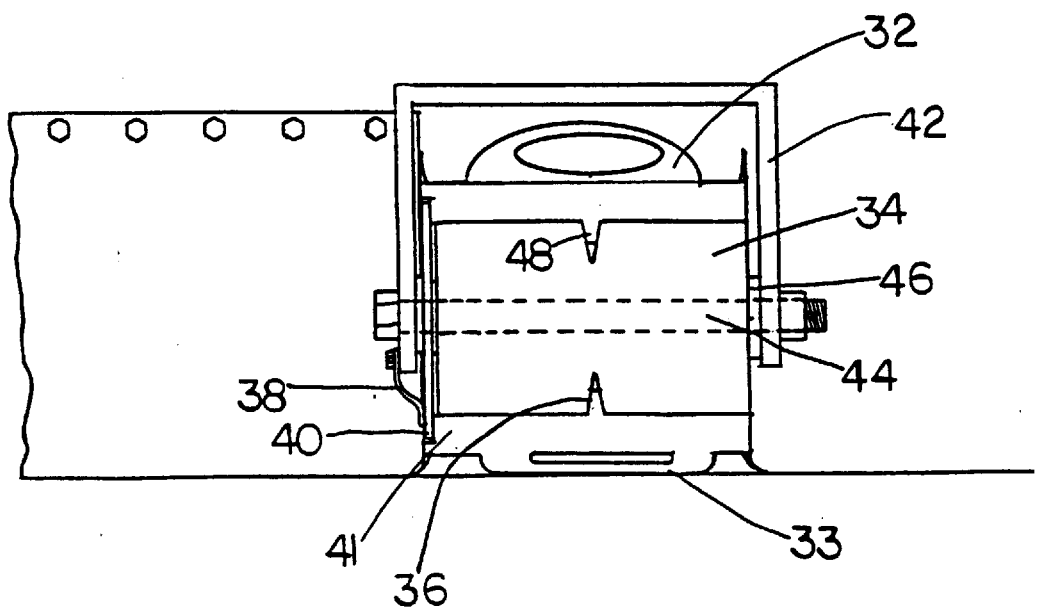
FIG. 4 is a cross sectional view of a rolling seal assembly of the present invention.

FIG. 4 shows a cross sectional end view of the rolling seal where a hollow tread 32 rolls on a roller 34 and becomes a compressed tread 33 as it rolls over a surface. A track alignment groove 36 in the roller aligns a tread tooth 48 on the roller and prevents the tread from slipping off the roller in response to side loads. A spring clip 38 presses against a side plate 40 which rubs against the side of the seal body 41. A roller bracket 42 encloses an axle 44 with a bushing 46. The rolling seal is made from soft pliable rubber such as silicone rubber and can be custom manufactured by any custom rubber products manufacturer such as Presray, Inc. Pawling, N.Y. The rollers are made of stainless steel, or alternatively of plastic such as kevlar or lexan and can also have an electromagnet incorporated in each roller to increase adhesion to ferrous metal surfaces if it is so desired. This rolling seal is a useful sealing method for high friction, rough or uneven surface applications where the seal must be moved frequently, or when the need exists to move the enclosure in a constant, steady movement for an extended time. It will produce adequate to excellent sealing results for this type of application. In an alternate embodiment, which is not shown, the rollers extend beyond the sides of the rolling seal and have a larger diameter, wide magnetic lip at each end which each contact the metal surface being traveled on, producing a magnetic attraction in the rolling seal assembly while still allowing constant rubber seal contact with the substrate.

Figure 5:
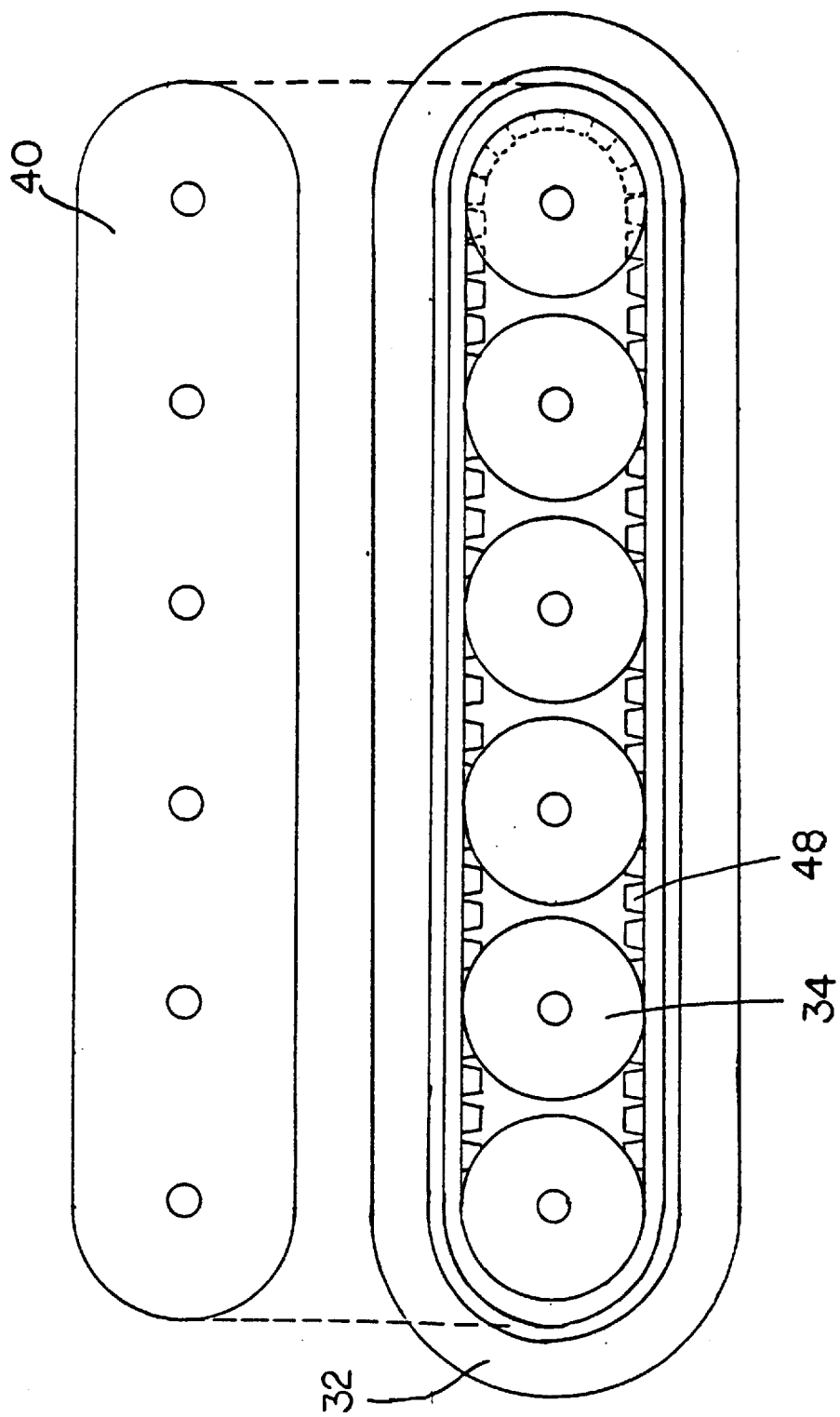
FIG. 5 is a side view of the rolling seal assembly shown in FIG. 4.

FIG. 5 shows a side view of the rolling seal used in some of the embodiments of the present invention, detailing the arrangement of the side plate with the seal and rollers.

Referring now to FIG. 6A and 6B, another embodiment of the present invention is shown with a single torch enclosed in an enclosure where an enclosure cap 1 has a swivel 91 which is attached to an outer enclosure body 2 which encloses a stiffener ring 74, of which several are shown, which surround an inner enclosure 4 which in turn encloses the electrode end of a torch 5. A fiberoptic borescope 7 images thru a flattened surface of a clear torch cup 6, and the enclosure cap is affixed to the torch by means of a clamp 9, and a TV camera 11 can be affixed to look thru a viewing port or window 12 by any suitable means such as brackets or silicone seal the window is enclosed in a fixed, non flexible lower enclosure body 92 which is attached to an electromagnetic base 15 which has attached a switch 16, an acoustic emissions sensor 26, an electromagnet handle 68, a hollow rubber seal 28, and can have an exhaust channel 70 cut into the underside of the electromagnetic base to allow exhaust gasses to be relieved from the enclosure during the welding process if so desired. The swivel is made of brass and in use, the torch may be swiveled around on its axis inside the enclosure as the diver prefers during the welding process by holding the outer enclosure body with his hand while he pivots the torch to one side or the other, without moving the entire enclosure. FIG. 6B shows details of the construction of the enclosure cap 1 with the swivel 91 enclosing it.

FIGS. 7A, 7B, 7C, and 7D show a more detailed description of the embodiment shown in FIG. 6, where FIG. 7A shows an end view of the hollow rubber seal 28 attached to a V-groove seal 82. FIG. 7B shows the same arrangement from the side where the assembly is attached to the lower enclosure body 92. FIG. 7C shows a perspective view of the enclosure with the outer enclosure body removed where the fiberoptic borescope runs through the stiffener ring 74 and the relative position of an electromagnetic base 15 is shown. FIG. 7D shows a slightly different embodiment where the outer enclosure body 2 is affixed to an electromagnetic base 15, and has in it a window 12, with a TV camera 11 which has a right angle lens 78 to permit right angle viewing. Attached to the TV camera is a signal transmission wire 76 and an inner spacer ring 80 which creates a gap for the fiberoptic borescope to exit the top of the enclosure cap.

FIG. 8 shows another embodiment of a single torch inside an enclosure where a torch 5 is affixed to an enclosure cap 1 which has a swivel 91, which is attached to an outer enclosure body 2, and the torch nozzle having attached a gas ring 103 with holes for drying the surfaces, and having attached a clear torch cup 6 with a fiberoptic borescope 7 and a window 12, which has an external TV camera 11, which as shown is a conventional CCD TV camera with optics and image intensifier at the lens, inserted into a borescope with auxiliary lighting at the lens for illumination of the weld when not welding. Suitable borescopes for this purpose are manufactured by Olympus America Inc., Lake Success, N.Y. It may be necessary to use a tinted welding lens in the window for this application, depending upon the scope chosen, the amount of water between the lens and the window, and the distance that the scope is located from the arc to prevent white outs and blooming effects. A number 4 or 6 welding lens gives satisfactory results in most cases. The window is attached to a rigid lower enclosure body as previously shown. At the bottom of the enclosure is a rolling seal 18 on each side, and at the front and back a plurality of electromagnets, as shown in FIG. 1. At the top is an air duct 72 which is connected to a remotely located air or gas source, and a vent hole 84, of which there are a plurality, for evacuating water from the enclosure when welding in the overhead position and to facilitate better viewing conditions by evacuating smoke From the top of the enclosure, which is a location relatively distant from the imaging medium, thereby providing an air or gas flow of visibility enhancing clear gas which carries smoke away from the imaging area around the weld.

Referring now to FIG. 9A, which shows the present invention adapted to a shielded metal arc type torch of the type commonly used for underwater welding, where an inner enclosure 4 is attached at the top to a torch handle 8 and has an electromagnetic base 15 attached at the bottom as a base and a switch 16 on the handle connected to a power source by a power cable 86. The inner enclosure design shown here may be freely adapted to any of the other embodiments shown in this disclosure. At the rear of the torch handle is a torch lead 52 which connects to a remotely located welding machine. In an alternate embodiment the electromagnetic base has another smaller electromagnet 14 attached on each side of the enclosure, of which there are several, each being 90 degrees from the direction of travel and 180 degrees apart, both of which are connected to a remotely located separate adjustable power supply by conventional signal transmission wires. These magnets operate in tandem to provide a magnetic field which guides the arc from side to side in the V-groove as the torch travels, and can be adjusted in their intensity and duration of pulses during the weld to suit conditions, or may be inactivated by a diver's assistant if so desired by the diver. Also at the top of the electromagnetic base is a swivel 91 to which is connected a lower enclosure body 92 which is attached to a TV camera 11 which is connected to a signal transmission wire 76 for transmission of television signals to a remotely located video processor. The TV camera can have an auxiliary lighting source around the periphery of the lens for viewing the weld before and after welding, or for looking at damage in extremely limited or nonexistent underwater visibility conditions. Waterproof cameras with lighting incorporated are widely available and are well known by those with ordinary skill in the art. Alternatively, auxiliary lighting may be introduced via separate lights located inside the enclosure or outside of the enclosure secured to a window or clear port in any of the embodiments shown in this disclosure. At the top of, and inside of the inner enclosure and attached to the torch is found another TV camera, which may be a borescope instead if so desired, and an infared pyrometer 70, which measures the temperature of the substrate as the weld progresses. In alternate embodiments, the infared pyrometer can be relocated on the lower enclosure in a similar mounting configuration to the TV camera shown. A stiffener ring 74, of which there are a plurality, prevents the enclosure from bulging out when it is purged with air in operation, which creates a slight positive pressure internally. Also included in this embodiment is an auxiliary gas valve 104 which is attached to an air duct 72 which supplies pressurized air or gas from a remote source. For overhead welding the top of the enclosure has an exhaust valve 69 which is connected to the interior of the enclosure and vented to the outside ambient environment by an exhaust duct 71. The exhaust valve is opened to permit water to be forcefully expelled by internal air pressure when the auxiliary gas valve is opened, purging the enclosure of water thru the top when the enclosure is inverted for overhead welds. Purging the enclosure using the exhaust channels on the electromagnetic base when the enclosure is in a fairly upright position is accomplished by forcing the water out under the electromagnetic base as the diver holds it against the substrate while the auxiliary gas flow is markedly increased temporarily by manually operating the auxiliary gas valve. There is provided a hollow rubber seal 28 for sealing around the entire periphery of the electromagnetic base, a crossection of which is shown for illustrative purposes with a V-groove seal attached at any location convenient to the welder, and which may also have a hose and rubber bulb assembly as shown in FIG. 2 attached for pressurization if so desired. Also attached to the support base mentioned above is an acoustic emissions sensor 26 with a signal transmission wire 76 which connects to a remotely located signal processor. In an alternate embodiment, this embodiment of the present invention is attached to an underwater oxy-arc cutting torch and offers an advantage in this application by enabling a measure of viewability in otherwise zero visibility underwater conditions.

Referring now to FIG. 9B, which is a side view of a shielded metal arc torch with another embodiment of the present invention attached, and FIG. 9C is an end cross sectional view of another seal configuration attached to a lower enclosure body, where in 9B a telescoping enclosure 21 is attached to a flexible mount 25 which is fixably attached to the head of a torch handle 8. The flexible mount may be attached to the telescoping enclosure and the torch handle by means of brackets, bolts, adhesives, clips or other conventional attachment methods. At the rear of the torch handle is found a torch lead 52, which connects to a remotely located welding machine. The telescoping enclosure is made from any suitable plastic, metal, or other structurally strong, water and temperature resistant material, and can have felt or rubber seals at the sliding joints between the telescoping sections if so desired. The flexible mount is made from gum rubber, silicone rubber, or other suitable flexible material. The sections of the telescoping enclosure are each capable of turning in a circular direction, enabling the torch to be pivoted on its axis while the enclosure is fastened to a substrate, supplanting the need for a swivel. A TV camera 11 is fixably affixed inside the telescoping enclosure to the head of the torch handle, along with an infared pyrometer 70. In addition, other sensors as suggested in this disclosure may also share this mounting location, or along with either of the two sensors shown in the drawing attached to the torch handle may be relocated at the bottom section of the telescoping enclosure in alternate embodiments. An exhaust duct 71 is connected to a exhaust valve 69 which connects to the interior portions of the telescoping enclosure immediately adjacent to the torch handle at the head of the torch, and is used in a similar fashion as in the embodiment shown in FIG. 9A. An auxiliary gas valve 104 is connected to an air duct 72 which supplies gas to the interior of the telescoping enclosure. A switch 16 connects a electromagnetic base 15 to an electrical source by means of a power cable 86, and an acoustic emissions sensor 26 is affixed to the section of the telescoping enclosure immediately adjacent to the electromagnetic base. A hollow rubber seal 28 is connected to the periphery of the electromagnetic base, and a v-groove seal 82 is connected to the underside of the electromagnetic base. In alternate embodiments, or as task conditions require, the v-groove seal may be relocated to a location either at the periphery or underside of the hollow rubber seal, and the hollow rubber seal may be relocated underneath the electromagnetic base if the particular configuration of the work piece permits it.

Referring now to FIG. 9C, which shows an alternate method of securing any of the embodiments shown in this disclosure to a work piece, where a suction seal 73 is attached to a lower enclosure body 92, and has attached a suction tube 107, which for terrestrial embodiments can be connected to a vacuum pump commonly used in industry, and for underwater embodiments may be connected to either a remotely located or a localized water pump. The suction seal is made from flexible rubber such as silicone, neoprene, or gum rubber, and is attached to the side of either a lower enclosure body, electromagnetic base, or any other structure of the present invention which comes in direct contact with the substrate or work piece during the welding or cutting operation by bolts, clips, adhesives or other conventional attachment means. This seal can be configured either as a circular seal around the base of an enclosure or electromagnetic base or can assume any other reasonable form which would be required by specific task requirements. It may also be a straight element, of which there may be two or more on either side of an enclosure, each seal having a closed, sealed end which prevents the inflow of water during the sealing operation. In one embodiment, the suction tube is connected to an in-line bypass valve that is actuated by the diver to release the suction on the seal, enabling movement of the enclosure by the diver.

Figure 9D:
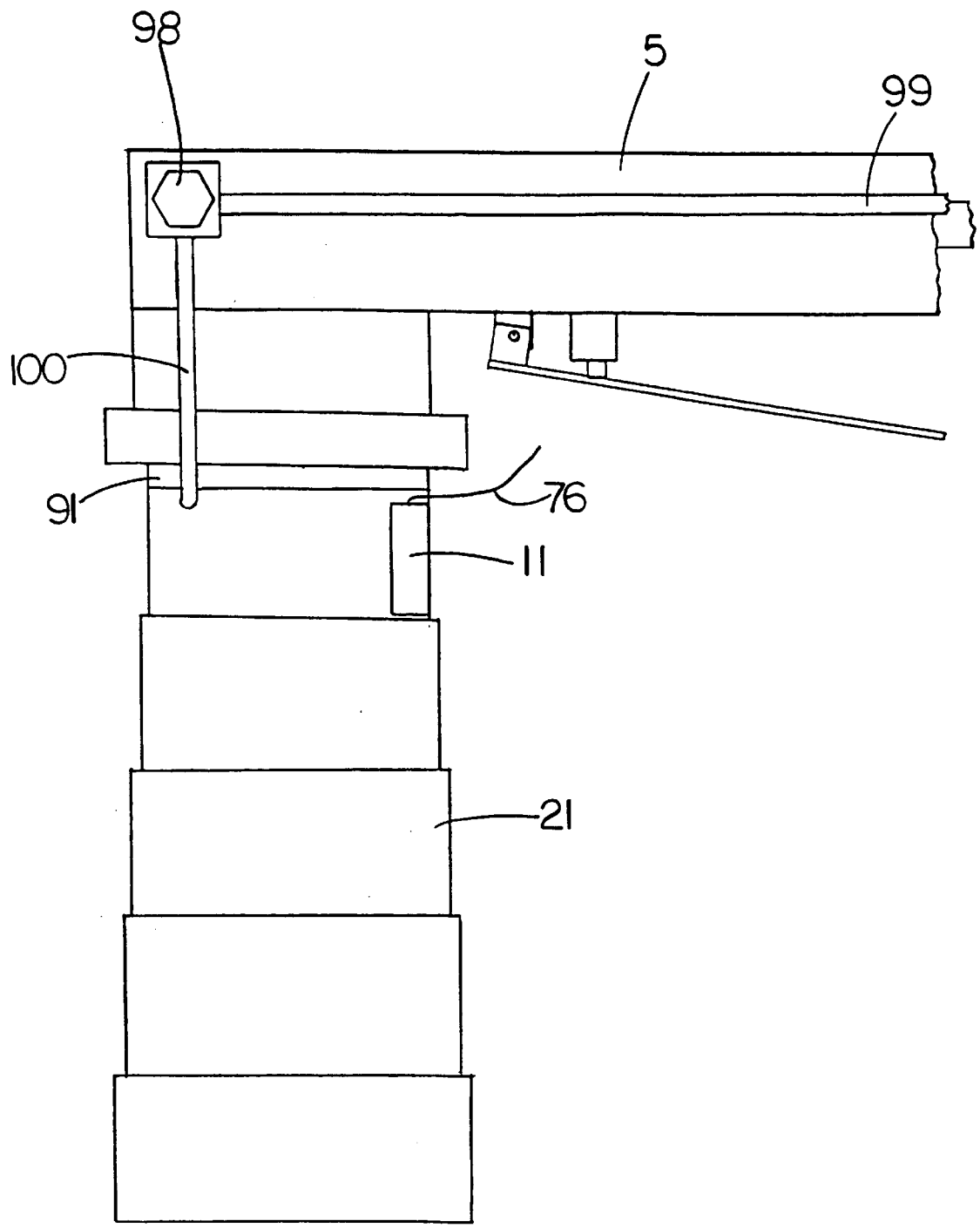
FIG. 9D shows a side view of an underwater oxy-arc cutting torch with an embodiment of the present invention attached to it.

Referring now to FIG. 9D, which shows a side view of an underwater oxy-arc cutting torch, with a telescoping enclosure attached, where an auxiliary water valve 98 which receives a flow of clear water from a an auxiliary water hose 99, which is connected to a remotely located water source, then distributes the flow of water thru a water supply line 100, which can be made from flexible hose, to the base of a telescoping enclosure 21, which is connected at its base by a swivel 91 to the head of a torch 5, and which has in the interior a TV camera 11 which is connected to a signal transmission wire 76, and is used for viewing the underwater cut. In this embodiment, the cutting operation is conducted with the aid of a supply of clear water to enhance and facilitate viewability in otherwise occluded water conditions. This is facilitated by pressing the large end of the telescoping enclosure against the work surface while operating the auxiliary water valve, thereby flooding the interior of the enclosure with clear water. The embodiment is provided with a swivel to facilitate turning of the torch head without turning the telescoping enclosure to replace cutting rods periodically, and the water supply line has sufficient extra length, about 10 cm, to accommodate the movement along the threads of the torch head for this activity. In alternate embodiments a flexible mount may be incorporated at the swivel attachment to the torch head or telescoping enclosure. This telescoping enclosure design is particularly well adapted to be affixed to the front of an oxy-arc underwater cutting torch, and can enable greater visibility and viewability in poor to zero visibility conditions by creating a water, air, or gas filled environment in the enclosure. In an alternate embodiment which replaces the water supply in the auxiliary water hose with gas or air, the high flow rates of gas into the enclosure at the head of the torch creates a rapidly moving flow toward the opening at the base of the telescoping enclosure, producing a shielding effect for the camera or borescope, which may also be used in addition to or replacing the TV camera in an alternate embodiment, from the sparks and dross produced by the cutting operation.

Referring now to FIG. 10A and 10B, which is the preferred embodiment for the present invention, in FIG. 10A we find a cutaway side view of a single welding torch with the nozzle and tip enclosed in an enclosure with an electromagnetic base 15 where an enclosure cap 1 has a swivel 91 which is affixed to an inner enclosure 4 which is surrounded by a spring 3 along its length and attaches to lower enclosure body 92 which is attached to an electromagnetic base 15 at the bottom. Penetrating the enclosure cap is a vent hole 84, of which there may be a multiplicity of holes if so desired, and also shown is a ring handle 108. The enclosure cap also has penetrating it a humidity sensor 128, a fiberoptic temperature sensor 130, a fiberoptic pressure sensor 132, and an auxiliary gas duct 102 which is connected to an auxiliary gas valve 104 which is located on the torch handle 8. Immediately above the enclosure cap is a conductor tube swivel 60 which allows the torch nozzle and cup to be pivoted or reoriented with respect to the diver's position as he desires. At the termination of the auxiliary gas duct is found a gas ring 103, which can be concentric and has multiple downward pointing orfices which direct the flow of gas along the sides of the clear torch cup to the work surface around the periphery of the torch cup. This arrangement makes it possible to blow dry a work surface prior to commencing welding operations, and allows the augmentation of the normal shielding gas flows exiting from inside the torch cup with additional gas from this outside source without adversely interfering with the flow pattern of the shielding gas exiting the torch cup. In addition, this structure has the effect of creating a fast moving flow of gas or air over the outside surface of the torch cup, which helps prevent the buildup of weld spatter and dross on this optically clear element, and helps keep the imaging area in front of the fiberoptic scope free of smoke, both of which enhances the viewing process and extends the time between torch cup cleanings. At the periphery of the top of the enclosure cap is shown a ring handle, used for moving a sliding ring which meters the exhaust gas flows from the enclosure to suit the preferences of the welder. Attached to the sides of the gas ring by a bracket is an electromagnet 14, of which there are two which are cylindrical in shape, which is the preferred embodiment. The core of each electromagnet is ceramic and the windings are copper wire which is insulated with waterproof ceramic insulation for high heat conditions in the range of 400–500 degrees F. The magnets are each wound identically around the circumference, so that their poles are oriented towards the ends of the magnet closest to the arc, specifically influencing the arc during the welding operation. They are oriented at 45 degrees in the preferred embodiment, but may be oriented at other angles to suit specific conditions. In an alternate embodiment there may be more or less magnets attached, such as having four opposing magnets in both the X and Y orientations with respect to the weld which can assist in guidance and dwell time of the arc in the lengthways orientation of the weld if so desired. The magnets can be operated using AC or DC current and typically use 15–20 watts of power each, although much higher power levels can be used to counteract arc blow conditions when required using larger power amplifiers. These magnets are shown configured opposing each other at right angles to the direction of the weld. However, more or less magnets may be attached in appropriate locations if so desired to suit specific conditions which may require different orientations to prevent arc blow or to counteract other problems. The gas ring is designed so that the magnets each have a directed flow of shielding gas from an orifice 105 in the gas ring aimed at the electrical windings to enable cooling during high current consumption periods, thereby reducing or eliminating high internal heat in the magnetic windings and core. Each magnet is separately connected by conventional signal transmission wires to a remotely located synthesized function generator and a variable power supply which provides the signals to produce synchronized varying magnetic fields using the two electromagnets. In an alternate embodiment, the magnets are attached to the outside of the enclosure or lower enclosure body instead of being directly attached to the torch and manipulate the arc from outside the enclosure.

The torch 5 has a clear torch cup 6 and a fiberoptic borescope 7 included for illumination and viewing of the weld process. Attached to the electromagnetic base is a switch 16 connected to a power cable 86 which supplies power to the electromagnetic base. Also affixed to the electromagnetic base is an acoustic emissions sensor 26 with a signal transmission wire 76 attached. This signal transmission wire sends signals to a remotely located processor for processing. Around the entire periphery of the electromagnetic base is a hollow rubber seal 28 which may have a V-groove seal 82, of which there may be one or more attached at any specific location or locations on the hollow rubber seal, as the welder prefers. In an alternate embodiment, the V-groove seal is attached to the electromagnetic base, immediately adjacent the hollow rubber seal for a more rigid attachment. The hollow rubber seal can also have attached a rubber bulb and hose for inflating it, as shown in FIG. 2.

The pressure sensor in the preferred embodiment is a differential sensor which senses the difference between the interior pressure of the enclosure and that of another exposed portion of the sensor immediately adjacent. The pressure difference is normally only ¼ to ½ pound and major departures from these indicate an obstruction of the exhaust or an incomplete seal of the hollow rubber seal, with a potential water intrusion into the weld area. A suitable combination fiberoptic pressure and temperature sensor, easily adapted to the interior pressure sensing and temperature measuring application is found in U.S. Pat. No. 4,988,212 by Sun et al. It is also designed for vapor pressure sensing applications and is easily adaptable to the humidity sensing application. As a sensor for this purpose it can be easily incorporated into the present invention to detect humidity levels in the exhaust gas stream as it exits the enclosure. The sensing element protrudes through the enclosure cap with the enclosure of the sensor being secured in a rigid position to the enclosure cap by conventional fiberoptic cable securement methods while the deformable portion of the sensor is exposed to the interior pressure of the enclosure. The temperature sensor in this embodiment is the invention of the same sensor as mentioned above, U.S. Pat. 4,988,212 by Sun, and which, in an alternate embodiment can be incorporated with the pressure sensor into a single sensor. This sensor senses the temperature of the exhaust gas stream which indicates the flow rate thru the enclosure, which is a function of the integrity of the hollow seal at the enclosure base and of the quantity of gas actually exiting the enclosure at the top, instead of under the hollow rubber seal. It is an important reference to use in gaging the overall effectiveness of the welding operation by looking at the consistency of the temperature readings over time. Consistent readings with little fluctuation suggest a consistent seal on the substrate with little water intrusion, indicating low levels of hydrogen imbrittlement and porosity. In an alternate embodiment, a miniaturized quartz pressure differential sensor is attached to the enclosure cap for the pressure measurement function.

In addition, an on-line humidity sensor which senses water vapor in the atmosphere of the enclosure is of value to the diver when choosing an optimal auxiliary gas flow to minimize water intrusion for specific applications. The accurate monitoring of the levels of humidity in the gas stream gives accurate information about the amount of water vapor contaminants available at the weld site which can directly influence the amount of porosity in the weld. This sensor system can be incorporated into the present invention with a visual readout on the viewing screen to guide him in this process, and will serve to warn of changing conditions, such as surface roughness changes on the structure or widening of the gap in the V-groove at the front of the enclosure and flooding outside of the TV camera's field of view by indicating increased humidity levels as the welder progresses along the V-groove. In an alternate embodiment, the capacitive humidity sensor of U.S. Pat. No. 5,408,381 by Thoma et al is adapted to the present invention by conforming and inclusion into the interior side of the lower enclosure body with a signal transmission wire connected to a remotely located signal processor. In another alternate embodiment, a waterproof, solid state electronic humidity sensor is mounted adjacent the interior of the enclosure cap at a vent opening. Suitable sensors of this type are available from General Eastern Instruments, Woburn, Mass.

There is another requirement for remote sensing of the substrate as it is being welded to remotely monitor the temperature of the heat affected zone to insure that it remains uniformly heated throughout the weld, thereby preventing or minimizing intergranular discontinuities, deformations and porosity problems. This is best accomplished by remote infared sensing techniques using fiberoptic cables. A suitable fiberoptic remote sensing two color infared pyrometer would sense the surface temperature of the metal substrate enclosed by the enclosure as the weld progresses, and provide a near real time read out. A system which can easily be adapted to this temperature sensing application after suitable waterproofing of the optics is the model IPP-2000 In-Flight Particle Pyrometer, available from TAFA Inc., Concord, N.H. Alternatively, a wide range of infared sensors are available for this application after suitable waterproofing of components. In the preferred embodiment, a computer based waveform recorder outputs signals to a nearby computer which processes the signals for displaying real time visual data to the diver, showing readouts from any or all of the on-board or nearby sensors. The signals are processed by a computer before sending a video signal to a remotely located flat panel display available for viewing by the diver. In an alternate embodiment, an acceptable data acquisition system for monitoring and recording the readings from the ambient monitoring functions described here is the data acquisition system DAS-1600 which is available from TAFA Inc., Concord, N.H., USA. It is capable of displaying a visual image of real time graphical depictions of each parameter, which may be digitized by a video processor and superimposed on the visual image which is displayed to the diver as he is welding.

It should be noted that the power cable supplying power to the switch on the electromagnetic base is a separate circuit from the torch leads, and derives its power from a remotely located separate power source from the torch leads. The torch leads cannot successfully be tapped for power for this purpose. Doing so creates the possibility of a dead short between the electromagnetic base and the steel substrate, effectively instantly welding it to the work surface upon first contact if a short circuit in the windings evidences itself.

FIG. 10B shows the top of the enclosure cap as viewed from above showing the enclosure cap 1 with a vent hole 84, of which several are shown at four distal equidistant locations on the cap, a sliding ring 106 which pivots around an axis on the top of the enclosure cap, a ring handle 108 for manually moving the sliding ring, and a metering slot 110 in the sliding ring. This slot is tapered to allow selection of exhaust gas flow rates and internal pressurization by turning the ring to a desired setting based upon the specific circumstances and environmental conditions in which the diver must complete the weld. The ring is held against the enclosure cap by a tab 112, of which four are shown for illustrative purposes. The tab is spring loaded and applies constant downward pressure on the sliding ring. Other methods of holding the sliding ring to the cap may be used, as long as the ring is capable of being moved by the diver to reasonably accurately control the flow of gas exiting the enclosure. It is recommended that a non galling material such as brass be used as the construction material of choice for the enclosure cap to prevent problems in operation. Additionally, it is recommended to prevent galling that all metal to metal sliding or rubbing surfaces be coated with a low friction coefficient thermal spray such as NEDOX (tm), which is available from General Magnaplate Corporation, Linden, N.J. The shape of the enclosure in the drawing is round, and has a round electromagnet at its base. This configuration is shown in the drawing as the preferred embodiment, although a departure in shape to square, triangular, rectangular or oval can be used in combination with cone or reverse cone shaped tapers to suit specific applications. These alternative enclosure shapes can be combined with the use of several parallel straight or curved magnets at the base of the enclosure on either side instead of a peripheral circular magnet if conditions require it, or if it is preferred by the operator.

Figure 26:
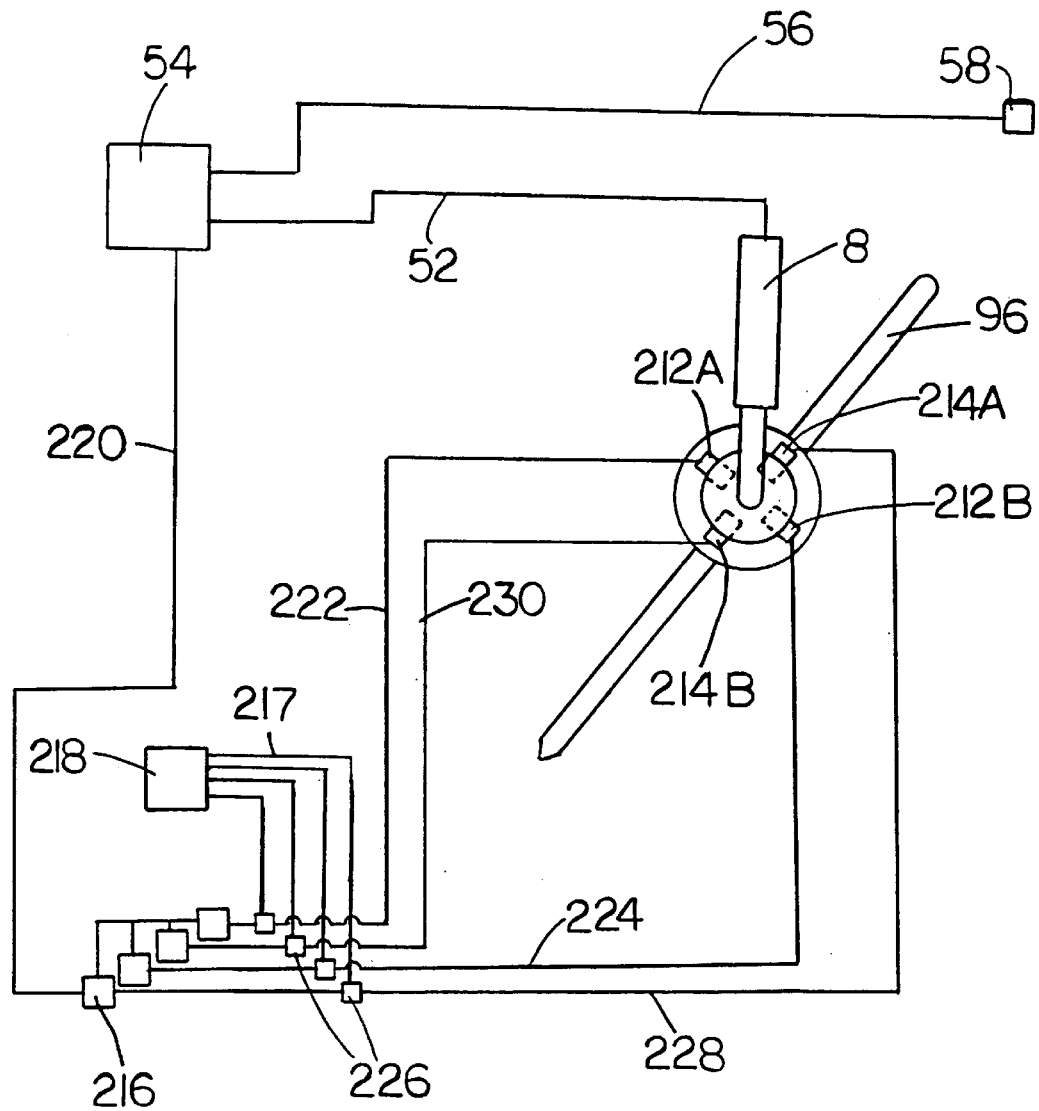
FIG. 26 is a schematic view of the electrical control circuitry used with the present invention for energizing the electromagnets which manipulate the arc.

In the embodiment shown in FIG. 10A the inner enclosure does not have an outer enclosure as such, and because it is made of woven kevlar cloth which will allow fluids to pass through, it is sealed on the outside with a thin layer of high temperature silicone rubber sealant in the preferred embodiment to prevent this. Alternatively, any suitable sealant which promotes flexibility in movement and operation can be used, such as neoprene cement, or other suitable rubberized sealants or thin flexible films which will not degrade in prolonged seawater immersion and are very flexible. The spring is sealed to the inner enclosure also using a sealant. The spring in the preferred embodiment is made from stainless steel. In alternate embodiments the spring may be made from any reasonably strong, non-corrosive material. The spring has a very light depression pressure of 2 to 3 pounds to enable the welder the requisite sense of touch and feel during the welding process, although a stiffer or less stiff spring may be used in alternate embodiments. The lower enclosure body should extend thru the interior center hole of the electromagnetic base to the very bottom where it is attached by screws which are then covered by a nonconductive adhesive. This helps insulate the electromagnetic base from inadverdent touching of the torch electrode during the welding process or while the diver is repositioning himself to help prevent inadverdent welding of the electromagnetic base to the work surface. The two side electromagnets which are attached to the lower sides of the gas ring are both oriented with their similar poles pointing toward the torch electrode. To elaborate, the south pole of each magnet points toward the interior of the enclosure, or each north pole points toward the interior of the enclosure. Because both similar poles are pointing inwardly, the energizing of either electromagnet will produce a marked change in the direction the arc points in. Reversing the polarity of the current to an electromagnet reverses the orientation of its north and south poles, which can be used to further manipulate the arc. These electromagnets can be used to guide and manipulate metal deposition when using a MIG, or flux core torch in the globular transfer, spray arc transfer, or pulsed spray arc transfer mode, or with a plasma transferred arc welding torch to manipulate the deposition pattern of the supply powder. The weld deposition pattern in the V-groove is influenced by varying the two magnetic fields which influence the arc from the sides, forcing its movement from side to side in accurately controlled movements. The torch can also be made to deposit equal amounts of material on both faces of the V-groove without manually moving the torch from side to side, thereby accurately balancing heat induction and penetration into both sides of the weld and ensuring even wet out of the entire V-groove while using a single torch. The dwell times of the arc at specific locations of the V-groove can be programmed to the V-groove width and depth using an arbitrary waveform software program, thereby depositing appropriate amounts of weld material at all areas as the torch progresses forward in the V-groove. The magnets may be controlled by either an alternating or direct current power source, and in the preferred embodiment a remotely located synthesized function generator is linked to an adjustable power supply for this purpose, as is shown in FIG. 26 of this disclosure. The two opposed magnets are used to guide metal deposition by moving the arc from side to side in a regularly varying magnetic field as the torch progresses at a constant rate of speed. This arrangement also helps create arc stability and reduces or eliminates arc blow in otherwise unstable working conditions where difficult to quantify or to control ambient magnetic fields may exist, caused by nearby running equipment internally in the structure, impressed current cathodic protection systems, etc. Alternatively, it can be used to hold the arc steady in a single orientation relative to the position of the magnets while the welder manually moves the torch from side to side as the weld progresses along the V-groove, thereby minimizing or preventing arc blow. In an alternate embodiment, a laser or other type of seam tracker, such as a Photoelectric eye seam tracker incorporated into the present invention is coupled to an adaptive software program in a connected computer which changes the power and current levels in each electromagnet in response to changing V-groove configurations or other requirements.

Also, in very deep welding applications where the welding arc or plasma shows signs of constriction due to pressure effects and resultantly becomes unstable, the regular reversal of the two fields at rates anywhere between 2 to 400 hertz acts to broaden and deconstrict the arc while stabilizing it, although higher frequencies may be used if so desired. The electromagnets on the sides of the enclosure stabilize the arc in a left to right orientation relative to the direction of the weld, and will not cause arc blow or arc instability during task completion.

The hollow rubber seal may be custom made from silicone or gum rubber compounds, and is vulcanized to a fitting which is attached to a hose and used for the introduction of water or air into the seal, and may have a skirt extending upwards from the inner edge of the top of the seal to enable anchoring by screws in the preferred embodiment. Glue, clamps, or other fastening methods may be used in alternate embodiments to secure it to the electromagnet or lower enclosure body, as shown in many of the embodiments in this specification. If it is so desired this seal may be replaced by an ordinary o ring or other rubber product of soft conformable construction and suitable size or other seal configuration, such as a lip or skirt seal for this sealing application. Additionally, if so desired it may be inflated with air instead of water as long as a suitable pressure relief valve is incorporated in the pressurizing system to prevent over pressurization when lifting the enclosure up from the work depth, which causes air expansion inside the seal which must be compensated for. The V-groove seal shown can be made from any soft flexible solid rubber compound, or any open cell foam rubber material, but not from closed cell foam rubber materials. Closed cell materials collapse under increasing sea pressure with depth, rendering them innapropriate for this purpose. The V-groove seal can be attached to the hollow rubber seal by gluing, using any suitable adhesive compatible with both materials and the underwater environment. The enclosure cap is threaded and screws onto the torch conductor tube and is secured by the torch nozzle, which screws onto the torch conductor in the conventional fashion used in the industry for most torches. Alternatively, for torches without this attachment configuration for the nozzle, the outside of the conductor tube can be threaded using fine threads just above the attachment point of the nozzle, and the enclosure cap is then screwed onto the conductor tube. If this is not possible, or if another attachment method is desired, the enclosure cap can be permanently attached by soldering, welding, clamping, gluing or any other rigid attachment means. Since the connection between the enclosure cap and the conductor tube is rigid, the auxiliary gas duct can be made from a wide range of rigid or flexible materials, such as hard plastic, copper piping, or soft hose, as is preferred. The valve used is a common low pressure twist type valve commonly used for air and gas metering applications in the welding industry. The switch used for controlling the electromagnetic base is a waterproof, normally closed, single pole, momentary pressure switch. These are commonly available and are well known in the industry by those skilled in the art. This switch design permits the diver welder to have one hand free to hold onto the structure while making the weld with the other hand, permitting the electromagnetic base to operate without being held onto. The switch must be depressed to disable the electromagnet for repositioning or moving the enclosure to a new location. The vent holes in the enclosure cap are essential for purging the enclosure of unwanted water when welding in inverted positions or at oblique angles. The sliding ring adjustment mechanism is the preferred embodiment for gas ventilation in all positions and water purging in inverted positions for the present invention. If the sliding ring is not used to control the flow rates of exiting gasses from the enclosure, the vent holes in the enclosure cap should be made small enough to permit a reasonable amount of pressure build up in the enclosure to maintain it completely evacuated of water during the welding operation with a reasonably small auxiliary gas flow, so that a dry environment is maintained without flooding. This is dependent upon many environmental variables such as uneven surfaces to be sealed on, orientation of the weld, such as overhead, flat or vertical, depth of the welding operation, and the size of the welding groove. A hole size of 1/16th inch in diameter will work, although the number of holes decided upon will also influence the size of this dimension either upwards or downwards. When using the sliding ring, the recommended minimum number of holes in the cap should be 3, with the location being at the distal interior corner of the enclosure/cap interface to maximize the capability of capturing and purging most of the water from the enclosure when tilted at a slightly inverted angle. If the sliding ring arrangement is used, the hole sizes are less important, and larger size holes may be incorporated. Care must be taken, however to insure that the seal ring fits fairly snugly on the enclosure cap, insuring reasonably good sealing capabilities and flow control of the exit gases.

The welding machine is a direct current machine, which is required for diver safety. If alternating current is used as the power source for the torch, the polarity of the current changes constantly and creates an extreme shock and life threatening hazard to the diver. It should be mentioned at this juncture that alternating current has proven to be quite lethal when used for underwater welding and should be avoided in manual underwater welding applications. Conversely, direct current shocks underwater have virtually never produced diver deaths or incapacitation, because they have the effect of restarting the human heart. Alternating current may be used for robotic applications if so desired. To prevent arc blow in the torch, which is an obvious consideration when welding in extremely close proximity to an electromagnet, care needs to be taken to insure that the north and south poles of each of the electromagnets incorporated as part of the electromagnetic base 15 are aligned along the north and south axis of the weld. This does not refer to the electromagnets 14, which are attached directly to the torch and used for arc guidance and which are oriented with their poles pointing towards the interior of the enclosure. This requirement to correctly orient the poles of the electromagnetic base is easily achieved with an ordinary compass if the operator is aware of the requirement in advance of the welding operation. The swivel which is integrated into the enclosure to permit pivoting of the torch or electromagnetic base during the weld, permits the orientation of the electromagnetic base immediately prior to commencing the welding operation with a compass which has been suitably waterproofed. In an alternate embodiment, the swivel 91 is located at the top of the lower enclosure body 92, and attaches to the inner enclosure and spring. In still another embodiment, the swivel is located at the bottom of the lower enclosure body, at the attachment point to the electromagnetic base. This last arrangement isolates the electromagnetic base from the lower enclosure body. If it is so desired, a conductor tube swivel 60 can be incorporated into the conductor tube immediately above the enclosure cap to assist in pivoting and repositioning the arc manipulation magnets relative to the position of the torch handle and the consequent mandated position of the lower portions of the torch relative to the diver during the weld. Some torches have nozzles which snap onto the conductor tube and which resultantly swivel. If the torch has this type of nozzle configuration, the magnet positions relative to the position of the handle may be adjusted by simply turning the nozzle to the desired position manually, thus supplanting the need for the conductor tube swivel.

Figure 11:
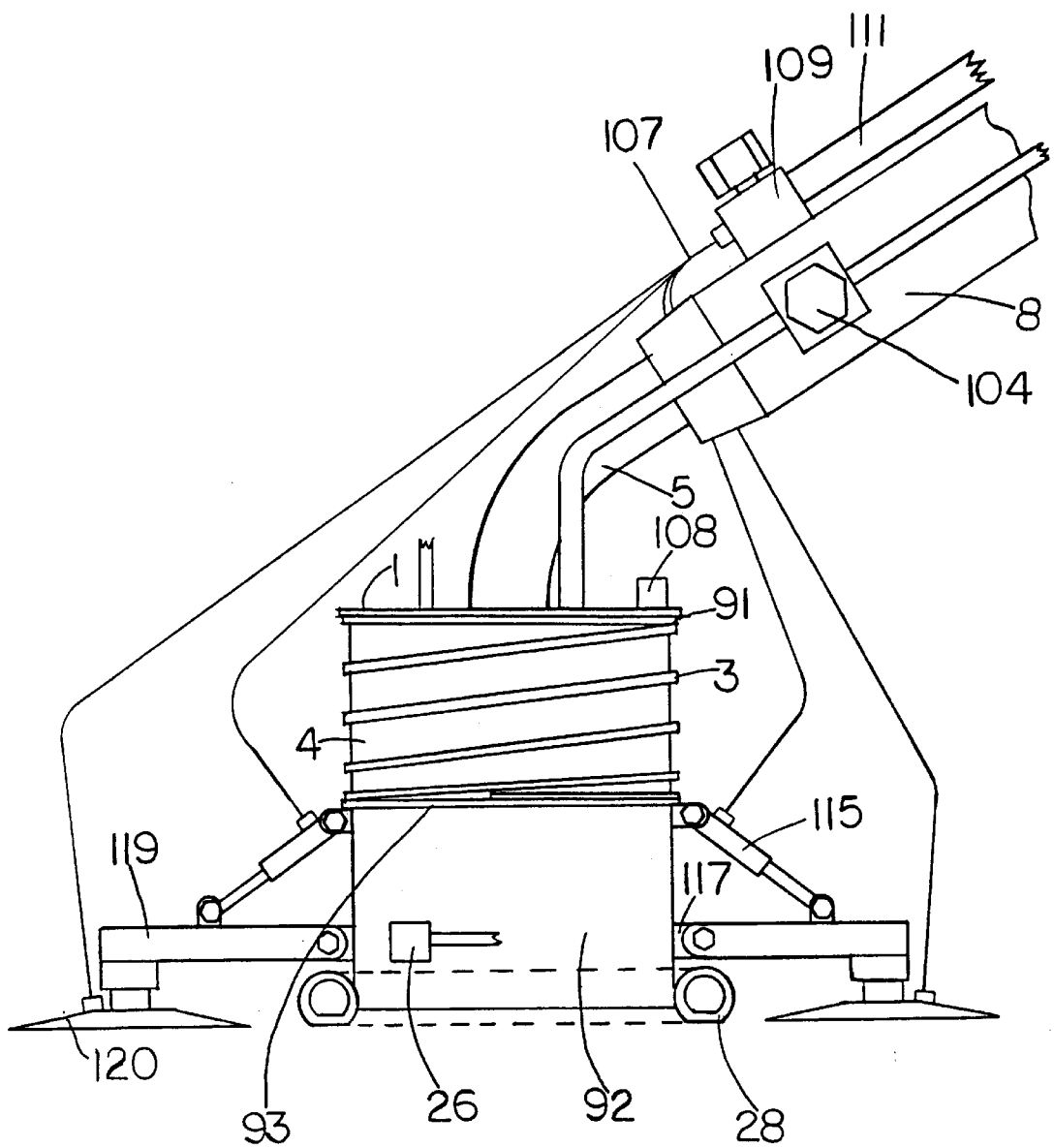
FIG. 11 is a side view of another underwater embodiment of the present invention, showing a suction cup method of attachment to the substrate.

Referring now to FIG. 11, another embodiment showing suction cups as the attachment method for the present invention is shown, where an enclosure cap 1 has a swivel 91 which is attached to an inner enclosure 4 which has a spring 3 enclosing it. Below the spring is a lower enclosure body 92 to which an acoustic emissions sensor 26 is attached. A hollow rubber seal 28 encloses the lower enclosure body at the bottom. A spring stopper 93, which is a flange extending owtwards from the lower enclosure body, attaches to the spring at the top of the lower enclosure body by means of screws, clips, bolts, or adhesives. The enclosure cap is attached to a torch 5 which has a torch handle 8 which has attached an auxiliary gas valve 104, and also attached to the torch handle is a water flow valve 109, to which a suction hose 111 is attached, and also attached is a multiplicity of suction tubes 107, which attach to a piston and ram 115, of which there may be a multiplicity, and to a suction cup 120, which is attached to a swing arm 119 which pivots on a pivot tab 117. On top of the enclosure cap is found a ring handle 108.

In this embodiment, the suction hose is connected to a remotely located water pump which draws a flow of water thru the suction tubes attached to the suction cups, which terminate in open ends with a hole passing thru the body of each suction cup, effectively drawing it to a substrate that it is being pressed against by the diver. After this has been achieved and suction pressure begins to rise, increased suction pressure actuates the pistons, which are sucked inwards in their respective rams resulting in the enclosure body being forced against the substrate. It is important that the suction tubes be connected together in a common manifold at the water flow valve. This will equalize the suction for all legs of the suction tubes, resulting in equal pressure exerted on all components of the system. In this embodiment the water flow valve has been located on the torch handle for convenience, but may be located elsewhere as the diver desires.

Figure 12A:
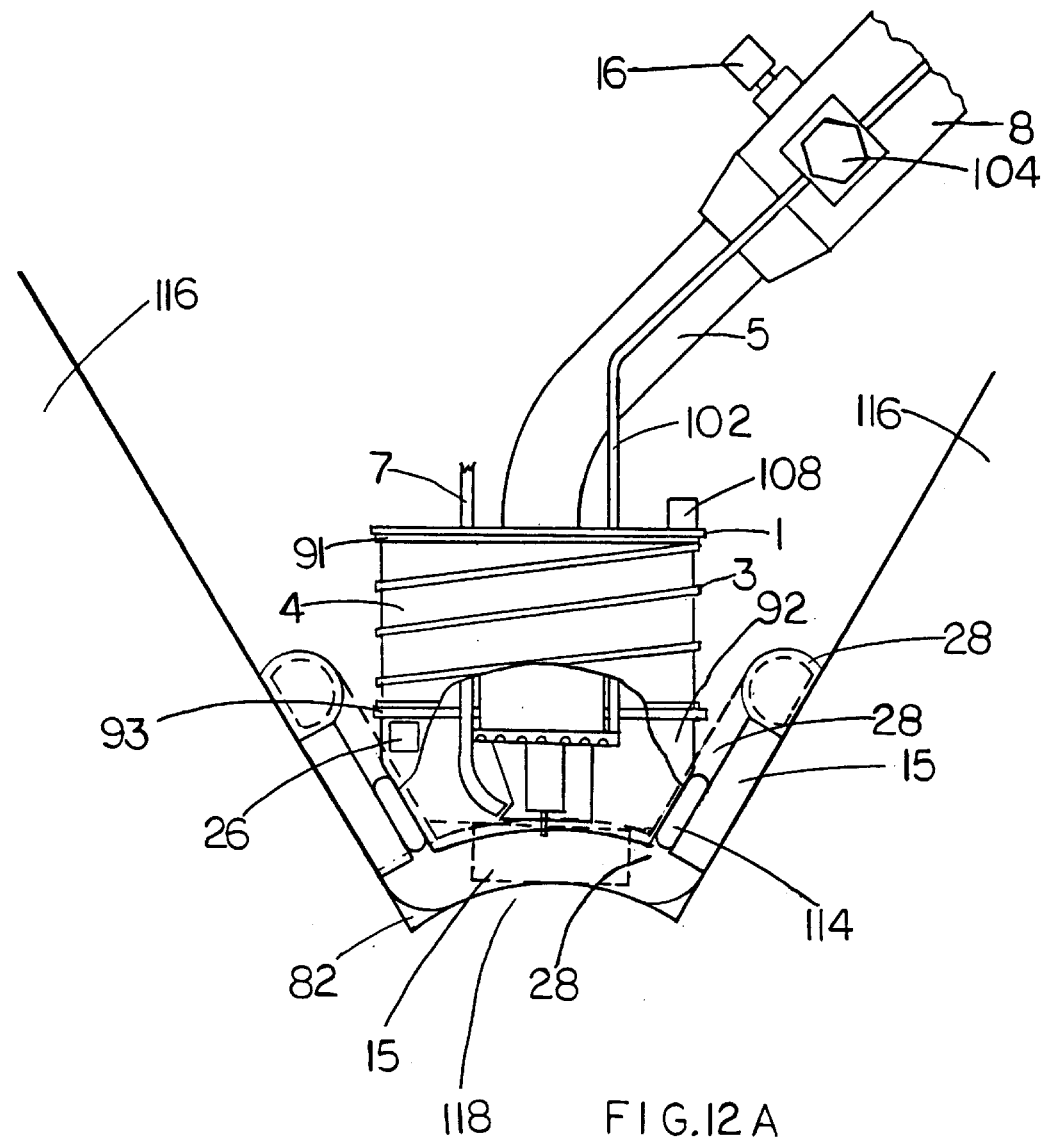
FIG. 12A is a cutaway side view of an underwater embodiment adapted to offshore oil platform jacket leg joint welding tasks.
Figure 12B:
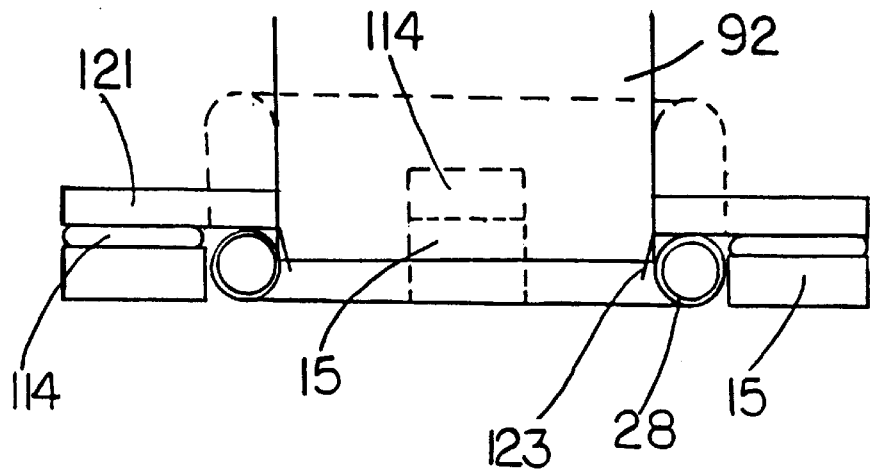
FIG. 12B shows side view details of the same embodiment.

Referring now to FIGS. 12A and 12B, which show an embodiment adapted to underwater welding in confined spaces. 12A shows a cutaway end view of a single torch in an enclosure in between two jacket legs at a weld saddle of a K joint on an offshore oil platform jacket. This is a common underwater task undertaken in the offshore oil underwater services industry. The embodiment shown offers flexibility in application and use by being able to adapt to a wide range of variables for this type of task. It has the capability of having any of the magnetic and sealing elements shown here removed, reshaped or added to suit the specific task. Starting at the upper right, a torch handle 8 has an auxiliary gas valve 104 and a switch 16. The switch, which controls the electromagnetic base magnets has been relocated to the torch handle for ease in use in the tight quarters shown. Appending from the torch handle is a torch 5 with an auxiliary gas duct 102 which penetrates an enclosure cap 1 which also has penetrating it a fiberoptic borescope 7 and a ring handle 108 on top, which is attached to a sliding ring, which is shown in FIG. 11C. The enclosure cap has attached a swivel 91, which is attached to an inner enclosure 4 which is enclosed by a spring 3. The inner enclosure is attached to a lower enclosure body 92 which has attached an acoustic emissions sensor 26, a flexible magnet mount 114, which is attached to an electromagnetic base 15, and which is also attached to a hollow rubber seal 28. A spring stopper 93 attaches the spring by means of screws to the lower enclosure body. In the preferred embodiment, the rubber bulb 29, and relief valve 31 shown in FIG. 2 are also attached to the seal, which encloses the entire periphery of the base of the lower enclosure body and also encircles the two magnets which are attached to the flexible magnet mounts. At the lower front two corners of the hollow rubber seal is attached a V-groove seal 82 of which there are several, and which are also shown elsewhere in this specification. In the drawing, the torch is poised to begin welding on a weld saddle 118 at the juncture of two jacket legs 116. In alternate embodiments of this embodiment the torch may have electromagnets 14 attached to the gas ring for arc manipulation, as shown in FIG. 10A.

FIG. 12B shows a side view of the enclosure of FIG. 12A, showing the seal configuration which is located inside the electromagnetic base magnets across the front and back of the enclosure. Shown are details of the mounting arrangement of a side electromagnetic base magnet 15 of which there may be a multiplicity, one of which is shown positioned directly below the torch cup in the center of the seal in FIG. 12a. The drawing shows a lower enclosure body 92 which has attached at the front and back a fixed magnet mount 121 to which is attached an electromagnetic base 15 by a flexible magnet mount 114, and inside the enclosure is a spark shield 123, which protects the seals from spark damage. This electromagnetic base configuration encloses a hollow rubber seal 28 which surrounds the lower periphery of the lower enclosure body, and also shown is one of the two side electromagnetic bases, which is shown as being attached at the lower center of the enclosure in this drawing. The arrangement shown here of the seal located at the immediate outside periphery of the enclosure makes it vulnerable to heat from the welding process, and the preferred seal material for this embodiment is high temperature rubber, which will give adequate service for surface seal temperatures ranging up to 400 degrees fahrenheit. The inside of the lower enclosure body at this juncture can have a protective skirt as shown installed to protect the seal from welding sparks and dross. The flexible magnet mounts can be made from high temperature flexible rubber and secured to the magnets with bolts, clips or suitable adhesives such as are known in the art.

Figure 13:
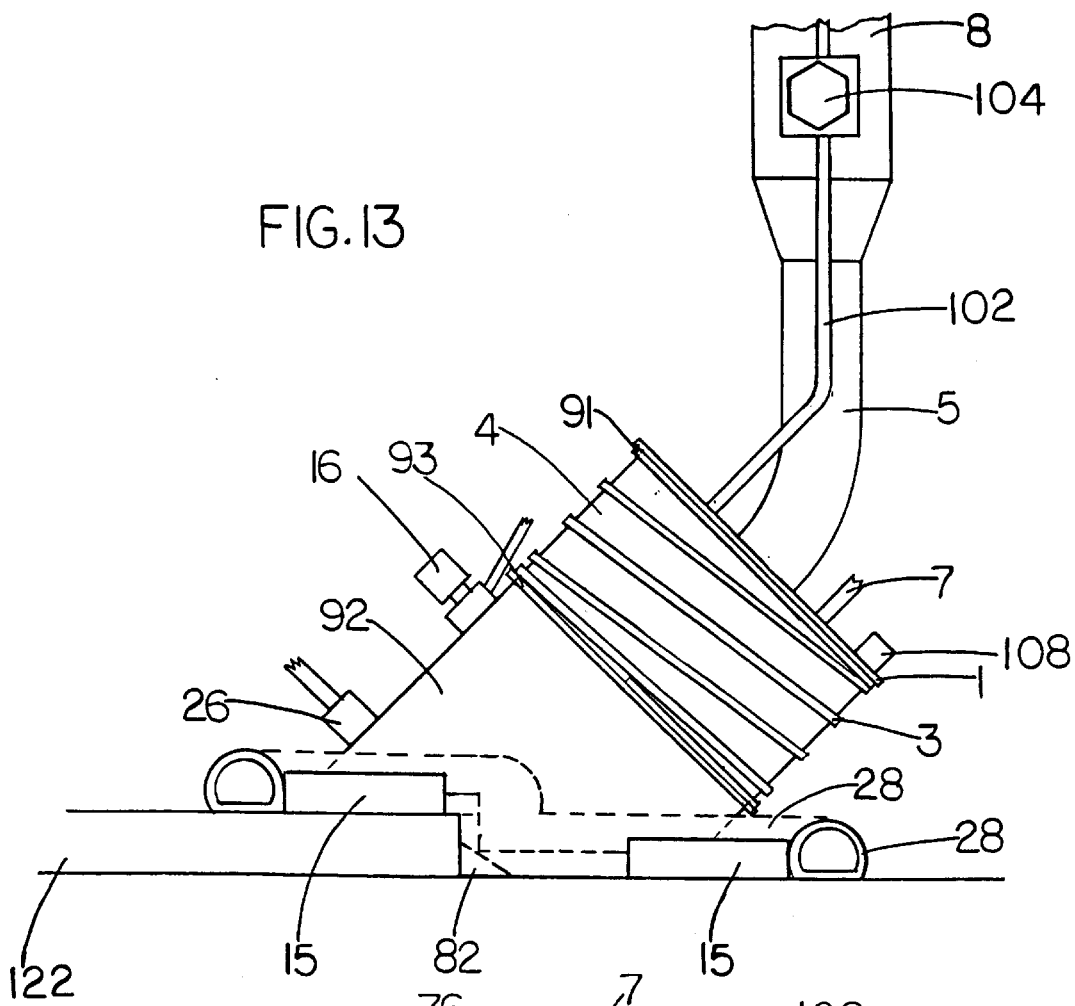
FIG. 13 is a side view of an embodiment adapted to fillet welding of doubler plates underwater.

Referring now to FIG. 13, a side view is shown of another embodiment adapted to weld doubler plates onto structures, or wherever a fillet weld is required when joining two plates, such as with a lap joint. A torch handle 8 has attached an auxiliary gas valve 104 which is connected to an auxiliary gas duct 102, and the torch handle has appended to it a torch 5 which has attached to it an enclosure cap 1 with a fiberoptic borescope 7 which penetrates the cap, and a swivel 91 which is attached to an inner enclosure 4 which is enclosed by a spring 3 and attaches to a lower enclosure body 92 which has a switch 16 and an acoustic emissions sensor 26 attached to it. At the top of the lower enclosure body is a spring stopper 93 which is attached to the spring by means of screws. Appending from the bottom of the lower enclosure body is an electromagnetic base 15 composed of several electromagnets which have a hollow rubber seal 28 attached and enclosing them, and at the juncture of the two plates to be welded is a V-groove seal 82, which fills in the gap left by the pressurized seal as the welding operation progresses. In this embodiment, the switch is located on the upper facing side of the lower enclosure body, which is the most accessible and convenient place available to the diver, but may be relocated as the diver prefers. The operation of the enclosure is completed by manually sliding it along the work surface as the welding operation progresses, depressing the switch to move it in increments as it is being slid along the surface. The magnets shown in the drawing are straight magnets which are approximately as long as the enclosure is wide. These may be substituted for the magnet configurations shown in any of the other embodiments shown in this disclosure in alternate embodiments, and may be lengthened or shortened to suit specific task requirements and the divers preference.

Many different types of miniaturized frequency sensors and magnetic flux sensors are available either for incorporation into any of the embodiments of the present invention if it is so desired, or for use in conjunction with it as a separate stand alone tool. For example, magnetic flux sensors will sense the magnetic fields generated by equipment on the structure in the immediate vicinity of the enclosure and torch and their orientation, which is an important planning consideration with this type of welding, due to the effects that surrounding electromagnetic fields have on the arc. Many suitable sensors adaptable to this purpose are available and will be known to those with ordinary skill in the art. One highly sensitive fiberoptic gradiometer is disclosed in U.S. Pat. No. 4,814,706 by Rempt, which could be adapted to the underwater magnetic field sensing application because of the inherent waterproof nature of fiberoptic cable.

In addition, for other sensing applications many fiberoptic interferometric frequency sensors such as that disclosed in U.S. Pat. No. 5,402,231 by Udd, are widely available in industry now, and will be known to those with ordinary skill in the art. These sensors can be made to accurately measure either ultrasonic or electrical frequencies in the structure, which can influence the weld quality and characteristics. In an alternate embodiment the acoustic emissions sensor shown in the drawings is replaced by the Udd invention, which can also be made to sense ambient ultrasonic frequencies in the structure at the welding site. The above described sensors may be used with any of the embodiments of the present invention to accurately monitor and adjust to changing welding conditions, as the operator prefers.

Figure 14:
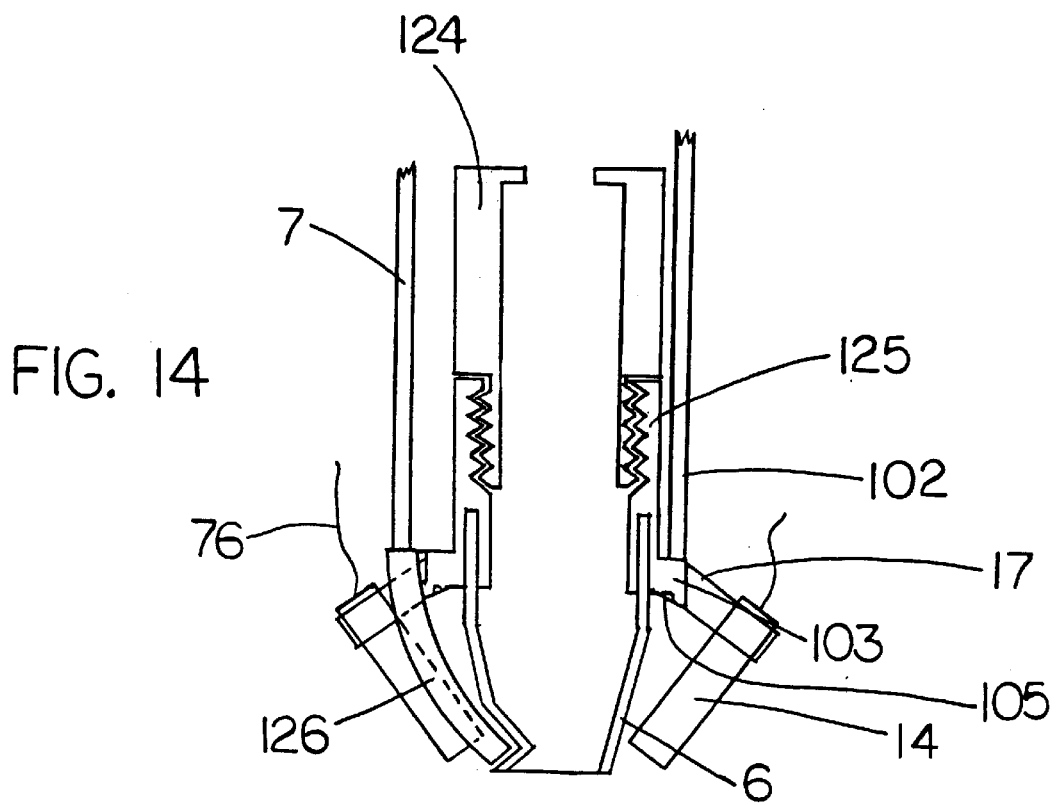
FIG. 14 is a cross sectional side view of the torch cup construction and attachment details of the present invention.

Referring now to FIG. 14, which shows an enlarged cross sectional view of the preferred embodiment of the torch cup assembly construction and attachment of the present invention to the nozzle of a MIG, flux core or plasma transferred arc torch. In the drawing, a torch cup 6 is attached to a cup adapter 125 which has attached a gas ring 103 which is a hollow structure which interior void communicates with an auxiliary gas duct 102 to which it is connected. The cup adaptor screws onto a nozzle 124, which is an integral part of the torch and has been modified with external threads to accept the cup adapter. Attached to the gas ring is a guide tube 126 which encloses and secures a fiberoptic borescope 7. The torch cup is attached to the cup adaptor by conventional means for affixing glass to metal, and the guide tube is secured to the gas ring by a bracket as shown in the prior art disclosure of McGee, et al, U.S. Pat. No. 5,329,089. The leading edge of the gas ring is angled forward to direct auxiliary gas flows along the surface of the outside of the torch cup thru an orifice 105 of which there are a multiplicity, thereby creating a flow which is effectively parallel to the shielding gas flows exiting the interior of the torch cup, using the coanda effect. This helps to prevent disturbances in the flow patterns of these gases and helps to prevent contamination of the weld by exhaust gases and water vapor products if the auxiliary gas flow rate is increased to meet task accomplishment demands. A swirl pattern is created inside the enclosure which is initiated by the shielding gas and auxiliary gas flows, and which follows the contours of the work surface outwards from the torch nozzle to the lower edge and up the interior walls of the enclosure to the cap where it exits, effectively eliminating contaminant gas buildup. Attached to the gas ring is a magnet bracket 17 which holds an electromagnet 14 of which there are two, which has a signal transmission wire 76 leading to a remotely located synthesized function generator. An orifice in the gas ring directs a flow of gas at the windings of the electromagnet to cool it during the welding operation. The gas ring, cup adapter and bracket in the preferred embodiment are made from brass. In an alternate embodiment, the gas ring is not attached to the torch cup, but is affixed to the periphery of the inside of the enclosure, creating a counter flow to the shielding gas flow inside the enclosure. In another alternate embodiment, the gas ring is glued or otherwise attached to the periphery of the torch cup, which can be threaded, as shown in the referenced prior art disclosure of U.S. Pat. No. 5,329,089 by McGee et al, and screws directly onto the nozzle, completely omitting the cup adaptor.

Figure 15:
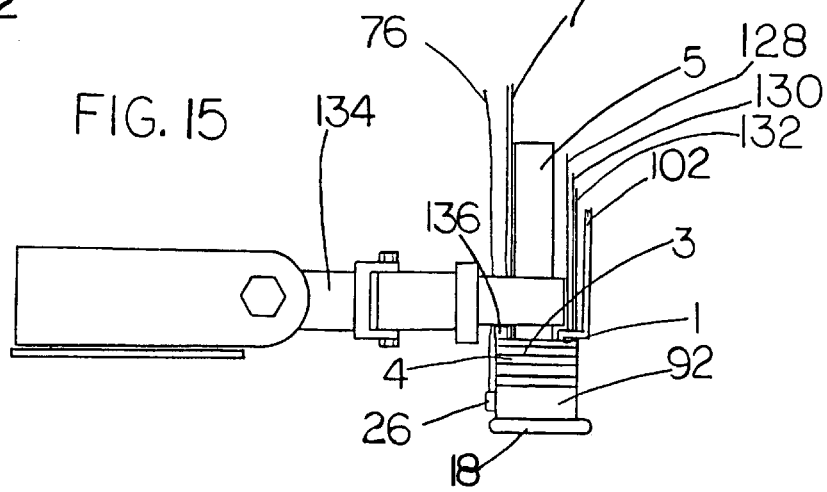
FIG. 15 is a side view of the present invention adapted to terrestrial and underwater robotic applications and showing it used with a robotic arm.

Referring now to FIG. 15, where a torch 5 is held by a robotic arm 134, and has enclosing the torch nozzle and cup an inner enclosure 4 which is enclosed by a spring 3. The lower part of the inner enclosure is attached to a lower enclosure body 92 which has attached a rolling seal 18 on each side at the bottom, and a row of electromagnets across the front and back of the enclosure, in an electromagnetic base design structurally similar to that shown in FIG. 1. Also attached to the lower enclosure body is an acoustic emission sensor 26 which has a signal transmission wire 76 attached. Connected to the top of the inner enclosure is an enclosure cap 1 which has an auxiliary gas duct 102 penetrating it, which leads to a gas ring, which is shown in the previous figures. Also penetrating the enclosure cap is a fiberoptic borescope 7, and mounted on the top of the cap is a remote control exhaust valve 136, which meters exhaust gas flows out of the enclosure in response to signals sent from a remotely located manual controller. A humidity sensor 128, a temperature sensor 130, and a pressure sensor 132 each measure conditions inside the enclosure as the weld is completed. In an alternate embodiment, a laser robotic seam tracker is used instead of the fiberoptic borescope to track the weld seam for weld deposition in the V-groove. Suitable seam trackers are available from Modular Vision Systems, Vienna, Va.

In operation, the enclosure is made to move forward as the robotic arm pushes the torch forward which presses the forward edge of the gas ring against the forward interior surfaces of the lower enclosure body, thereby causing the enclosure to roll forward on the rolling seals in response. If it is so desired, the enclosure can be wider than it is long, permitting the weaving motion required for operation of the torch without touching the sides of or moving the enclosure, but limiting the amount of forward or rearward travel permitted before the torch moves the enclosure. Since the rolling seals resist sideways movement, the movement of the welding torch from side to side in the V-groove does not cause the enclosure to move. In between or during movements, as the welder prefers, the electromagnets which comprise the electromagnetic base can be energized to prevent such movement. During movements, the electromagnetic base power levels can be reduced to lower levels to permit sliding the electromagnets along the work surface, thus moving the enclosure without having to exert downward pressure on the enclosure to maintain a seal. Since some remote operated vehicles do not have the capability to exert a constant downward pressure on a tool such as a welding enclosure while extending or moving the robotic arm, this is an invaluable feature for robotic cutting and welding operations. If the welder prefers, the torch may continue to operate and deposit weld bead as the torch is moved, using this embodiment. The torch shown in this drawing is a robotic MIG or flux core torch commonly used for robotic applications. In an alternate embodiment, the lower enclosure body has several electromagnets attached in a similar manner to that shown in FIG. 10, and which assist in manipulating the arc back and forth in a sideways fashion as the torch travels forward while welding. All of the embodiments in this disclosure can have a similar configuration, utilizing small electromagnets to influence the arc position if so desired.

Figure 16:
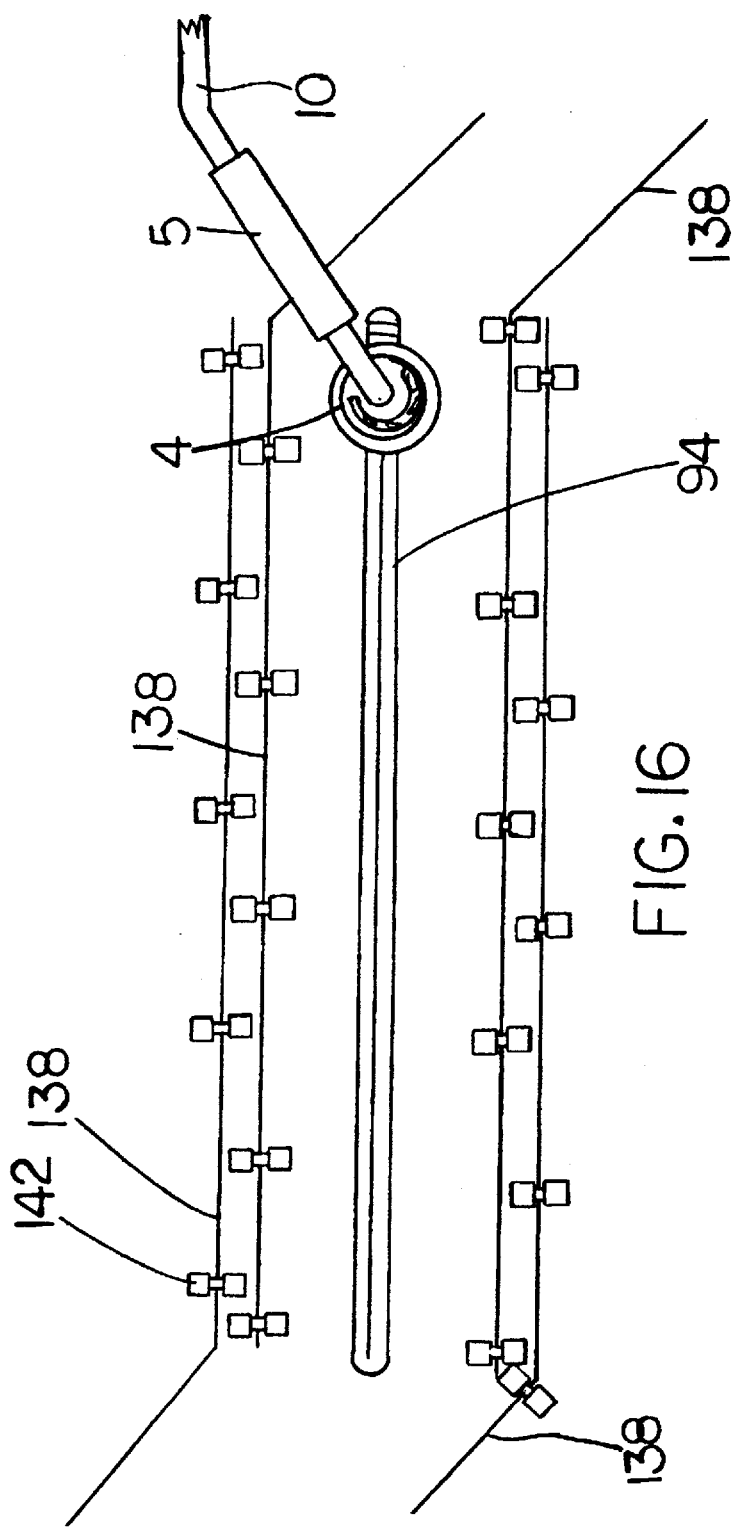
FIG. 16 is a plan view of a welding torch welding along a V-groove detailing the placement of sensors placed on either side of the weld zone.

Referring now to FIG. 16, an overhead view of a weld being made using the present invention is shown, where a torch 5 which is attached to an inner enclosure 4 has a torch lead 10 and is welding along a V-groove 94. Alongside on either side of the weld area is a fiberoptic stress sensor 138, of which two are located in a parallel configuration on each side of the weld. The sensors are secured to the weld material by a permanent magnet holder 142, of which there are several shown. A suitable fiberoptic sensor which can be used for acoustic emissions and stress sensing of the base material caused by warpage and unreleived interior stress are shown in U.S. Pat. No. 5,402,231, by Udd. In addition, conventional vibratory stress releiving equipment may be employed in a stress releiving application by locating the equipment close to the work area on the structure. Suitable equipment for this purpose is available from Stress Relief Engineering Co, Costa Mesa, Calif. In the stress sensing embodiment shown the sensor detects any movement or deformation in the base metal which can be used to inform the welder as the weld is being completed of stress buildup which may be then compensated for by increasing or decreasing the heat induction into specific segments of the weld, or by otherwise changing the welding procedures as the weld progresses, thereby minimizing the stress buildup. The raw data is processed by a remotely located processor which presents a constantly updated video display of the weld, showing the locations of defects or stress. Also, many other suitable fiberoptic and conventional strain sensors are available which can be used for this purpose.

Figure 17:
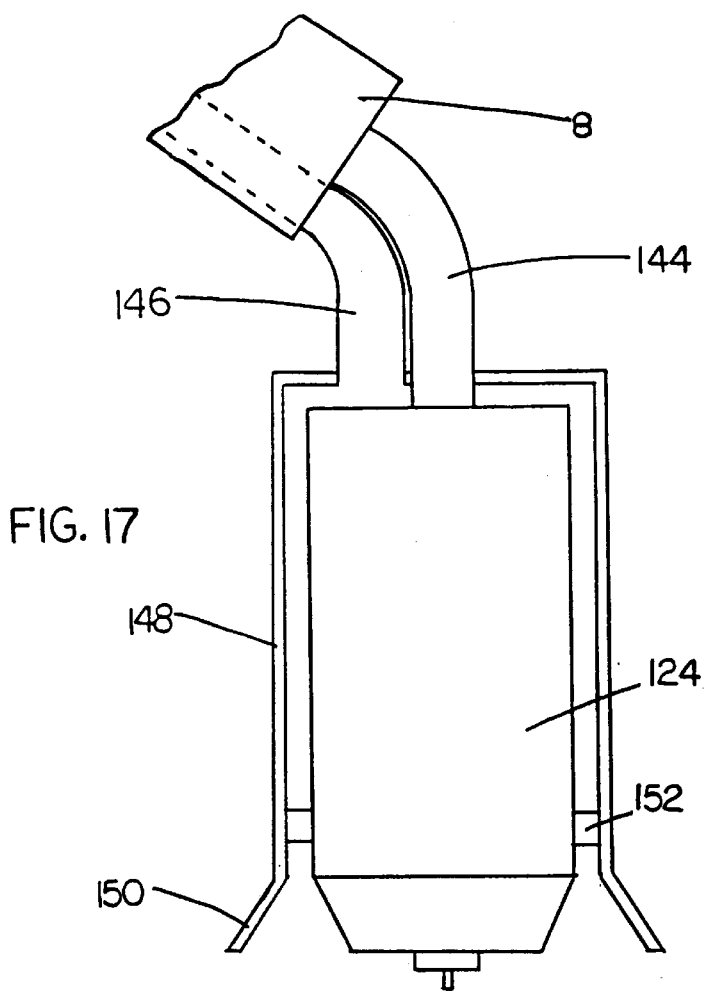
FIG. 17 is a side view of a terrestrial embodiment of the present invention showing a cross sectional view of an enclosure enclosing a torch nozzle.
Figure 18:
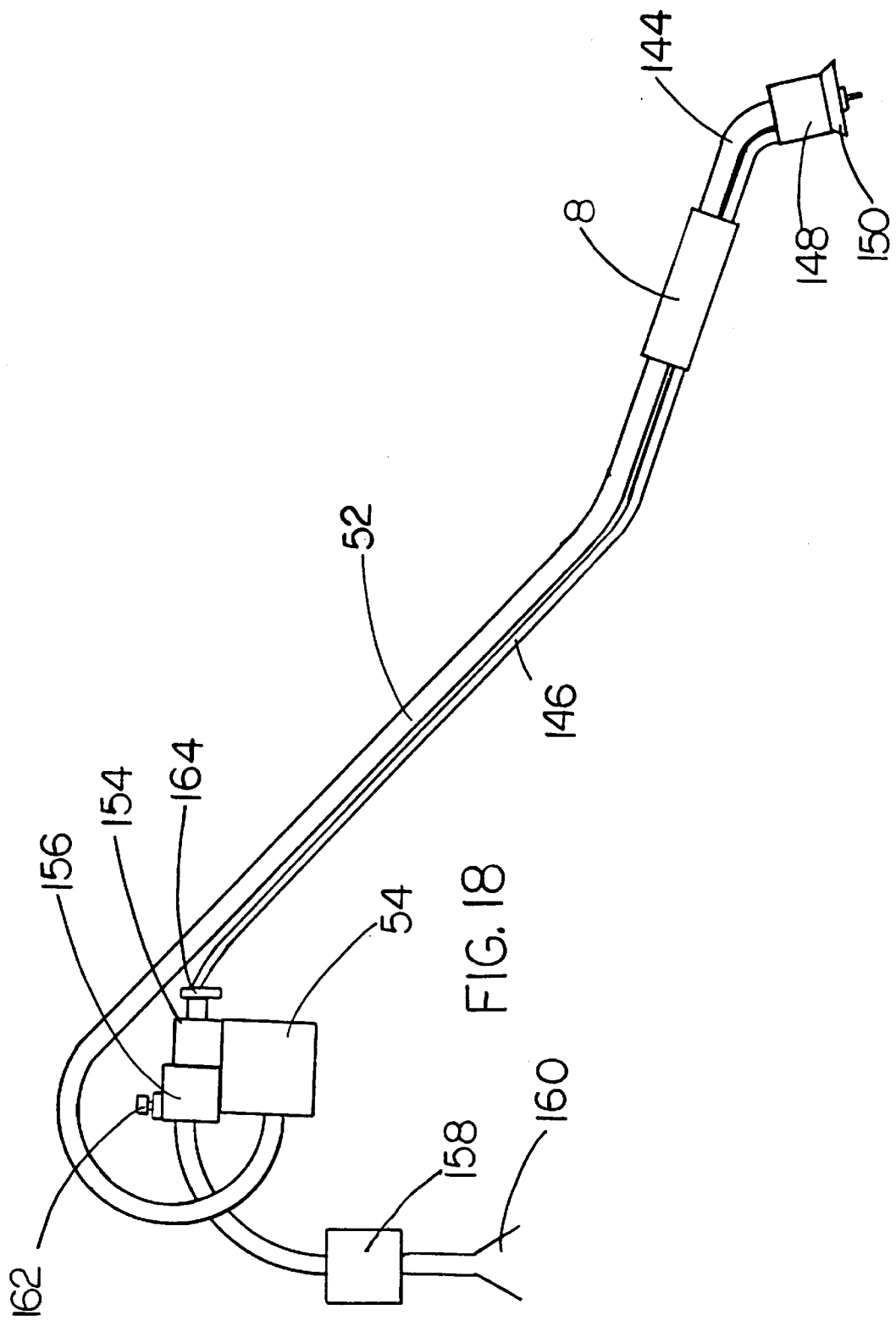
FIG. 18 is a side view of a welding system adapted for terrestrial use showing a torch with an enclosure enclosing the nozzle with ducting to a filtration system.

Referring now to FIG. 17, which shows a MIG torch for shop and other non-underwater applications with a cutaway view of an attached enclosure, which is particularly adapted to terrestrial weld fume scavenging and disposal. The drawing shows a torch, where a torch handle 8 is attached to a conductor tube 144 which is attached to a nozzle 124 which has enclosing it a nozzle enclosure 148 which has a spacer block 152 of which there are several, and at the distal end of the enclosure is a skirt 150. At the back of the enclosure and penetrating it is a vacuum tube 146 which penetrates the torch handle. The torch is designed to efficiently scavenge exhaust and contaminant gases during the welding operation without being significantly larger or heavier than convential torches currently in use. The enclosure and spacer blocks, of which there can be three or four around the periphery of the nozzle, are made of hard copper and the enclosure is connected to the conductor tube by threading it onto it via external threads or other conventional means. The vacuum tube on the torch can be made from thin wall copper tubing, or high temperature rubber hose connecting by a screw on fitting to a length of light weight non-collapsable hose which is rated for temperatures in the 200–250 degree F. range. The torch is integrated into a vacuum system which is shown in FIG. 18. In an alternate embodiment, the nozzle enclosure is attached to the torch head of a shielded metal arc torch at the base of the electrode holder and scavenges the fumes from the base of the electrode.

Referring now to FIG. 18, a torch mounted fume scavenging system is shown in which a torch 8 has a conductor tube 144 attached which has appending from it a nozzle enclosure 148, which has a skirt 150 at its distal end. Attached to the back of the torch is a ground lead 52, which connects to a welding machine 54, and a vacuum tube 146 connects to a flow meter 164 which is attached to an automatic valve 154 which is connected in line with an exhaust blower 156 which is mounted on top of the welding machine and has attached a variable speed control 162. The exhaust side of the exhaust blower has a duct which leads to a filter 158 which is ducted to an exhaust vent 160 where the exhaust gases are released to the atmosphere at a suitable location. In this embodiment the torch is able to scavenge its own exhaust fumes, thereby obviating the need for cumbersome and awkward personal air contaminant protection, such as filter systems worn as backpacks, etc.

In this embodiment, the blower is powered by an AC motor and has a rheostat type adjustable switch which controls and adjusts the motor speed to suit specific task requirements. The flow meter is located near the shielding gas supply so that the exhaust flow rate can be compared with the input shielding gas supply flow rate. The ratio for scavenging minimum levels of exhaust gases will vary depending upon the type of gas in use, power settings, welding position, etc., But the rule of thumb for flow rates to achieve minimum scavenging of all exhaust and contaminant gases is 13 times the input gas flow rate. For example, a high shielding gas flow rate for most applications is 0.5 cfm, so 13×0.5=6.5 cfm, which is easily achieved by the employment of suitable sized hose or Tubing which can be fit through or run adjacent to the torch handle. Depending upon the torch configuration and the amount of free space inside the handle, the hose may be either run through the handle or adjacent to it along a groove which is made to accommodate the hose.

Low pressure, non-collapsable flexible rubber hose is used for conduction of exhaust gases from the torch to the flowmeter and filter. The automatic valve is an electrically controlled servo valve which is connected to the electrical circuit which controls the wire feed unit, so that whenever the wire is being advanced the valve is open. A delay device, common in the electronics industry, can be used to delay the closing of the valve for a preset amount of time after the wire feed has stopped. A 5 second delay provides resonable scavenging of most residual gases for most applications, although this time delay may be varied to suit individual preferences and task requirements. The filter used in the present invention should meet all applicable OSHA and other health requirements for filtered air streams, and can have carbon monoxide and other contaminant removing elements included if so desired. Depending on the quality of the filtration the exhaust should be vented away from the workplace as required. Several hepolite filters which can effectively remove carbon monoxide and almost all particulates are widely available for industrial filtration. This embodiment is also well adapted to mounting on terrestrial robotic welding torches, and provides exhaust scavenging capabilities for MIG, TIG, flux core, laser, resistance spot welding and all other automatic welding applications without having to construct elaborate vents and ducting around the welding station. It can be adapted to these applications without departing from the spirit of the invention.

Figures 19, 20:
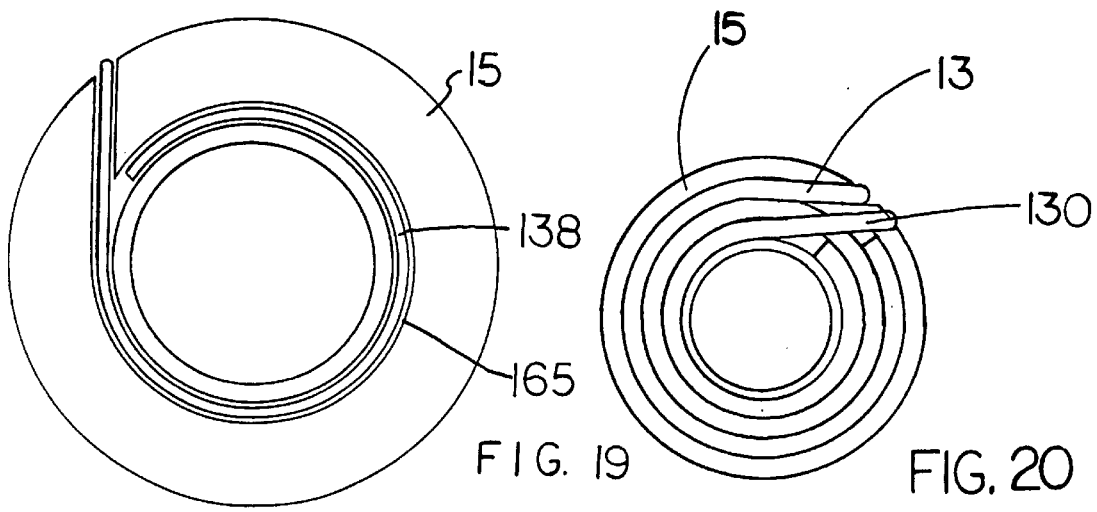
FIG. 19 is a view from underneath of an electromagnetic base of an underwater embodiment of the present invention, showing the arrangement of a fiberoptic sensor.
FIG. 20 is a view from underneath of an electromagnetic base of an underwater embodiment of the present invention, showing an arrangement of multiple fiberoptic sensors.

Referring now to FIG. 19, a view of an enclosure electromagnetic base from underneath is shown in which an electromagnetic base 15 has an emitter groove 165 integral, in which resides a fiberoptic stress sensor 138, which is also used as an acoustic emissions detector. Suitable fiberoptic systems, such as that disclosed in U.S. Pat. No. 5,355,208 by Crawford, et al, can easily be incorporated into the present invention for reliable on line acoustic emissions measurements of welding parameters. In this embodiment, the fiberoptic cable is glued in the groove and is not enclosed in the enclosure, but exits from the underside of the electromagnet on one side and runs up to the torch handle on the outside of the enclosure, free to flex and bend as the welder moves the torch in the welding task.

Referring now to FIG. 20, viewing the electromagnetic base from underneath another possible sensor configuration is shown, in which an electromagnetic base 15 has an emitter groove for each of two fiberoptic cables. The outermost cable is a fiberoptic stress sensor 138, and proximally adjacent is a temperature sensor 130, which is also a fiberoptic sensor, both of which exit the underside of the magnet on the side, and are located outside of the enclosure, free to bend and flex as the torch is manipulated in the welding operation. Both cables can operate simultaneously or in sequence, as the operator prefers, and a real time visual readout is displayed for each in the welders helmet worn video display.

Figure 21:
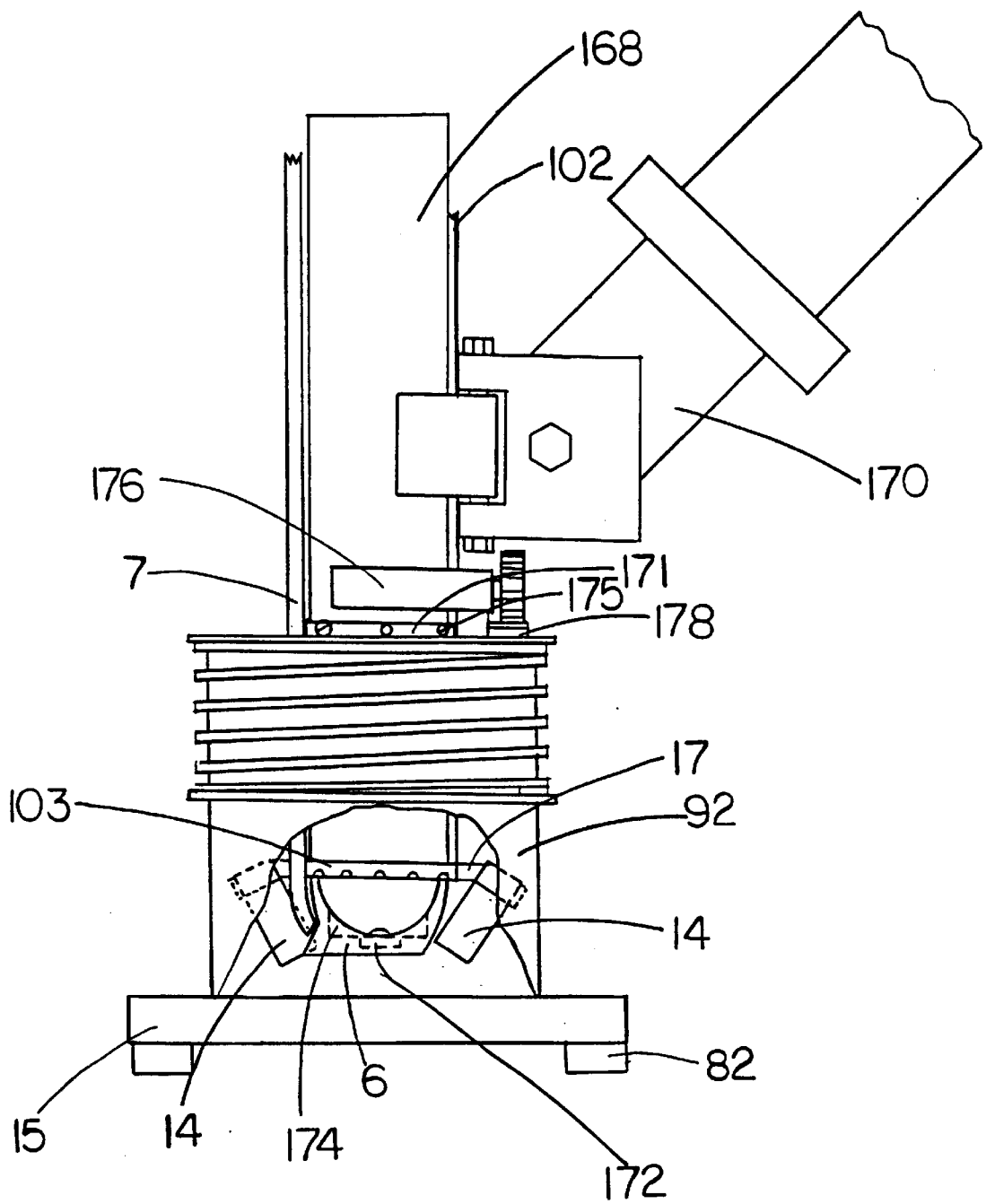
FIG. 21 is a side cutaway view of an underwater or terrestrial embodiment of the present invention showing a plasma arc welding torch attached to a robotic arm.

Referring now to FIG. 21, a cutaway side view of a robotically controlled plasma arc welding torch in an enclosure is shown in which a robotic plasma arc welding torch 168 is connected to a robotic arm 170 and has an enclosure which is attached to the torch by a locking collar 171 with a set screw 175, of which there are a plurality. On the top of the enclosure cap and attached to the top of the sliding ring on the cap is a gear track 178 which is connected via a gear to a servo motor 176 which is used for moving the sliding ring as the welding operator prefers. Just below the spring on the enclosure is located the lower enclosure body 92. A gas ring 103 is attached to the torch nozzle and is attached to a clear torch cup 6. An electromagnet 14 is attached to each side of the gas ring by a magnet bracket 17, each oriented 90 degrees from the direction of travel and 180 degrees from each other. Located at the base of the lower enclosure body is an electromagnetic base 15 which is used for attachment to a substrate, and has attached a V-groove seal 82, of which there are two at front and back along the axis of the weld. The electromagnetic base can vary in size and diameter upwards or slightly downwards to suit specific sealing problems or space constraints. In an alternate embodiment, this base is replaced by magnetic wheels, the structure of which are shown elsewhere in this disclosure in FIGS. 23A and 23B, and can also be replaced by the rolling seal shown in FIGS. 4 and 5. Located inside the enclosure are several structures, including a fiberoptic borescope 7, a seam tracker emitter 172, a seam tracker sensor 174 and an auxiliary gas duct 102. The torch shown in the drawing is a plasma transferred arc welding torch, eutronic gap system 375 torch, of which there are several sizes to choose from to suit specific applications, which are manufactured by Eutectic Corporation, Flushing, N.Y. This torch uses a flow of metal powder in a pressurized gas stream to feed the plasma as the torch operates, which requires a remotely located powder feeder to feed the torch thru hoses at longer than usual lengths, up to and exceeding 300 feet in length. A suitable hopper which can easily be adapted to this higher pressure and high accuracy metering, remotely located application is manufactured by Powder Feed Dynamics, Inc., Cleveland, Ohio. The low pressure piping, fittings and tubing in the powder feeder must be replaced by higher pressure rated components in the 300–500 psi range for deeper robotic welding applications. In another embodiment, the plasma welding torch used is wire fed thru an attached wire feed system which is commonly available in the industry, and which is enclosed in a similar underwater enclosure to that manufactured by GKSS in Geesthact, Germany. The locations of the two electromagnets on the sides of the torch enable close control and directed accuracy over the welding process by magnetic manipulation of the plasma arc. This is accomplished by varying power and current to each of the electromagnets and can either be guided by ultrasonic, video, or laser imaging seam tracking techniques, or by direct visual imaging by the diver thru a window in manual operations.

Plasma constriction problems which evidence themselves during extremely deep welding operations can be compensated for by manipulating the arc inside the plasma using the electromagnets attached to the gas ring. In an alternate, deep water embodiment, four electromagnets are attached to the gas ring to compensate for arc or plasma constriction. Relative to underwater robotic welding applications at great depths, the employment of magnetic manipulation of the arc or plasma for specific welding applications becomes very important and can be addressed by many embodiments of the present invention. At depths below 100 feet, pressure effect induced arc constriction produces an unstable arc which progresively interferes with control of the welding process as depth increases, producing inconsistent quality in completed welds. The employment of four electromagnets attached to an enclosure of the present invention such as that shown in FIG. 21 offers the ability to control the arc in deep water welding operations by reversing the controlling electromagnetic fields in a regular, controlled sequence, which stabilizes and guides the arc.

The spring surrounding the enclosure in any of the robotic embodiments in this disclosure can have stronger spring pressures, exerting from about 2 pounds to upwards of 50 pounds or more of force depending on the enclosure design. The embodiment shown in FIG. 15 requires spring rates at the middle of this range, depending on the welding position used, and the embodiment shown in FIG. 21 will require lighter spring rates, normally in the 5–35 pound range. However, if the torch used is very large, such as some of the larger eutronic gap system 375 plasma transferred arc torches are, which forces a larger enclosure design because of the large amount of gas enclosed and consequent large seal area required, or if the enclosure is very large for other reasons or for some reason contains large amounts of bouyancy, such as from an odd, unique shape for a special application such as an enclosed laser seam tracker, or if the work surface is very uneven or rough, spring rates and exerted pressure could be greater. The selection process must consider this and the enclosure should have resultantly higher spring pressures to compensate for the tendency of the enclosure to release large amounts of the shielding and auxiliary gases from the uppermost facing edges of the interface between the hollow rubber seal and the substrate. Pressure rates of ½ to 5 pounds Per linear inch of seal contacting the substrate is a reasonable rule of thumb to use for planning, although specific applications, surface roughness, welding position, gap between work pieces and gas flow rates will drive the spring pressure chosen.

Figure 22A:
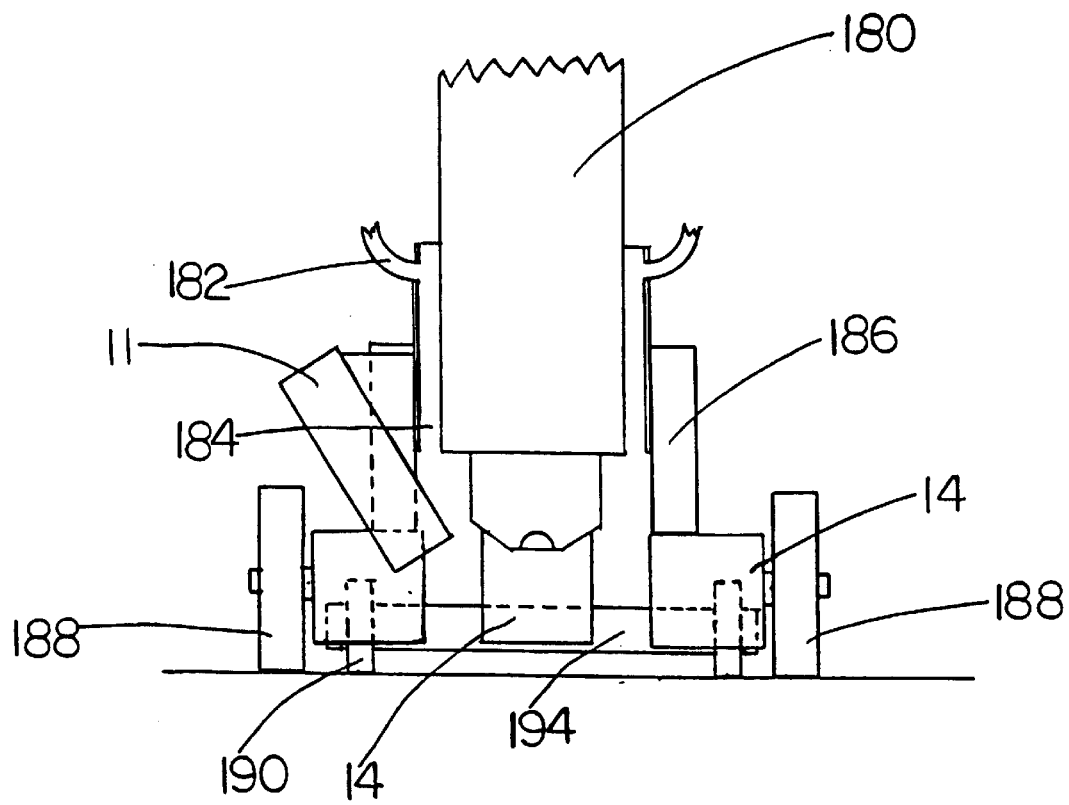
FIGS. 22A and 22B are side and plan views, respectively, of an underwater embodiment of a plasma arc cutting torch attached to a wheeled framework by brackets.
Figure 22B:
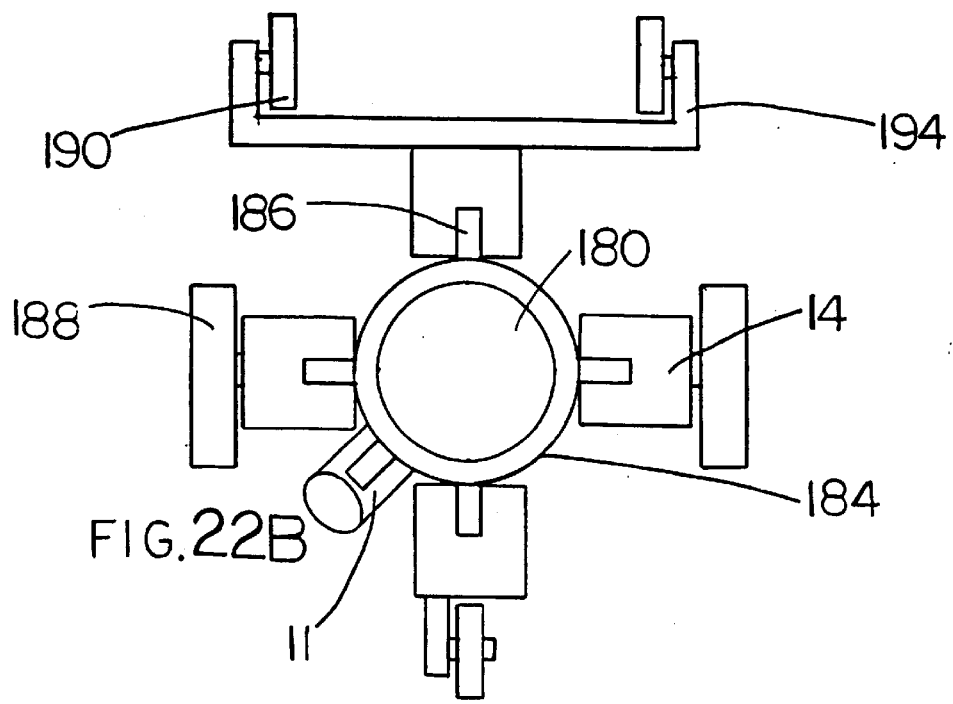

Referring now to FIGS. 22A and 22B, a side view of a plasma arc cutting torch with wheels attached is shown, where a plasma arc cutting torch 180 has attached a gas hose 182 which is connected to a duct 184 which is used for the evacuation of water from the immediate area of the cut. Attached to the duct is a bracket 186 which has attached at the bottom an electromagnet 14 to which a permanent magnet wheel 188 is attached. In another embodiment, the wheel is connected directly to the bracket, which has an appendage to accommodate it, and the electromagnet is affixed to the bracket. To the side of the duct is a TV camera 11 which images the cut as the torch moves forward. Depending upon the camera location and proximity to the torch electrode, it may be desirable to locate a clear glass lens in front of the camera lens to protect it from dross and arc spatter. In the embodiment shown, the camera lens is located at the exit point of the gas stream from the duct, which is a fast moving flow that tends to protect the lens from spatter and cutting contaminant build up. In another embodiment, the plasma arc cutting torch has attached an optically clear torch cup and borescope arrangement attached to a gas ring and auxiliary gas duct, which is structurally similar to that shown in FIG. 21 of this disclosure. Also shown is a wheel bracket 194 which is connected to a rolling wheel 190, which is one of a pair attached to opposing ends of the wheel bracket. This arrangement allows the torch to traverse long distances without the trailing wheels falling into and lodging in the kerf of the cut. In this embodiment, the magnetic wheels are designed so that the north and south poles of each magnet in the wheels are oriented along the same axis as the direction of the cut to avoid magnetic arc blow. In this figure, three electromagnets of four are shown, which is more clearly depicted in FIG. 22B, which shows, starting at the top right, a wheel bracket 194, to which a rolling wheel 190 of which several are employed are attached, and this bracket is attached to an electromagnet 14 which is connected to a duct 184 which encloses a plasma cutting torch 180. The electromagnet is connected to the duct by a bracket 186. In another embodiment which is not shown here, the torch has only three wheels, two of which are located proximally to the sides, but are located slightly rearward of the torch and connected to it by a bracket, and one wheel is employed as a leading wheel in the front and connected by a bracket. The brackets may be made of steel or any other suitable metal, or suitable plastics which may be bolted or otherwise attached to the structures. This embodiment is intended to be used for long cuts underwater on shapes which are constant in their contours, such as oil rig jacket legs, bilge keels of ships, and large I beams, although it may be used for irregular shapes as well, and may be employed in a robotic cutting mode using an ROV or other robotic technology either underwater or in an atmospheric environment.

Figure 23B:
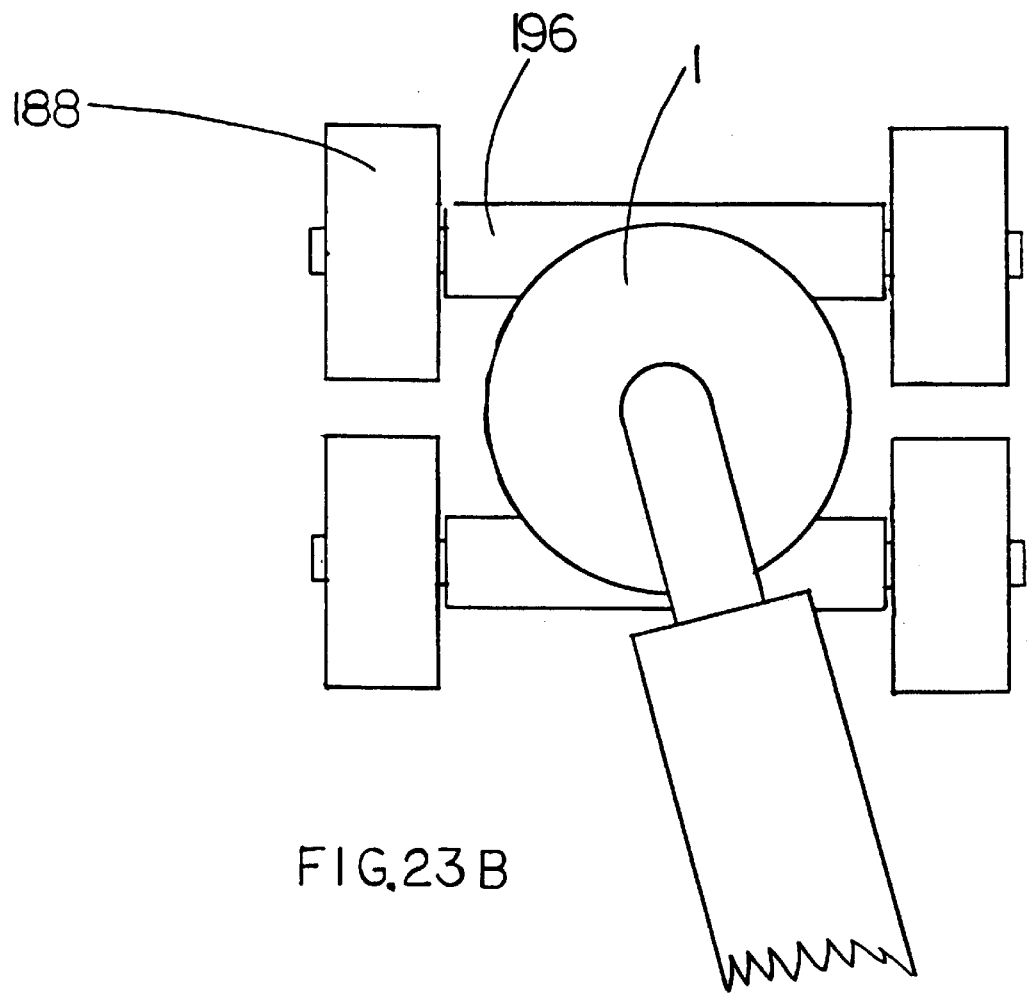

Referring now to FIGS. 23A and 23B, in which FIG. 23A is a side view of an enclosure with wheels, in which torch 5, which can be either a cutting or a welding torch, is enclosed in an enclosure with a lower enclosure body 92 and which has attached a wheel mount 196, of which there are several, which is attached to a permanent magnet wheel 188. Attached to the bottom of the enclosure is a hollow rubber seal 28. Penetrating the top of the enclosure cap is a fiberoptic borescope 7, which can be replaced by a TV camera or other disclosed viewing means in alternate embodiments. FIG. 25B shows a top view of this embodiment detailing the configuration of the attachment of the wheel mounts to the lower enclosure body, and shows an enclosure cap 1. In this embodiment, the hollow rubber seal can be attached to the rubber bulb 29 shown in FIG. 2 for inflating or deflating as task requirements dictate. In another embodiment, which is not shown here, a rolling seal is used as a side seal on each side of the enclosure, and a suitable flap, skirt, or other type of seal is used for the front and back of the enclosure. Many suitable seals are available and can easily be substituted without departing from the spirit of the invention.

In an alternate embodiment if the torch selected is a plasma welding torch, for example, then the enclosure cap may be directly attached to the top of the lower enclosure body to facilitate an immovable, constant, fixed distance from the torch electrode to the work piece if so desired. This alternate embodiment which omits the spring and flexible portion of the enclosure may be adapted to any type of torch used with the present invention in combination with any of the enclosure embodiments shown in this disclosure to create a fixed distance between the torch and the work piece.

The permanent magnet wheels are oriented with their north and south poles pointing along the axis of the direction of travel to prevent arc blow. Rare earth or ferrite magnets are suitable and are commonly available for this purpose. The wheels shown are each about one inch and a half high by one inch wide, but the sizes can vary widely, giving greater or lesser magnetism as specific circumstances dictate. The axles for the wheels may either be designed to screw into or otherwise lock onto the wheel mounts, facilitating independent wheel rotation for high mobility of the enclosure. In the embodiment shown here, the axles are each screwed into the wheel mounts and each wheel has an internal non-electrically conductive bushing, such as nylon, to wear against the axle. It should be noted that with any of the wheeled embodiments shown in this disclosure that if the axles are constructed of an electrically conductive material, they should not come in contact with any electrically conductive portions of the enclosure to prevent a short circuit from the torch electrode into the work piece through the axles and wheels. Also, the wheels should also be isolated from contact or close proximity with any electrically conductive structures on the enclosure by non-conductive spacers or by wheel and enclosure design.

Figure 24A:
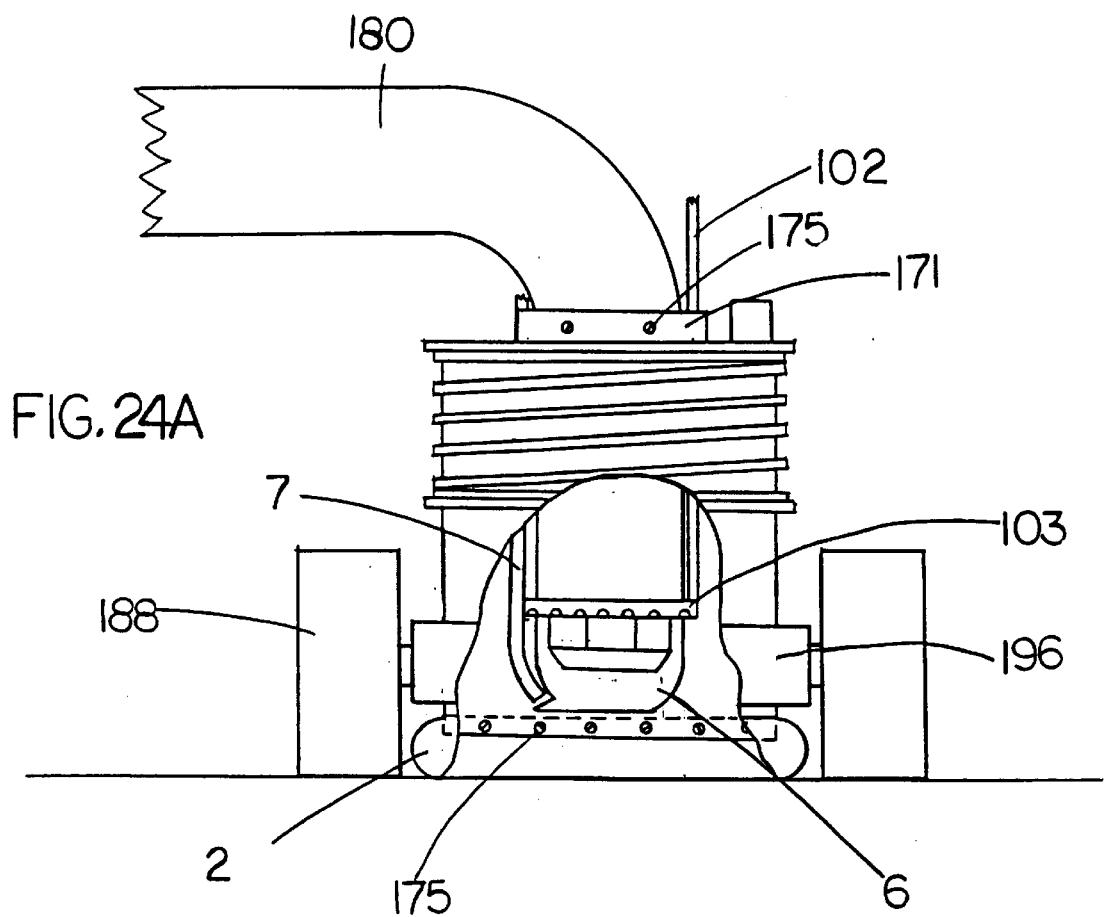
FIG. 24A is a cutaway side view of an underwater or terrestrial embodiment showing a plasma arc cutting torch inside an enclosure with wheels.

Referring now to FIG. 24A, which is a cutaway side view of a plasma arc cutting torch inside an enclosure with wheels, where a plasma cutting torch 180 is enclosed in an enclosure by a locking collar 171 with a set screw 175, of which there are a plurality, and attached to the enclosure is a wheel mount 196 which has attached a permanent magnet wheel 188, of which there can be two or more attached. Inside the enclosure is found attached to the torch electrode holder a gas ring 103 which has attached an auxiliary gas duct 102, which supplies additional shielding gas and enables clearer viewing of the cutting process. Appending from the gas ring is a clear torch cup 6, which has adjacent to it a fiberoptic bore scope 7, and at the bottom of the enclosure is a hollow rubber seal 28, which can be attached to the enclosure by a set screw 175, of which a multiplicy are employed as shown in the drawing. The rubber bulb 28, shown in FIG. 2 can be connected to the seal for adjusting to specific task requirements if so desired. This embodiment is specifically well adapted for robotic or manual cutting of metal in completely occluded water conditions, where visibility is limited or completely zero. If it is so desired, some or all of the wheels may be completely removed for conditions requiring great adaptability, as when cutting sheet pilings or other irregular surfaces. In that case, the enclosure may be used without the benefit of any attachment mechanisms as a manually operated device, but still offers the enormous benefit of providing superior viewing of the cut over traditional methods in extremely reduced underwater visibility conditions, which is the rule rather than the exception in underwater cutting operations. This is partially because the cutting operation creates a great deal of waterborne particulate matter which interferes with viewing. In another similar embodiment, the wheels are replaced by a magnetic base such as shown in FIG. 21 for use with this embodiment. This enclosure design may also be used with other types of cutting torch configurations, such as laser, electron beam, etc., and can also be used for welding.

Any of the seal arrangements shown in this disclosure may be replaced by the rolling seal shown in FIG. 4 for the side seals in conjunction with skirt or other type seals at the front and back, and any suitable lip, flap, or other seal configurations may be used for a specific application without departing from the spirit of the present invention. In addition, the basic shape of the enclosure may be modified to suit any specific application or individual preference by elongation, squaring, or any other shape of preference, as long as the capability remains to enable a gas envelope around the weld area.

Figure 24B:
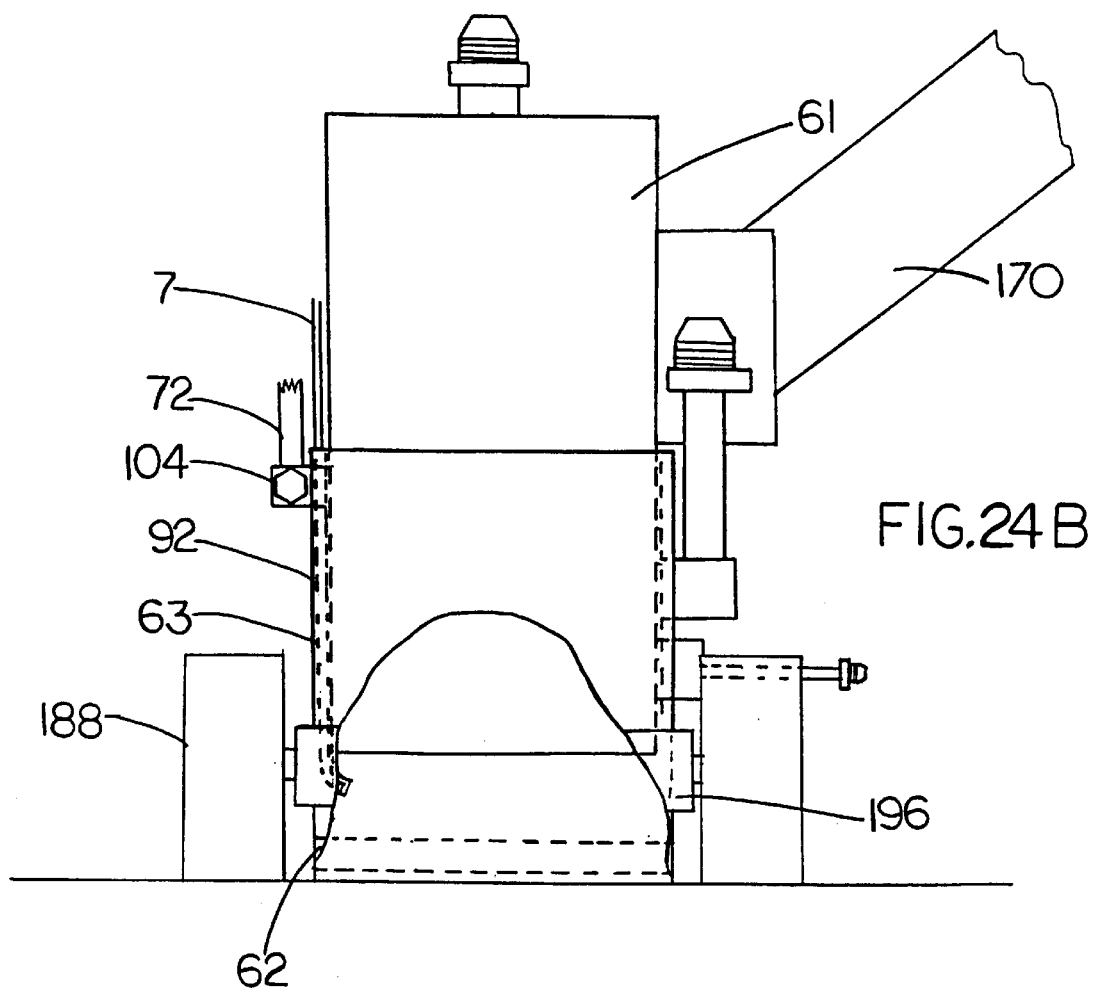
FIG. 24B is a cutaway side view of a plasma thermal metal sprayer inside an enclosure with wheels attached.

Referring now to FIG. 24B, which is a side cutaway view of a plasma arc thermal sprayer in an enclosure, where a plasma arc thermal sprayer 61 is enclosed in a fixed manner in a lower enclosure body 92 to which is attached at the bottom a flap seal 62, and on the side is attached an auxiliary gas valve 104, which is connected to an air duct 72 which supplies air or gas to the enclosure from a remotely located supply of pressurized gas. The enclosure can be connected to the thermal sprayer by means of a bracket, clips, adhesives, screws, bolts or other conventional means of attachment. The enclosure may have a wheel mount 196, of which one or more mounts may be attached and have a wheel 188 attached thereto, of which there may be a multiplicity, and the wheels may be either electromagnetic, permanent magnets, or non-magnetic. Penetrating the top of the enclosure is a fiberoptic borescope 7 which is enclosed in a borescope air duct 63 which is connected to the auxiliary gas valve. The placement of the borescope in the auxiliary gas flow protects the borescope from dross and sparks from the flame spraying process and provides an aid to clearer viewing of the process. In alternate embodiments the fiberoptic borescope can be replaced by a conventional TV camera as shown elsewhere in this disclosure. A robotic arm 170, is attached to the side of the spray gun to enable robotic operation of the enclosure and gun. If it is desired, the robotic arm may be removed and the enclosure can be operated manually by a diver. In alternate embodiments, some or all of the wheels can be removed and the enclosure held against the work surface manually or robotically. A rolling seal, hollow rubber seal, or other seal shown in this disclosure can be substituted for the flap seal at the bottom, or the bottom may be left without a seal if so desired, relying upon the flow of gas from the auxiliary gas valve to maintain a gas envelope between the enclosure and the substrate. A suitable plasma spray gun for this application is the model SG-100, manufactured by Miller Thermal, Inc., Appleton, Wis.

In this embodiment, it is preferred that the powder feeder is an auger screw powder metering type and for deeper underwater applications may need to be adapted to the higher pressure requirements of powder hose lengths of up to and exceeding 300 ft. This can be achieved by replacing the internal low pressure piping, solenoids and other internal components with higher pressure components with service ratings of 250–300 psi for deeper underwater applications. Suitable powder feeders of this type are available from Powder Feed Dynamics, Inc., Beachwood, Ohio. In addition, a static dissipative powder hose which is grounded to the surrounding seawater is also required for this application. A partial transfer circuit of low voltage current flow, in the 10v DC range at 100 amps thru the plasma flow at a 5 centimeter stand off distance between the gun and the work provides a more durable mechanical bond between the powder and the substrate. The circuitry and connections for this should be obvious to those with average skill in this art. In addition, the enclosure can have mounted thereon or attached thereto a multiplicity of sensors as shown in this disclosure if desired. The length of the lower enclosure body may vary and may be shortened so that it is attached to and appends from the bottom of the spray gun as a skirt if so desired, leaving the body of the gun exposed to the ambient water or other liquid medium.

Figure 25:
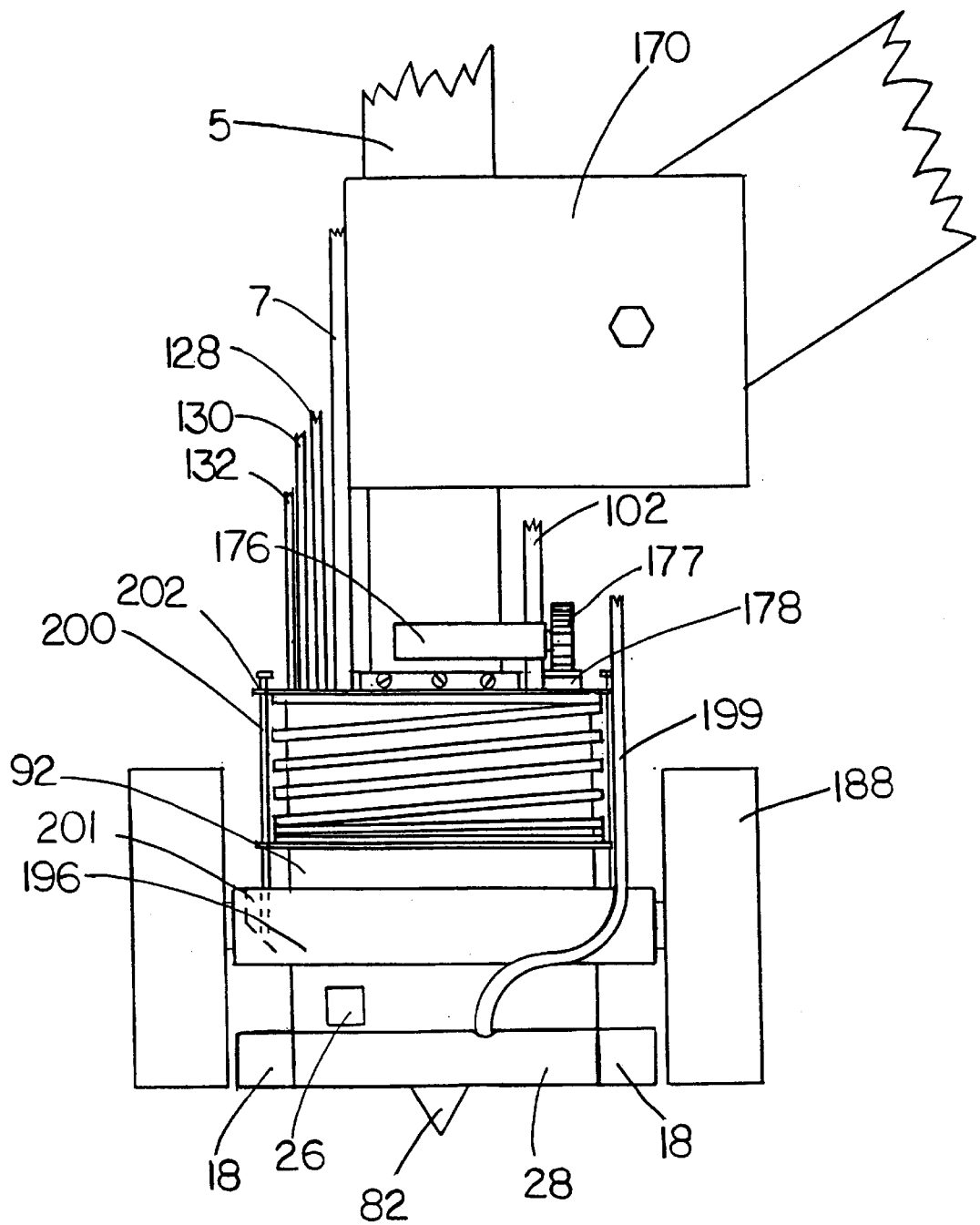
FIG. 25 is an underwater embodiment of the present invention showing a side view of a robotic arm attached to a plasma arc welding torch, the nozzle of which is enclosed by the present invention with wheels attached.

Referring now to FIG. 25, which is a side view of a robotic torch attached to the present invention, an embodiment is shown which is specifically well adapted for robotic deep underwater cutting and welding applications, in which a torch 5, is attached to a robotic arm 170. Attached to the torch body just above the enclosure cap is a servo motor 176 with a gear 177 which turns in a gear track 178 which is attached to the sliding ring shown in FIG. 10B of this disclosure. Penetrating the enclosure cap is an auxiliary gas duct 102, which is attached to a gas ring located on the torch inside the enclosure. Also penetrating the enclosure cap is a fiberoptic borescope 7, a humidity sensor 128, a temperature sensor 130, and a pressure sensor 132. In this embodiment, the enclosure cap projects sideways beyond the spring periphery and has a torsion post hole 202 in which a torsion post 200 slides as the enclosure cap is moved up and down by the robotic arm. The torsion post is securely anchored in a torsion post mount 201, which is a projecting appurtenance of the lower enclosure body 92. There are two or more torsion posts, which can be mounted either in the front and back of the enclosure, or as shown on either side. The purpose of the torsion posts and their sliding attachment to the enclosure cap is to enable the robotic arm to reposition the enclosure as it is being moved along a surface while the task is being performed. They enable the robotic arm to apply a torsional load to the lower enclosure body, thereby turning the enclosure to the side for repositioning. The torsion posts are made of titanium or any suitable rigid metal which is reasonably corrosion resistant and is non galling. The torsion post assembly has worked well with other embodiments shown in this disclosure and can be easily adapted to be used with them if so desired. In an alternate embodiment the lower enclosure body is directly attached to the enclosure cap, omitting the inner enclosure and spring. The lower enclosure body has as an appurtenance, a wheel mount 196, which is integral with the lower enclosure body and extends directly sideways from the centerline of the lower enclosure body, and to which a permanent magnet wheel 188 is attached to either side of the lower enclosure body by an axle which is permanently affixed to the wheel mount by conventional means, making this a two wheeled vehicle. One wheel is located on each side of the enclosure on an axis running transversely thru the center of the enclosure. This two wheel design is well adapted to underwater robotic welding applications because of its high manueverability and low turning resistance to twisting pressures exerted by the robotic arm for guidance. At the lower extreme of the lower enclosure body is found a rolling seal 18 on each side of the enclosure, and across the front and back between the rolling seals is found a hollow rubber seal 28 to which a V-groove seal 82 can be attached along the axis of the weld. In this embodiment, the hollow rubber seal is connected to a remotely located source of pressurized water such as a water pump with a high accuracy pressure regulator and purge valve in line for metering and adjusting the pressure to the seal. This connection is made via a water supply tube 199, with the tube being vulcanized to the hollow rubber seal using conventional sealing techniques. Attached to the lower enclosure body is an acoustic emissions sensor 26. The enclosure may also be used with other torches and methods of welding such as electron beam, laser welding, microwave, friction stud, MIG, flux core or any other type of welding technology or torch. This embodiment is particularly well adapted to the four electromagnet configuration around the torch electrode inside the enclosure used for arc manipulation, as shown in FIG. 14.

Referring now to FIG. 26, we see a schematic circuit diagram of the control circuitry used to control the electromagnets which guide and manipulate the arc, where a torch handle 8 is connected to a torch which is welding a weld bead 96 and is connected to a torch lead 52, which is used interchangeably with torch lead 10 shown in FIGS. 1 and 16 of this specification. The torch lead connects to a welding machine 54. Also connected to the welding machine is a ground lead 56, which connects to a ground 58. An adjustable power supply 218 connects to an amplifier 226 which is connected to a left signal wire 222 which connects to a cross axis electromagnet left 212a. The adjustable power supply is also connected to a similar amplifier which connects to a right signal wire 224 which connects to a cross axis electromagnet right 212b. The amplifier is connected to an amplifier power circuit 217 which supplies both positive and negative polarities from the adjustable power supply to the amplifier and which there are a multiplicity as shown. The amplifier amplifies signals from a synthesized function generator 216. Connecting the synthesized function generator to the welding machine is a reference circuit 220, which switches the signal generation function on and off as the torch electrode completes the primary welding circuit or breaks it. This embodiment, using two electromagnets each opposed and at right angles to the weld axis, is the preferred embodiment for welding applications. These two electromagnets are shown as a cross axis electromagnet left 212A, and a cross axis electromagnet right 212B.

The drawing shows two additional electromagnets, signal wires, and amplifiers, each connected to the adjustable power supply and synthesized function generator, and which can be used by underwater cutting embodiments such as the embodiment shown in FIG. 22, or for unique underwater welding applications where there is a need for more magnets controlling the arc. For these applications the drawing shows the following components which are also connected to the adjustable power supply, amplifier and synthesized function generator: a front signal wire 230 which connects to a weld axis electromagnet front 214B, a rear signal wire 228 which is attached to a weld axis electromagnet rear 214A.

In the preferred embodiment, the function generator used is dedicated to a specific electromagnet, so that if two electromagnets are used for the specific application, they will be connected to two coupled function generators. The function generators shown in the drawing are each connected so that their clocks are all synchronized, providing synchronized signal generation to the separate electromagnets. A suitable 120 volt ac powered synthesized function generator which may easily be adapted to this application is the DS345 30 megahertz synthesized function generator, available from Stanford Research Systems, Sunnyvale, Calif., along with arbitrary waveform composer software for creating waveforms for specific welding applications. An external amplifier, available from this supplier, is required to boost the power up to levels as high as 25 watts, functioning as an adjustable power supply. The function generator is connected to a computer with an arbitrary waveform software program with selectable programmable parameters.

In the preferred embodiment, a real time video display showing the sensor readouts and electromagnet waveforms is displayed to the diver as he completes the weld. The readouts are generated by a remotely located waveform recorder which is linked thru a parallel port to a computer. This recorder is directly linked to, and receives input signals from the signal transmission wires of the sensors. It then outputs signals to the computer which processes and outputs the display as a video signal. This waveform recorder is the DI-221 TC available from Dataq Instruments, Inc., Akron, Ohio, and is used with Windaq/200 and Windaq/EX software from Dataq. It is capable of displaying up to 16 separate input channels as simultaneous, continuous waveform displays. In certain conditions where the reduction of a very large waveform is required, a signal conditioner, also available from dataq may be required. The signals are output and processed by a computer before sending a video signal to a remotely located flat panel display available for viewing by the diver.

As the torch completes the circuit, the welding machine sends a reference signal to the master synthesized function generator, which initiates a clock cycle pulse to the slave synthesized function generator by the signal transmission wire as shown. Regular, precision timed switching signals to each of the electromagnets are initiated in response. The switching rate may vary anywhere from 2–400 hertz, as specific situations dictate, although more common is around 2–10 hertz. The power signals for each of the electromagnets in each axis can be made to alternate between two separate settings which will either push or pull the arc toward the left or right of the kerf in regular, controlled movements which will assist in complete wetting of both left and right sides of the groove. In certain situations it may be desirable to program the opposing magnets to have opposite polarities at the same time to compensate for strong ambient magnetic field interference or other task specific problems. As a less extreme measure to gain control over the arc it is also possible to assist in the redirecting of the arc by energizing only one of the electromagnets while leaving the opposing magnet de-energized, or to de-energize one magnet only on one half of a full wave ac cycle for example, which allows the arc to be moved farther to one side of center than the other when the torch is traveling along a weld groove with unequal length sides. In circumstances where arc blow is a problem due to localized magnetic fields from equipment or impressed current cathodic protection components, etc, this feature is a boon because these ambient magnetic fields may occur only on one side of the weld, which the present invention is easily adapted to compensate for by software programming changes. In addition it helps effect even heating of both sides of the weld by rapid arc switching across the V-groove which eliminates or minimizes deformations and warping.

Figure 27:
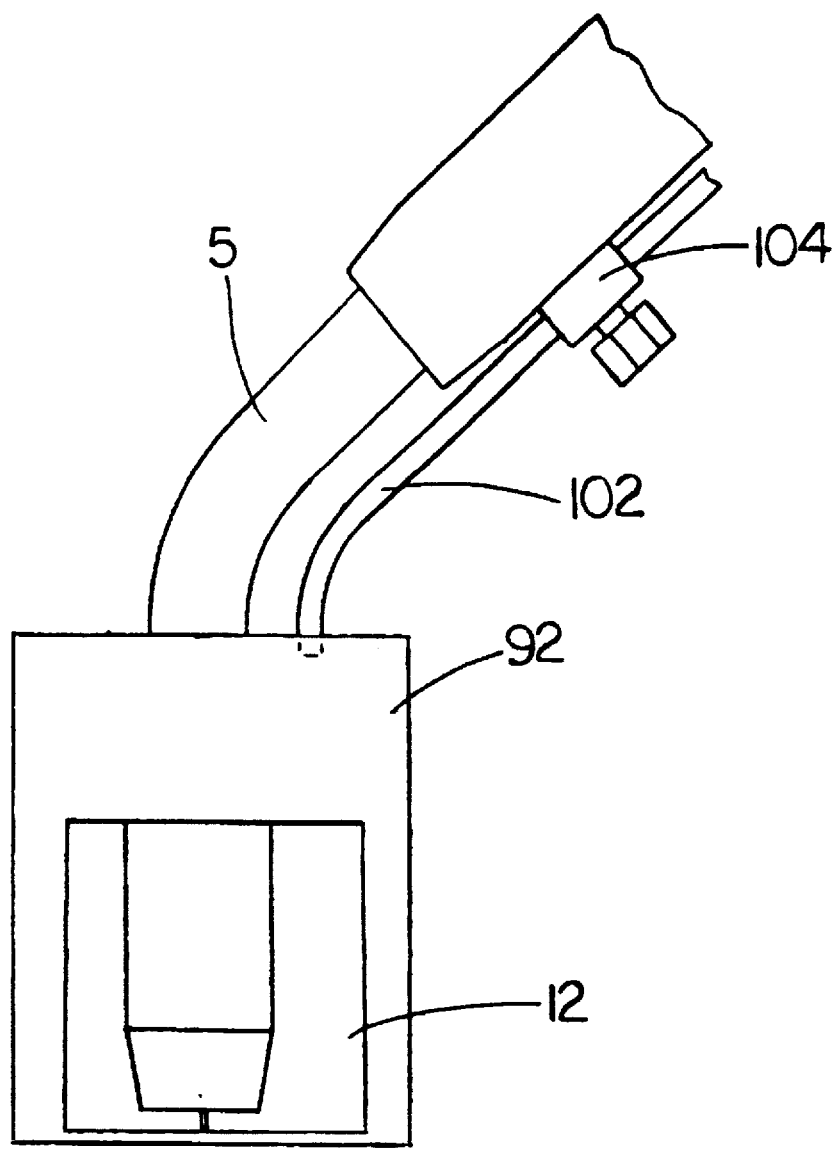
FIG. 27 is a side view of the simplest form of an underwater embodiment of the present invention, showing a torch inside an enclosure with a window.

Referring now to FIG. 27, which shows the present invention in its simplest form as used underwater, which can be constructed as a rigid enclosure appending from any conventional MIG, flux core, plasma arc, electron beam, laser or similar type of torch with the enclosure enclosing the torch nozzle or at least the opening of the nozzle from which the shielding gas and electrode extend, with a window provided for watching the welding operation. In this embodiment, the torch is not outfitted with an optically clear torch cup, nor does it have an auxiliary gas supply or gas ring, or an electromagnet or seal at its base. Shown is a side view where a torch 5 is attached to a lower enclosure body 92 which encloses a nozzle 124. A window 12 is provided in the enclosure for viewing the welding operation. Attached to and penetrating the top of the enclosure, which in this embodiment is contiguous with the sides, is an auxiliary gas duct 102 which is attached to an auxiliary gas valve 104 which is connected to a remotely located supply of auxiliary gas. The bottom of the enclosure is open and does not have a seal at the bottom. Gas pressure and auxiliary gas flows through the enclosure are used in this embodiment to maintain a gas envelope around the weld as the welding operation progresses, by maintaining the bottom of the enclosure at a location either touching or near the work piece or pieces. The diver watches the arc through the window from the side as the weld progresses. In a variation of this embodiment, the lower enclosure body has a spring and inner enclosure attached either at the top with an enclosure cap, as shown in FIG. 10, or at the bottom, which assists in manipulating the torch inside the enclosure as it is pressed firmly against the substrate during welding operations. This enclosure can also be adapted to the application of plasma thermal spraying by attachment to the front of a plasma thermal spray gun, such as that shown in FIG. 24b, and could be used as a hand held device by rubbing the lower surface of the enclosure against the work surface as the gun is moved across the substrate.

As can be seen from the foregoing discussion, the present invention provides an improved method of controlling, detecting and measuring a wide group of parameters and environmental conditions during welding and cutting operations both underwater and in out-of-water shop and industrial applications. The present invention successfully addresses the heretofore unmet need to control, quantify and measure the conditions in a controlled welding environment in and around welds as they are being made to permit the technological growth of this segment of the welding industry. The present invention provides an operating platform and environment for a wide variety of sensors for these measurements in both manual and robotic applications.

For industrial and shop welding applications, the enclosure is simply a skirt around the periphery of a nozzle or torch head on wire feed, smaw or any other type of welding torch commonly used in industry. It may be easily adapted to the torch head or electrode holder of an ordinary, common shielded metal arc torch, and is attached to and enclosing the opening on the head of the electrode holder with a hose which leads to a remotely located filter in its simplest embodiment.

In another embodiment, the enclosure can simply have the hollow rubber seal at the bottom of the enclosure deleted with the seal maintained by manually pressing the enclosure against the work surface, or by the employment of attached wheels or other stand offs. Maintaining the enclosure in a gas filled state is accomplished by constantly maintaining the smallest possible space between the bottom of the lower enclosure body and the work piece, relying on water tension and resistance to an air flow to maintain an air volume inside the enclosure. This is particularly feasable when using the enclosure in the embodiments shown in FIGS. 22A–22B 23A–23B, 24A–24B, and 25. In addition, the shape of the enclosure may be modiufied in any of its embodiments to suit specific preferences or conditions, with triangular, rectangular, square, etc., Shapes being possible, and can use either two or more parallel permanent or electromagnets at the base of the enclosure combined with seals at appropriate locations, or a single conforming shape electromagnet at the base to suit specific task requirements.

A plasma arc, flux core, or MIG welding torch with a separate internal auxiliary gas supply or source, which emits the gas inside the torch cup periphery is another possible embodiment of the present invention, and can feasably be embodied by changing the basic design of the torch interior flow canals shown in U.S. Pat. No. 5,329,089, by McGee et al., to one which permits two separate gas flows eminating from the interior of the torch cup and the employment of a partition-guide between the flows. In this embodiment, the torch could be made to operate without the benefit of an optically clear torch cup if so desired, using instead a miniaturized TV camera and an extended torch cup with either a bottom seal or a stand off gap and wheels.

Several other embodiments of the present invention are possible, which could easily be made to work in the spirit of the present invention. An affixed or movable flat panel display in an enclosure, similar to that shown in U.S. Pat. No. 5,420,828 could be used in a manner detached from the helmet and used as a display screen with the present invention by either affixing it directly to the welding enclosure or by mounting it near it on the structure being welded on or to the divers arm by magnets, lines, or other mounting methods. A small cathode ray tube screen, in an embodiment similar to that used in U.S. Pat. 5,079,753 by Suggs, could easily be adapted to the present invention as an enabling method of imaging the weld also. An interior, helmet mounted display which is movable in and out of the divers view while diving, employing flat panels and magnifying lenses can also be employed and will give excellent results when used in conjunction with the present invention.

In another embodiment, the enclosure is used by the diver as a manual method of directly viewing the welding process without using any imaging electronics by looking through the window shown in FIGS. 1, 6, or 8 and using a helmet mounted tinted welding lens commonly used in conventional underwater welding applications. In another embodiment, a metal periscope using stainless steel mirrors, and which may have a solid glass body may be adapted to the present invention by penetrating the enclosure cap and imaging the weld in a similar manner to the borescope shown in the drawings, and then connected to a TV camera, borescope or other imaging method for signal transmission to an imaging system, or terminates in a convex lens at the distal end of the periscope which displays the welding bead and arc.

Many other sensors can be used with and easily incorporated into the present invention, such as oxygen sensors, and sensors which measure exhaust gases, hydrogen, or spectrochemical sensors for the exhaust stream, to name a few. For example, U.S. Pat. No. 5,363,342 by Layton et al, discloses a fiberoptic hydrophone which is well adapted to be incorporated into the present invention by wrapping around the lower enclosure body or electromagnetic base to provide sensitive acoustic sensing to assist the welder in task accomplishment by listening to the sound the arc makes as the weld progresses. Additionally a high power, low frequency sonic emitter, similar to a sonar transducer, can be incorporated into the present invention to provide an ancillary source of vibration induced into the structure at the weld site to assist in stress relieving the weld as it cools.

While this invention has been described fully and completely with special emphasis upon preferred embodiments, it should be understood that within the scope of the appended claims the invention may be practiced otherwise than as specifically described herein.

I claim:

1. A torch mounted gas scavenging system for use with manual and robotic welding and cutting torches to remove contaminant gases from the weld or cutting site comprising:

a hollow enclosure having an upper end adapted for connection to the lower portion of at least one welding or cutting torch, a main body portion extending downwardly from said upper end to surround said at least one torch lower portion, and a base portion at a lower end of said main body portion configured to be positioned closely adjacent the metal surfaces surrounding the weld or cutting site;

said enclosure main body portion being extensible and contractable such that said base portion is movable relative to said upper end and to said lower portion of said at least one torch;

viewing means on said enclosure main body portion for observing the welding or cutting operation taking place inside said enclosure; and a gas conduit having one end in fluid communication with the interior of said enclosure and another end adapted for connection with a source of gas under pressure for conducting gas under pressure into said enclosure to provide a gas envelope around the weld or cutting site which is expelled from the enclosure to remove vapor and moisture from the affected zone in the substrate around the weld or cut and evacuate contaminant gases from the proximity of the weld.

2. A torch mounted gas scavenging system for use with manual and robotic welding and cutting torches to remove contaminant gases from the weld or cutting site comprising:

a hollow enclosure having an upper end adapted for connection to the lower portion of at least one welding or cutting torch, a main body portion extending downwardly from said upper end to surround said at least one torch lower portion, and a base portion at a lower end of said main body portion configured to be positioned closely adjacent the metal surfaces surrounding the weld or cutting site;

a swivel connection on said enclosure upper end for connecting said enclosure to said lower portion of said at least one torch whereby said lower portion of said at least one torch is movable relative to said enclosure for selectively positioning said lower end inside said enclosure relative to said metal surfaces to be welded or cut;

viewing means on said enclosure main body portion for observing the welding or cutting operation taking place inside said enclosure; and a gas conduit having one end in fluid communication with the interior of said enclosure and another end adapted for connection with a source of gas under pressure for conducting gas under pressure into said enclosure to provide a gas envelope around the weld or cutting site which is expelled from the enclosure to remove vapor and moisture from the affected zone in the substrate around the weld or cut and evacuate contaminant gases from the proximity of the weld.

3. The gas scavenging system according to claim 1 further comprising at least one vent hole in said enclosure upper end for venting gases from said enclosure during the welding or cutting operation and to allow liquids to drain from said enclosure when said enclosure is inverted during overhead welding or cutting operations.

4. The gas scavenging system according to claim 1 wherein said viewing means is a transparent window on said main body portion.

5. The gas scavenging system according to claim 4 wherein said viewing means includes a camera connected with said transparent window.

6. The gas scavenging system according to claim 1 wherein said viewing means is a window on said main body portion formed of infared light transmissive material and including an infared light sensing member connected with said transparent window.

7. The gas scavenging system according to claim 1 wherein said viewing means is a camera mounted on said enclosure main body portion.

8. The gas scavenging system according to claim 1 further comprising seal means on said base portion configured to engage metal surfaces adjacent the weld or cutting site and prevent the outflow of relatively large amounts of gas.

9. The gas scavenging system according to claim 8 further comprising an acoustic emissions sensor in said enclosure operatively connected with acoustic signal processing equipment and with a loudspeaker worn by the person performing the welding or cutting operation to provide an audio signal representing the quality of the weld or cut as it is being made.

10. The gas scavenging system according to claim 1 further comprising releasable gripping means on said base portion configured to releasably attach said enclosure to metal surfaces being welded or cut by said at least one torch.

11. The gas scavenging system according to claim 10 wherein said releasable gripping means comprises at least one magnetic member on said said base portion to releasably attach said enclosure to said metal surfaces being welded or cut by magnetic attraction.

12. The gas scavenging system according to claim 11 further comprising a pair of V-shaped seal elements depending from said at least one magnetic member in axially aligned relation to be received and pressed into sealing relation in a V-shaped groove formed between two adjacent metal surfaces by magnetic attraction between said magnetic member and said metal surfaces to form a fluid tight seal between said enclosure and said metal surfaces to prevent the passage of liquids into and out of said enclosure through said V-shaped groove.

13. The gas scavenging system according to claim 11 further comprising a resilient hollow tubular seal on said base portion configured to surround the outer side periphery of said at least one magnetic member and engage metal surfaces adjacent the weld or cutting site;

said tubular seal connected with a source of hydraulic fluid under pressure and filled with a selective amount of hydraulic fluid to expand said seal to engage said metal surfaces in a sealing relationship and prevent the outflow of relatively large amounts of gas from the enclosure interior past said at least one magnetic member; and valve means connected between said tubular seal and said source of hydraulic fluid for controlling the amount of said hydraulic fluid in said tubular seal.

14. The gas scavenging system according to claim 11 further comprising an acoustic emissions sensor in said enclosure operatively connected with acoustic signal processing equipment and with a loudspeaker worn by the person performing the welding or cutting operation;

said acoustic signal processing equipment being programmable to ignore electromagnetic emmissions in the frequency range of said electromagnetics and to provide an audio signal representing the quality of the weld or cut as it is being made.

15. The gas scavenging system according to claim 14 further comprising video signal processing means and display means connected with said acoustic signal processing means for providing a visual display corresponding to said audio signal to provide a video display representing the quality of the weld or cut as it is being made.

16. The gas scavenging system according to claim 10 wherein said enclosure base portion has a flexible plate member secured at an open bottom end thereof, and said at least one magnetic member on said said base portion comprises a plurality of electromagnets secured to said flexible plate in spaced apart relation to allow independent movement upon flexure of said flexible plate to releasably attach said enclosure to irregular and non-flat metal surfaces being welded or cut by magnetic attraction; and said electromagnets connected through switch means to a source of DC electrical current.

17. The gas scavenging system according to claim 16 further comprising a flexible skirt extending downwardly from said base portion having a bottom end configured to engage said metal surfaces adjacent the weld or cutting site and said skirt having a side wall surrounding the outer peripheral sides of said plurality of electromagnets to prevent the outflow of relatively large amounts of gas between the spaces between adjacent electromagnets.

18. The gas scavenging system according to claim 1 further comprising an annular transparent torch shield cup within said enclosure having an upper end adapted for connection to the lower portion of said at least one torch and an annular sidewall with a free end disposed about the lower portion of said at least one torch.

19. The gas scavenging system according to claim 18 further comprising at least one fiberoptic cable having one end connected with each said transparent torch shield cup and another end connected with a light source for directing a beam of light onto the welding or cutting site to illuminate the welding or cutting area around each said torch shield cup.

20. The gas scavenging system according to claim 18 further comprising at least one fiberoptic cable having one end connected with each said transparent torch shield cup and another end connected with viewing means for viewing a visual image of the welding or cutting site around each said torch shield cup.

21. The gas scavenging system according to claim 18 further comprising at least one hollow annular ring connected to each said transparent torch shield cup and having an interior connected in fluid communication with said gas conduit one end with circumferentially spaced appertures through its side wall for conducting a flow of gas under pressure into said enclosure around each said torch shield cup.

22. The gas scavenging system according to claim 1 further comprising roller means rotatably mounted on said base portion for supporting said enclosure on said metal surfaces adjacent the weld or cutting site and moving said enclosure relative thereto as a weld or cut is being made.

23. The gas scavenging system according to claim 22 further comprising a flexible skirt extending downwardly from said base portion having a bottom end configured to engage said metal surfaces adjacent the weld or cutting site and said skirt having a side wall covering open spaces adjacent said roller means to prevent the passage of relatively large amounts of fluid through open spaces between said roller means.

24. The gas scavenging system according to claim 22 further comprising an elongate flexible endless loop belt tread formed of resilient material mounted on said roller means to engage said metal surfaces adjacent the weld or cutting site in a sealing relationship when pressed against said metal surfaces.

25. The gas scavenging system according to claim 24 wherein said roller means includes magnetic means for magnetically attracting said enclosure to said metal surfaces to press said resilient loop belt tread into a sealing relationship with said metal surfaces as said enclosure is moved relative thereto.

26. The gas scavenging system according to claim 1 further comprising resilient seal means on said base portion having a concave bottom end configured to engage and grip metal surfaces adjacent the weld or cutting site; and vacuum means connected with said resilient seal means to selectively evacuate fluid from said convave bottom end and create a suction therein to releasably attach said enclosure to metal surfaces being welded or cut and prevent the passage of fluids between the interior and exterior of said enclosure.

27. The gas scavenging system according to claim 1 wherein said at least one torch comprises at least one shielded metal arc torch, and further comprising;

a pair of electromagnets on said enclosure base portion spaced in laterally opposed relation adjacent either side of said at least one torch lower portion and connected through switch means to a source of DC electrical current; and current being supplied alternately to each said electromagnet to produce a magnetic field which guides the arc from side-to-side in a V-shaped groove formed between two adjacent metal surfaces to be welded together.

28. The gas scavenging system according to claim 1 wherein said at least one torch comprises at least one welding or cutting torch connected to a robotic arm for controlling the operation and movement of said at least one torch and the movement of said enclosure from a location remote from the welding or cutting site.

29. The gas scavenging system according to claim 1 wherein there are two torches each having a lower portion positioned inside said enclosure for depositing two adjacent parallel beads of weld material one on a respective one of two metal surfaces to be joined together such that said beads of weld material flow and join together.

30. The gas scavenging system according to claim 1 further comprising water conduit means on said enclosure having one end in fluid communication with the interior of said enclosure and another end adapted for connection with a source of clear water under pressure for conducting clear water under pressure into said enclosure to provide a flow of clear water around the weld or cutting site to facilitate visibility of the welding or cutting area in otherwise visually occluded conditions.

31. The gas scavenging system according to claim 1 further comprising sensor means in said enclosure operatively connected with respective signal processing means;

said sensor means selected from the group consisting of: an infared pyrometer to detect, measure, and indicate the temperature of the metal substrate as the weld or cut is being made; a pressure sensor to detect, measure, and indicate the pressure differential between the interior and exterior of said enclosure; a humidity sensor to detect, measure, and indicate the humidity and water vapor in the interior of said enclosure; a magnetic flux sensor to detect, measure, and indicate the presence and intensity of magnetic fields in the vacinity of the welding or cutting site; an interferometric frequency sensor to detect, measure, and indicate the presence and magnitude of ultrasonic and electrical frequencies in the vacinity of the welding or cutting site; and at least one stress sensor in said enclosure engaged on a metal surface adjacent to the weld or cut to detect, measure, and indicate the presence and intensity of stress in the metal substrate as the weld or cut is being made.

32. A torch gas scavenging system for mounting on the torch of existing manual and robotic welding and cutting torches to surround the nozzle of the torch and remove contaminant gases from the weld or cutting site comprising:

a hollow enclosure having an upper end adapted for connection to the lower portion of a gas conductor tube of a welding or cutting torch having a nozzle at a distal end, a main body portion extending downwardly from said upper end to surround said torch nozzle in radially spaced relation, and an outwardly flared skirt portion at a lower end of said main body portion configured to be positioned closely adjacent the metal surfaces surrounding the weld or cutting site;

said gas conductor tube having a proximal end adapted for connection with a source of gas under pressure for conducting gas under positive pressure into said nozzle and to exit in fluid communication with the interior of said enclosure to provide a gas envelope around the weld or cutting site; and a vacuum tube connected at one end to said enclosure upper end in fluid communication with the interior of said enclosure and connected at another end to a source of negative pressure for extracting contaminant gases and smoke from the proximity of the weld.

* * * * *